United States Patent
Olson et al.

(10) Patent No.: US 10,130,930 B2
(45) Date of Patent: Nov. 20, 2018

(54) SORBENT COMPRISING CARBON AND NITROGEN AND METHODS OF USING THE SAME

(71) Applicant: Midwest Energy Emissions Corp., Lewis Center, OH (US)

(72) Inventors: Edwin S. Olson, Grand Forks, ND (US); John Henry Pavlish, East Grand Forks, MN (US)

(73) Assignee: Midwest Energy Emissions Corp, Grand Forks, ND (US)

( * ) Notice: Subject to any disclaimer, the term of this patent is extended or adjusted under 35 U.S.C. 154(b) by 0 days.

(21) Appl. No.: 15/449,112

(22) Filed: Mar. 3, 2017

(65) Prior Publication Data

US 2017/0173557 A1    Jun. 22, 2017

Related U.S. Application Data

(63) Continuation-in-part of application No. 14/195,360, filed on Mar. 3, 2014, now Pat. No. 9,669,355.

(Continued)

(51) Int. Cl.
*B01J 20/22* (2006.01)
*B01J 20/20* (2006.01)
(Continued)

(52) U.S. Cl.
CPC ............... *B01J 20/22* (2013.01); *B01D 53/02* (2013.01); *B01D 53/64* (2013.01); *B01D 53/81* (2013.01);
(Continued)

(58) Field of Classification Search
CPC ...... B01D 53/04; B01D 53/10; B01D 53/025; B01D 53/64; B01D 53/8665;
(Continued)

(56) References Cited

U.S. PATENT DOCUMENTS 1,984,164 A    12/1934  Alfred
2,317,857 A     4/1943  Soday
(Continued)

FOREIGN PATENT DOCUMENTS

CA    1099490 A    4/1981
CA    2150529 A1  12/1995
(Continued)

OTHER PUBLICATIONS

Przepiórski, J., M. Skrodzewicz, and A. W. Morawski. "High temperature ammonia treatment of activated carbon for enhancement of CO 2 adsorption." Applied Surface Science 225.1 (2004): 235-242.*

(Continued)

*Primary Examiner* — Richard M Rump
(74) *Attorney, Agent, or Firm* — Schwegman Lundberg & Woessner, P.A.

(57) ABSTRACT

The present invention relates to sorbents including carbon and nitrogen. In various embodiments, the sorbent can remove mercury from a mercury-containing gas that includes sulfur (VI) such as $SO_3$ more efficiently than other sorbents. The sorbent can include a graphene edge comprising an active site for mercury oxidation and a nitrogen layer structure including cationic nitrogen atoms, neutral nitrogen atoms, or a combination thereof proximate the active site.

19 Claims, 12 Drawing Sheets

Related U.S. Application Data

(60) Provisional application No. 61/773,549, filed on Mar. 6, 2013.

(51) Int. Cl.

| | | |
|---|---|---|
| *B01J 20/30* | (2006.01) | |
| *B01D 53/64* | (2006.01) | |
| *B01D 53/81* | (2006.01) | |
| *B01D 53/02* | (2006.01) | |
| *B01J 20/32* | (2006.01) | |
| *B01J 20/28* | (2006.01) | |
| *C01B 32/354* | (2017.01) | |
| *C01B 32/336* | (2017.01) | |
| *B01D 53/04* | (2006.01) | |
| *B01D 53/10* | (2006.01) | |
| *B01D 53/86* | (2006.01) | |

(52) U.S. Cl.
CPC ............ *B01J 20/20* (2013.01); *B01J 20/205* (2013.01); *B01J 20/28004* (2013.01); *B01J 20/3085* (2013.01); *B01J 20/3204* (2013.01); *B01J 20/324* (2013.01); *B01J 20/3208* (2013.01); *B01J 20/3236* (2013.01); *B01J 20/3293* (2013.01); *C01B 32/336* (2017.08); *C01B 32/354* (2017.08); *B01D 53/025* (2013.01); *B01D 53/04* (2013.01); *B01D 53/10* (2013.01); *B01D 53/8665* (2013.01); *B01D 2253/102* (2013.01); *B01D 2253/202* (2013.01); *B01D 2253/25* (2013.01); *B01D 2253/304* (2013.01); *B01D 2257/60* (2013.01); *B01D 2257/602* (2013.01); *B01D 2258/0283* (2013.01)

(58) Field of Classification Search
CPC .......... B01D 2253/25; B01D 2253/304; B01D 2253/102; B01D 2258/0283; B01D 2257/602; C01B 31/083; B01J 20/324; B01J 20/3236; B01J 20/3293; B01J 20/3208; B01J 20/28004; B01J 20/20; B01J 20/3204
See application file for complete search history.

(56) References Cited

U.S. PATENT DOCUMENTS

| | | |
|---|---|---|
| 3,194,629 A | 7/1965 | Dreibelbis et al. |
| 3,662,523 A | 5/1972 | Revoir et al. |
| 3,786,619 A | 1/1974 | Melkersson |
| 3,826,618 A | 7/1974 | Capuano |
| 3,849,267 A | 11/1974 | Hilgen et al. |
| 3,876,393 A | 4/1975 | Kasai et al. |
| 4,094,777 A | 6/1978 | Sugier et al. |
| 4,101,631 A | 7/1978 | Ambrosini et al. |
| 4,196,173 A | 4/1980 | DeJong et al. |
| 4,338,896 A | 7/1982 | Papasideris |
| 4,500,327 A | 2/1985 | Nishino et al. |
| 4,530,765 A | 7/1985 | Sabherwal |
| 4,708,853 A | 11/1987 | Matviya et al. |
| 4,772,455 A | 9/1988 | Izumi et al. |
| 4,786,483 A | 11/1988 | Audeh |
| 4,814,152 A | 3/1989 | Yan |
| 4,820,318 A | 4/1989 | Chang et al. |
| 4,889,698 A | 12/1989 | Moller et al. |
| 4,956,162 A | 9/1990 | Smith et al. |
| 5,245,120 A | 9/1993 | Srinivasachar et al. |
| 5,288,306 A | 2/1994 | Aibe et al. |
| 5,300,137 A | 4/1994 | Weyand et al. |
| 5,336,835 A | 8/1994 | McNamara |
| 5,346,674 A | 9/1994 | Weinwurm et al. |
| 5,409,522 A | 4/1995 | Durham et al. |
| 5,419,834 A | 5/1995 | Straten |
| 5,435,980 A | 7/1995 | Felsvang et al. |
| 5,462,908 A | 10/1995 | Liang et al. |
| 5,505,766 A | 4/1996 | Chang |
| 5,575,982 A | 11/1996 | Reiss et al. |
| 5,607,496 A | 3/1997 | Brooks |
| 5,672,323 A | 9/1997 | Bhat et al. |
| 5,695,726 A | 12/1997 | Lerner |
| 5,827,352 A | 10/1998 | Altman et al. |
| 5,891,324 A | 4/1999 | Ohtsuka |
| 6,027,551 A | 2/2000 | Hwang et al. |
| 6,074,974 A | 6/2000 | Lee et al. |
| 6,080,281 A | 6/2000 | Attia |
| 6,136,072 A | 10/2000 | Sjostrom et al. |
| 6,136,749 A | 10/2000 | Gadkaree et al. |
| 6,214,304 B1 | 4/2001 | Rosenthal et al. |
| 6,258,334 B1 | 7/2001 | Gadkaree et al. |
| 6,372,187 B1 | 4/2002 | Madden et al. |
| 6,375,909 B1 | 4/2002 | Dangtran et al. |
| 6,383,981 B1 | 5/2002 | Blankenship et al. |
| 6,471,936 B1 | 10/2002 | Chen et al. |
| 6,528,030 B2 | 3/2003 | Madden et al. |
| 6,638,485 B1 | 10/2003 | Iida et al. |
| 6,808,692 B2 | 10/2004 | Oehr |
| 6,818,043 B1 | 11/2004 | Chang et al. |
| 6,848,374 B2 | 2/2005 | Srinivasachar et al. |
| 6,878,358 B2 | 4/2005 | Vosteen et al. |
| 6,942,840 B1 | 9/2005 | Broderick |
| 6,953,494 B2 | 10/2005 | Nelson, Jr. |
| 6,960,329 B2 | 11/2005 | Sellakumar |
| 7,081,434 B2 | 7/2006 | Sinha |
| 7,211,707 B2 | 5/2007 | Axtell et al. |
| 7,435,286 B2 * | 10/2008 | Olson .................... B01D 53/10 110/345 |
| 7,479,263 B2 | 1/2009 | Chang et al. |
| 7,514,052 B2 | 4/2009 | Lissianski et al. |
| 7,521,032 B2 | 4/2009 | Honjo et al. |
| 7,544,338 B2 | 6/2009 | Honjo et al. |
| 7,563,311 B2 | 7/2009 | Graham |
| 7,611,564 B2 | 11/2009 | Mcchesney et al. |
| 7,622,092 B2 | 11/2009 | Honjo et al. |
| 7,722,843 B1 | 5/2010 | Srinivasachar |
| 7,767,174 B2 | 8/2010 | Lui et al. |
| 7,780,765 B2 | 8/2010 | Srinivasachar et al. |
| 7,938,571 B1 | 5/2011 | Irvine |
| 7,942,566 B1 | 5/2011 | Irvine |
| 8,007,749 B2 | 8/2011 | Chang et al. |
| 8,080,088 B1 | 12/2011 | Srinivasachar |
| 8,168,147 B2 | 5/2012 | Olson et al. |
| 8,168,149 B2 | 5/2012 | Gal et al. |
| 8,216,535 B2 | 7/2012 | Pollack et al. |
| 8,512,655 B2 | 8/2013 | Olson et al. |
| 8,652,235 B2 | 2/2014 | Olson et al. |
| 8,821,819 B2 | 9/2014 | Olson et al. |
| 9,011,805 B2 | 4/2015 | Olson et al. |
| 9,468,886 B2 | 10/2016 | Olson et al. |
| 9,662,629 B2 | 5/2017 | Olson et al. |
| 9,669,355 B2 | 6/2017 | Olson et al. |
| 9,757,689 B2 | 9/2017 | Olson et al. |
| 2001/0002387 A1 | 5/2001 | Tsutsumi et al. |
| 2001/0003116 A1 | 6/2001 | Neufert |
| 2002/0033097 A1 | 3/2002 | El-shoubary et al. |
| 2002/0043496 A1 | 4/2002 | Boddu et al. |
| 2002/0134242 A1 | 9/2002 | Yang et al. |
| 2002/0150516 A1 | 10/2002 | Pahlman et al. |
| 2003/0104937 A1 | 6/2003 | Sinha |
| 2003/0136509 A1 | 7/2003 | Virtanen |
| 2003/0206843 A1 | 11/2003 | Nelson, Jr. |
| 2003/0206846 A1 | 11/2003 | Jangbarwala |
| 2004/0003716 A1 | 1/2004 | Nelson, Jr. |
| 2004/0013589 A1 | 1/2004 | Vosteen et al. |
| 2004/0076570 A1 | 4/2004 | Jia |
| 2004/0109800 A1 | 6/2004 | Pahlman et al. |
| 2005/0000197 A1 | 1/2005 | Krantz |
| 2005/0019240 A1 | 1/2005 | Lu et al. |
| 2005/0074380 A1 | 4/2005 | Boren et al. |
| 2005/0147549 A1 | 7/2005 | Lissianski et al. |
| 2005/0227146 A1 | 10/2005 | Ghantous et al. |
| 2006/0048646 A1 | 3/2006 | Olson et al. |
| 2006/0057044 A1 | 3/2006 | Chang et al. |

(56) References Cited

U.S. PATENT DOCUMENTS

| | | |
|---|---|---|
| 2006/0112823 A1 | 6/2006 | Avina |
| 2006/0191835 A1 | 8/2006 | Petrik et al. |
| 2006/0204418 A1 | 9/2006 | Chao et al. |
| 2007/0168213 A1 | 7/2007 | Comrie |
| 2007/0234902 A1 | 10/2007 | Fair et al. |
| 2007/0295347 A1 | 12/2007 | Paine, III et al. |
| 2008/0090951 A1 | 4/2008 | Mao et al. |
| 2008/0107579 A1 | 5/2008 | Downs et al. |
| 2008/0134888 A1 | 6/2008 | Chao et al. |
| 2008/0182747 A1 | 7/2008 | Sinha |
| 2008/0207443 A1 | 8/2008 | Gadkaree et al. |
| 2008/0292512 A1 | 11/2008 | Kang |
| 2009/0062119 A1 | 3/2009 | Olson et al. |
| 2009/0081092 A1 | 3/2009 | Yang et al. |
| 2009/0136401 A1 | 5/2009 | Yang et al. |
| 2009/0235848 A1 | 9/2009 | Eiteneer et al. |
| 2009/0297413 A1 | 12/2009 | Olson et al. |
| 2009/0320678 A1 | 12/2009 | Chang et al. |
| 2010/0024642 A1 | 2/2010 | Fukumoto et al. |
| 2010/0047146 A1 | 2/2010 | Olson et al. |
| 2011/0076210 A1* | 3/2011 | Pollack .................. B01D 53/64 423/210 |
| 2011/0168018 A1 | 7/2011 | Mohamadalizadeh et al. |
| 2012/0183458 A1 | 7/2012 | Olson et al. |
| 2013/0280156 A1 | 10/2013 | Olson et al. |
| 2014/0056787 A1 | 2/2014 | Olson et al. |
| 2014/0224121 A1 | 8/2014 | Mimna et al. |
| 2014/0255279 A1 | 9/2014 | Olson et al. |
| 2014/0308188 A1 | 10/2014 | Olson et al. |
| 2015/0098878 A1 | 4/2015 | Olson |
| 2015/0246315 A1 | 9/2015 | Olson et al. |
| 2017/0100692 A1 | 4/2017 | Olson et al. |
| 2017/0128908 A1 | 5/2017 | Olson et al. |
| 2017/0173524 A1 | 6/2017 | Olson et al. |
| 2017/0239644 A1 | 8/2017 | Olson et al. |

FOREIGN PATENT DOCUMENTS

| | | |
|---|---|---|
| CA | 2400898 A1 | 8/2001 |
| CA | 2584327 A1 | 4/2006 |
| CA | 2757309 A1 | 10/2010 |
| CA | 2757309 C | 1/2017 |
| CN | 101048218 A | 10/2007 |
| CN | 101053820 A | 10/2007 |
| CN | 101293196 A | 10/2008 |
| CN | 10816922 A | 9/2010 |
| CN | 102413899 A | 4/2012 |
| CN | 105188910 A | 12/2015 |
| CN | 104619410 B | 5/2016 |
| CN | 107661744 A | 2/2018 |
| DE | 3426059 A1 | 1/1986 |
| DE | 10233173 A1 | 2/2004 |
| DE | 202012003747 U1 | 11/2012 |
| EP | 0208490 A1 | 1/1987 |
| EP | 1386655 A1 | 2/2004 |
| EP | 1570894 A1 | 9/2005 |
| FR | 2529802 | 1/1984 |
| GB | 2122916 A | 1/1984 |
| JP | 4953590 A | 5/1974 |
| JP | 4953593 A | 5/1974 |
| JP | 4966592 A | 6/1974 |
| JP | 4943197 B4 | 11/1974 |
| JP | 506438 B4 | 3/1975 |
| JP | 51003386 A | 1/1976 |
| JP | 544868 A | 1/1979 |
| JP | 50145324 A | 3/1980 |
| SU | 732207 A1 | 5/1980 |
| SU | 1163982 A | 6/1985 |
| WO | WO-0162368 A1 | 8/2001 |
| WO | WO-2004089501 A2 | 10/2004 |
| WO | WO-2006039007 A2 | 4/2006 |
| WO | WO-2006039007 A3 | 4/2006 |
| WO | WO-2006099611 A1 | 9/2006 |
| WO | WO-2010123609 A1 | 10/2010 |
| WO | WO-2013162968 A2 | 10/2013 |
| WO | WO-2013162968 A3 | 10/2013 |
| WO | WO-2014137907 A2 | 9/2014 |

OTHER PUBLICATIONS

Kawabuchi, Yuji, et al. "Chemical vapor deposition of heterocyclic compounds over active carbon fiber to control its porosity and surface function." Langmuir 13.8 (1997): 2314-2317.*

Raymundo-Pinero, E., et al. "Structural characterization of N-containing activated carbon fibers prepared from a low softening point petroleum pitch and a melamine resin." Carbon 40.4 (2002): 597-608.*

Padak, Bihter, and Jennifer Wilcox. "Understanding mercury binding on activated carbon." Carbon 47.12 (2009): 2855-2864.*

Zheng, Yuanjing, et al. "Review of technologies for mercury removal from flue gas from cement production processes." Progress in Energy and Combustion Science 38.5 (2012): 599-629.*

Zhu, Jianzhong, John Yang, and Baolin Deng. "Enhanced mercury ion adsorption by amine-modified activated carbon." Journal of hazardous materials 166.2-3 (2009): 866-872.*

"European Application Serial No. 13719338.9, Notification Regarding Rule 164 and Article 94(3) EPC dated Apr. 24, 2017", 8 pgs.

"Chinese Application Serial No. 201480025701.9, Office Action dated Jul. 12, 2017", W/ English Translation, 8 pgs.

"European Application Serial No. 14711106.6, Response filed Aug. 17, 2017 to Communication Pursuant to Article 94(3) EPC dated Feb. 22, 2017", 10 pgs.

"U.S. Appl. No. 14/712,558, Final Office Action dated Dec. 6, 2017", 9 pgs.

"U.S. Appl. No. 14/712,558, Response filed Oct. 6, 2017 to Non Final Office Action dated Jul. 6, 2017", 12 pgs.

"U.S. Appl. No. 15/589,359, Preliminary Amendment filed Jan. 3, 2018", 6 pgs.

"Canadian Application Serial No. 2,871,422, Office Action dated Aug. 31, 2017", 4 pgs.

"Chinese Application Serial No. 201480025701.9, Response filed Sep. 15, 2017 to Office Action dated Jul. 12, 2017", w/ English Translation, 21 pgs.

"Response filed Sep. 4, 2017 to Notification Regarding Rule 164 and Article 94(3) EPC dated Apr. 24, 2017", 7 pgs.

"Canadian Application Serial No. 2,871,422, Response filed Feb. 26, 2018 to Office Action dated Aug. 31, 2017", w/ Amended Claims, 53 pgs.

"Chinese Application Serial No. 201480025701.9, Response filed Mar. 27, 2018 to Office Action dated Jan. 16, 2018", w/ English Claims, 20 pgs.

"U.S. Appl. No. 14/712,558, Examiner Interview Summary dated Mar. 5, 2018", 3 pgs.

"U.S. Appl. No. 14/712,558, Response filed Apr. 2, 2018 to Final Office Action dated Dec. 6, 2017", 7 pgs.

"U.S. Appl. No. 15/589,359, Non Final Office Action dated Feb. 21, 2018", 15 pgs.

"U.S. Appl. No. 14/712,558, Supplemental Amendment Filed May 15, 2018", 6 pgs.

"U.S. Appl. No. 15/974,343 Preliminary Amendment Filed May 15, 2018", 7 pgs.

"U.S. Appl. No. 15/978,760, Preliminary Amendment Filed May 15, 2018", 7 pgs.

"U.S. Appl. No. 15/295,594, Restriction Requirement dated May 22, 2018", 6 pgs.

"U.S. Appl. No. 15/295,594, Supplemental Amendment Filed May 15, 2018", 10 pgs.

"U.S. Appl. No. 15/589,359, Final Office Action dated Jun. 4, 2018", 13 pgs.

"U.S. Appl. No. 15/589,359, Response filed May 18, 2018 to Non Final Office Action dated Feb. 21, 2018", 14 pgs.

"U.S. Appl. No. 14/712,558, Advisory Action dated Feb. 12, 2018", 8 pgs.

"U.S. Appl. No. 14/712,558, Response filed Jan. 23, 2018 to Final Office Action dated Dec. 6, 2017", 13 pgs.

(56) References Cited

OTHER PUBLICATIONS

"U.S. Appl. No. 14./712,558, Supplemental Preliminary Amendment filed May 15, 2015", 6 pgs.
"Chinese Application Serial No. 201480025701.9, Office Action dated Jan. 16, 2018", (English Translation), 8 pgs.
"Canadian Application Serial No. 2,871,422, Office Action dated Apr. 24, 2018", 4 pgs.

* cited by examiner

SORBENT COMPRISING CARBON AND NITROGEN AND METHODS OF USING THE SAME

CROSS-REFERENCE TO RELATED APPLICATIONS

This application is a continuation-in-part of and claims the benefit of priority under 35 U.S.C. § 120 to U.S. Utility application Ser. No. 14/195,360, filed Mar. 3, 2014, which claims the benefit of priority under 35 U.S.C. § 119(e) to U.S. Provisional Patent Application Ser. No. 61/773,549, filed Mar. 6, 2013, the disclosures of which are incorporated herein in their entirety by reference.

BACKGROUND

Mercury (Hg) emissions have become a health and environmental concern because of their toxicity and ability to bioaccumulate. The U.S. Environmental Protection Agency (EPA) has issued regulations for the control of mercury emissions from waste-to-energy, cement production, and coal-fired power plants. Mercury in flue gas from industrial sources (e.g., power plants) can be captured by sorbents such as activated carbon, which can then be removed by particulate separation devices. The amount of standard sorbents (e.g., activated carbon) needed to serve the market is large. Standard sorbents are not always effective and become more expensive as larger amounts are used.

Inhibition of mercury capture from gas stream by carbon-based sorbents can occur when sulfur (VI) (e.g., $SO_3$, $H_2SO_4$) is present in the gas stream, with increasing inhibition at higher concentrations. Low sulfur coals when burned can produce $SO_3$ concentrations in the flue gas from 1-5 ppm, whereas high sulfur coals when burned can produce $SO_3$ concentrations in the flue gas in excess of 30 ppm. Mercury capture above sulfur (VI) concentrations of 3 ppm by mole is limited. Many utilities desire to operate $SO_3$ injection systems at a minimum of about 5-6 ppm to improve ash collectability. However, a sulfur (VI) concentration of about 6 ppm can diminish elemental mercury capture by about 25%-50% or more. With this reduction, it becomes difficult, if not impossible, to economically achieve desired mercury levels. The scientific understanding of why a severe inhibition of mercury sorption exists when sulfur (VI) concentrations increase by such a small amount is limited.

SUMMARY OF THE INVENTION

In various embodiments, the present invention provides a method of reducing the mercury content in a mercury-containing gas. The method includes contacting a mercury-containing gas with a sorbent including carbon and nitrogen, to form a mercury-sorbent composition. The method includes separating at least some of the mercury-sorbent composition from the mercury-containing gas, to give a separated gas.

In various embodiments, the present invention provides a method for reducing the mercury content of a mercury-containing gas. The method includes promoting at least a portion of an unpromoted sorbent comprising carbon and nitrogen by promoting (e.g., chemically reacting) the portion with a promoter to form a sorbent including carbon and nitrogen. The method includes contacting a mercury-containing gas with the sorbent, to form a mercury-sorbent composition. The method also includes separating at least some of the mercury-sorbent composition from the mercury-containing gas, to give a separated gas. The mercury-containing gas has a concentration of sulfur (VI) of about 1-2000 ppm by mole and a first quantity of the sorbent forms a mercury-sorbent composition at a first mercury capture rate. The first capture rate is higher than a mercury absorption rate of the first quantity of a corresponding sorbent including at least one of a) less or substantially no nitrogen, b) less or substantially no halide- or halogen-promotion, c) less or substantially no nitrogen layer structure including neutral and basic nitrogen atoms.

In various embodiments, the present invention provides a method of making a sorbent. The method includes promoting at least a portion of an unpromoted sorbent comprising nitrogen and carbon by contacting the portion with a promoter to form a promoted sorbent comprising carbon and nitrogen. The sorbent includes a graphene edge including an active site for mercury oxidation and nitrogen layer structure including neutral and basic nitrogen atoms proximate the active site, wherein the concentration of nitrogen in a surface layer of the sorbent is higher than the concentration of nitrogen in a core of the sorbent.

In various embodiments, the present invention provides a method of making a sorbent. The method includes contacting a carbonaceous material and a nitrogenous material, to provide an unpromoted sorbent including carbon and nitrogen. The method includes promoting at least a portion of the unpromoted sorbent by contacting the portion of the unpromoted sorbent with a promoter to form a sorbent including carbon and nitrogen. The concentration of nitrogen in the sorbent is higher than the concentration of nitrogen in the carbonaceous material. The sorbent includes a graphene edge including an active site for mercury oxidation and a nitrogen layer structure including neutral nitrogen atoms, basic nitrogen atoms, or a combination thereof, proximate the active site.

In various embodiments, the present invention provides a sorbent. The sorbent includes a promoted carbon including nitrogen in a surface layer thereof. The sorbent includes a graphene edge including an active site for mercury oxidation and a nitrogen layer structure including neutral and basic nitrogen atoms proximate the active site.

In various embodiments, the present invention provides a sorbent for use in mercury removal from a mercury-containing gas. The sorbent includes a halogen- or halide-promoted carbon including nitrogen in a surface layer. The sorbent includes a graphene edge including an active site for mercury oxidation and a nitrogen layer structure comprising cationic nitrogen atoms, neutral nitrogen atoms, or a combination thereof proximate the active site. The nitrogen layer structure is sufficient to at least one of a) decrease neutralization by $H_2SO_4$ or $SO_3$ of carbocations in the sorbent, as compared to a corresponding sorbent including less or substantially no nitrogen layer structure including cationic nitrogen atoms, neutral nitrogen atoms, or a combination thereof under substantially similar conditions, and b) at least partially block carbocations (e.g., edge carbons) in the sorbent from forming bonds with $H_2SO_4$ or $SO_3$, as compared to a corresponding sorbent including less or substantially no nitrogen layer structure including cationic nitrogen atoms, neutral nitrogen atoms, or a combination thereof under substantially similar conditions.

Various embodiments of the present invention provide certain advantages over other sorbents, such as carbon-based sorbents, and methods of using the same, at least some of which are unexpected. In some embodiments, the sorbent of the present invention can separate mercury from a gas that includes that material more efficiently than other methods. In various embodiments, mercury removal efficiencies of the sorbent of the present invention exceed or match that of conventional methods with added benefits such as reduced costs. The method and materials of various embodiments of the present invention can operate more efficiently than other methods of mercury removal. In some embodiments, the method and materials of various embodiments can remove a given amount of mercury for a smaller amount of financial expenditure, as compared to other methods. For example, the method and materials of various embodiments can remove a larger amount of mercury for a given mass of carbon, as compared to other methods of removing mercury, including as compared to other methods of removing mercury that include a carbon sorbent, noncarbon sorbent, or a sorbent that includes a mixture of carbon and noncarbon materials.

For example, in some embodiments, a given mass of the sorbent of the present invention can capture mercury from a mercury-containing gas stream including sulfur (VI) (e.g., $SO_3$, $H_2SO_4$, or the like), such as greater than about 1 ppm sulfur (VI), such as about 1-3 ppm sulfur (VI), about 1-200 ppm sulfur (VI), 1-1000 ppm sulfur (VI), or about 1-10 ppm sulfur (VI), at a higher rate than the same mass of a corresponding sorbent including less or no nitrogen, such as a lower concentration of nitrogen or no nitrogen in a corresponding surface layer, or such as less or no nitrogen layer structure including cationic nitrogen atoms, neutral nitrogen atoms, or a combination thereof. In some embodiments, carbocations in the sorbent of the present invention are neutralized less by $SO_3$ (e.g., from $SO_3$ or and ions derived therefrom such as $SO_3^{2-}$ or $HSO_3^{1-}$), than other sorbents, such as other sorbents including less or substantially no nitrogen in a corresponding surface layer, or such as having less or no nitrogen layer structure including cationic nitrogen atoms, neutral nitrogen atoms, or a combination thereof. In some embodiments, carbocations (e.g., edge carbons) in the sorbent of the present invention are at least partially blocked from $SO_3$ or ions derived therefrom, more than in other sorbents, such as in other sorbents including less or substantially no nitrogen in a corresponding surface layer, or such as including less or no nitrogen layer structure including cationic nitrogen atoms, neutral nitrogen atoms, or a combination thereof.

In some embodiments, the sorbent of the present invention can be regenerated and reused, reducing disposal of spent sorbents and decreasing the cost of mercury removal.

In some embodiments, preparation or promotion of the sorbent of the present invention can occur on site. In some embodiments, onsite preparation and promotion (e.g., in the furnace, in the mercury-containing gas, in the injection/transport system, or a combination thereof) of the sorbent provides certain advantages. For example, the treatment system can be combined with the carbon (or sorbent) injection system at the end-use site. With this technique, the halogen/halide precursor and/or promoter is introduced to the carbon-air (or other gas, such as a combustion or gasification gas) mixture in a transport line (or other part of the sorbent storage and injection system) or mercury-containing gas, or prepared in-flight in the mercury-containing gas. In some embodiments, the nitrogen layer structure surface layer can be prepared in-flight (e.g., in transport line, in the mercury-containing gas, or combinations thereof) with the introduction of a nitrogen precursor and/or promoter. In some embodiments, this can provide benefits over current conventional concepts for treating sorbents off-site such as: capital equipment costs at a treatment facility are eliminated; costs to operate the treatment facility are eliminated; there are no costs for transporting carbon and additive to a treatment facility; the inventive process uses existing hardware and operation procedures; the inventive technology ensures that the sorbent is always fresh, and thus, more reactive; no new handling concerns are introduced; there are no costs for removing carbon from treatment system; the inventive process allows rapid on-site tailoring of additive-sorbent ratios in order to match the requirements of flue gas changes, such as may be needed when changing fuels or reducing loads, thus further optimizing the economics; the inventive technology reduces the amount of spent sorbents that are disposed; or a combination thereof.

In some embodiments, counter to traditional teachings that inorganic components can hinder sorption of mercury on carbon-based sorbent, an inorganic matrix in the sorbent can enhance the sorption of mercury in the sorbent of the present invention, such as on a proximate and oxidatively reactive carbon graphene layer. In various embodiments, an inorganic matrix can help promote the development of highly charged cationic sites on the proximate graphene carbon structures which can oxidize mercury. In some embodiments that include an inorganic matrix wherein the sorbent is promoted via a hydrogen halide promoter or promoter precursor compound (e.g., obtained from degradation or reaction of the corresponding ammonium halide), another advantageous role for the inorganic portion can be in providing a binding site for the ammonia that is released from either the decomposition or reaction of the ammonium salt. The bound ammonia can form a complex with basic character that can react with $SO_2$ or $SO_3$ in the mercury-containing gas and can prevent their interference with the sorption of mercury in or near active sites on the sorbent.

In various embodiments, the sorbent of the present invention addresses the severe issue of $SO_3$ and $H_2SO_4$ poisoning during Hg control using activated carbon. In various embodiments, the sorbent includes a nitrogen layer structure including cationic nitrogen atoms, neutral nitrogen atoms, or a combination thereof that intercepts $SO_3$ and $H_2SO_4$ for Hg control in flue gas. In various embodiments, the nitrogen layer structure including cationic nitrogen atoms, neutral nitrogen atoms, or a combination thereof can alter the charge distribution in an edge structure of the activated site and thereby improve its reactivity for Hg oxidation.

In some embodiments, the sorbent of the present invention removed mercury more effectively when used in a scrubber, aqueous environment, or is removed using an electrostatic precipitator.

BRIEF DESCRIPTION OF THE FIGURES

The drawings illustrate generally, by way of example, but not by way of limitation, various embodiments of the present invention.

DETAILED DESCRIPTION OF THE INVENTION

Figure 1:
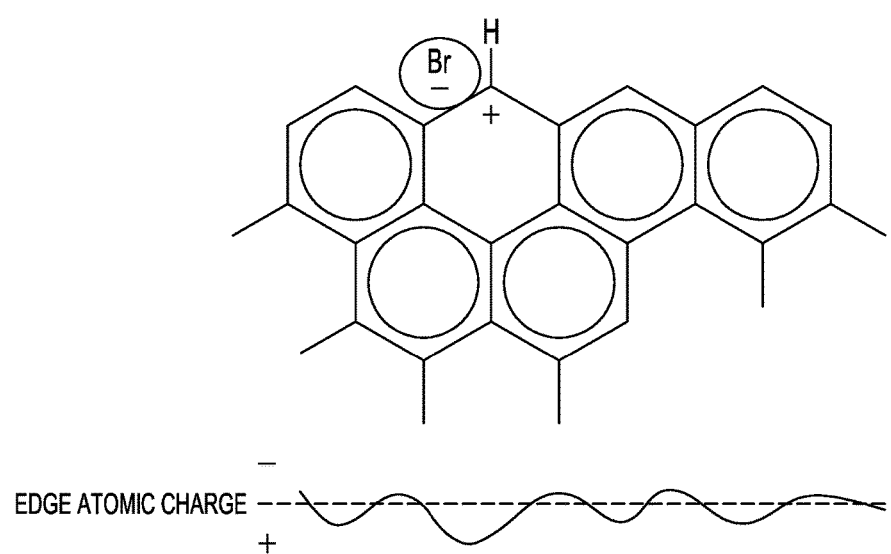
FIG. 1 illustrates a promoted active site on a graphene edge of a sorbent shown without an N-lattice, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less.

The term "solvent" as used herein refers to a liquid that can dissolve a solid, liquid, or gas. Non-limiting examples of solvents are silicones, organic compounds, water, alcohols, ionic liquids, and supercritical fluids.

The term "air" as used herein refers to a mixture of gases with a composition approximately identical to the native composition of gases taken from the atmosphere, generally at ground level. In some examples, air is taken from the ambient surroundings. Air has a composition that includes approximately 78% nitrogen, 21% oxygen, 1% argon, and 0.04% carbon dioxide, as well as small amounts of other gases.

The term "flue gas" as used herein refers to a gas mixture resulting from the combustion or gasification of fossil fuels, and can optionally include air.

The term "room temperature" as used herein refers to a temperature of about 15° C. to 28° C.

As used herein, "mineral" refers to a naturally occurring solid chemical substance formed through biogeochemical processes, having, for example, characteristic chemical composition, highly ordered atomic structure, and specific physical properties.

In various embodiments, the present invention provides a sorbent and associated method for reduction of mercury content for use in combustion systems that have inherently high levels of sulfur (VI) (e.g., as $SO_3$, or related compounds that can be derived therefrom such as $H_2SO_4$ or other sulfates) in the flue gas and for use in plants that use $SO_3$ injection for ash conditioning for improved ash collection. The method can obtain high mercury capture rates in a high sulfur (VI)-content flue gas by, in some examples, overcoming the kinetic and equilibrium effects that can inhibit mercury capture in high $SO_3$ or high-sulfate (e.g., high sulfur (VI)) systems. The concentration of nitrogen in a surface layer of the sorbent can be higher than the concentration of nitrogen in a core of the sorbent. In some embodiments, the sorbent can be promoted. The nitrogen in the surface layer can form a lattice (e.g., a nitrogen layer structure, or a nitrogen lattice).

In various embodiments, the sorbent and associated method can be effective for removal of elemental mercury vapor in an air or flue gas stream at moderate temperatures (e.g., about 25-330° C., or about 50-500° C.). In some examples, the sorbent is not impregnated with sulfur or metal halides, which can be unstable at higher temperatures.

In some embodiments, the removal process does not involve adsorption of the elemental mercury like that occurring at low temperatures, but can involve the catalyzed reaction of mercury with an oxidant to form a captured mercury, wherein the mercury can be released via, e.g., reaction with acid, to provide a mercury (II) species such as mercury sulfate, mercury bromide, or mercury chloride. The ionic mercury (II) form can be an oxide or salt of an optional acid used in the process (such as iodide, or sulfate from sulfuric acid), which can have lower volatility. The sorbent can exhibit a high rate of oxidative catalytic activity due to, for example, numerous active catalytic sites and, at the same time, possess a large surface area to capture the mercury (e.g., in the form of an oxidized mercury compound) and thus rapidly generate the converted mercury (II) compound. The sorbent can include a nitrogen layer structure that includes cationic nitrogen atoms, neutral nitrogen atoms, or a combination thereof.

The nitrogen in the sorbent can have any suitable concentration with respect to the fuel (e.g., coal), such as for an embodiment wherein the sorbent is combined with the fuel. For example, the method can include using sufficient sorbent with respect to the amount of fuel such that the concentration of the nitrogen is about 1 ppm to about 2,000 ppm by weight of the fuel, or about 1 ppm to about 300 ppm, about 1 ppm to about 50 ppm, about 1 ppm to about 30 ppm, about 1 ppm to about 10 ppm, or about 1 ppm or less, or less than, equal to, or greater than about 2 ppm, 3, 4, 5, 6, 7, 8, 9, 10, 12, 14, 16, 18, 20, 22, 24, 26, 28, 30, 35, 40, 45, 50, 55, 60, 65, 70, 75, 80, 85, 90, 95, 100, 125, 150, 175, 200, 225, 250, 275, 300, 400, 500, 600, 800, 1,000, 1,500, or about 2,000 ppm or more.

Sorbent Including Carbon and Nitrogen.

In various embodiments, the present invention provides a sorbent including carbon and nitrogen. The sorbent can be halogen- or halide-promoted; in other embodiments, the sorbent is not promoted. In some examples, the sorbent can include an inorganic matrix (e.g., as a support, as a functioning part of the sorbent, or a combination thereof). In some embodiments, the sorbent including carbon and nitrogen can be an activated carbon sorbent including nitrogen, such as an activated carbon having a nitrogen layer structure in a surface layer thereof, the nitrogen layer structure including cationic nitrogen atoms, neutral (e.g., basic) nitrogen atoms, or a combination thereof.

The sorbent can include a base layer (e.g., core) of carbon (e.g., activated carbon including graphene) covered to a large extent by a second layer (e.g., surface layer) of a nitrogen layer structure (e.g., nitrogen lattice) including cationic nitrogen atoms, neutral nitrogen atoms, or a combination thereof that is porous to mercury or other pollutant gases but reacts with acid gases (e.g., $SO_3$, $H_2SO_4$, and the like) and is therefore protective in nature for the active sites located on carbon part of the sorbent. In various embodiments, the protective layer can be only a few molecules thick, such that the sorbent is primarily (e.g., over 50 wt %) carbon.

The concentration of nitrogen in a surface layer of the sorbent can be at least one of 1) higher than the concentration of nitrogen in a core of the sorbent and 2) higher than the concentration of nitrogen in the carbon material from which the sorbent was derived. The surface layer can be continuous (e.g., unbroken, with minimal or no gaps) or non-continuous. The surface layer can be at the outer surface of the sorbent. The surface layer can have any suitable thickness. The surface layer can have a variable thickness, or can have a substantially consistent thickness. The surface layer can be porous to mercury atoms. The surface layer can be porous to the promoter. In some embodiments, the surface layer can have a thickness of about 0.000,001% to about 99.99% of the largest dimension of the sorbent, 0.001% to 99%, 0.001% to about 50%, 1% to about 50%, 0.1% to 25%, or about 25% to 50% of the largest dimension of the sorbent.

In some embodiments, the sorbent can include about 1.001 times higher nitrogen concentration in the surface layer than in the core or less, or less than, equal to, or greater than about 1.01, 1.1, 1.2, 1.4, 1.6, 1.8, 2, 3, 4, 5, 6, 7, 8, 9, 10, 15, 20, 50, 100, or about 1000 times higher nitrogen concentration in the surface layer than in the core. In some embodiments, the concentration of nitrogen in the surface layer can be about 0.000,001 wt % or less, or less than, equal to, or greater than about 0.001 wt %, 0.01 wt %, 0.1 wt %, 1 wt %, 2 wt %, 3 wt %, 4 wt %, 5 wt %, 10 wt %, 15 wt %, 20 wt %, 30 wt %, 40 wt %, 50 wt %, 60 wt %, 70 wt %, 80 wt %, or about 90 wt % or more nitrogen. In some examples, the concentration of nitrogen in the surface layer can be about 0.001 wt % to about 99 wt % nitrogen, about 5 wt % to about 80 wt %, about 5 wt % to about 60 wt %, or about 0.1 wt % to about 10 wt %. In various embodiments, the concentration of nitrogen in the core can be about 0 wt %, 0.000,001 wt %, or less than, equal to, or greater than about 0.001 wt %, 0.01 wt %, 0.1 wt %, 1 wt %, 2 wt %, 3 wt %, 4 wt %, 5 wt %, 10 wt %, 15 wt %, 20 wt %, 50 wt %, or 90 wt % or more. In some examples, the concentration of nitrogen in the core can be about 0.001 wt %-99 wt % nitrogen, 0.1 wt %-20 wt %, or about 1 wt %-6 wt %.

Any suitable proportion of the sorbent including carbon and nitrogen can be carbon (e.g., carbon atoms). For example, the sorbent can be about 10 wt % to about 99.999 wt % carbon, about 50 wt % to about 99.999 wt %, or about 80 wt % to about 99.999 wt %, or about 50 wt % or less, or less than, equal to, or greater than about 52 wt %, 54, 56, 58, 60, 62, 64, 66, 68, 70, 72, 74, 76, 78, 80, 82, 84, 86, 88, 90, 91, 92, 93, 94, 95, 96, 97, 98, 99, 99.99 wt %, or about 99.999 wt % or more.

Any suitable proportion of the sorbent including carbon and nitrogen can be nitrogen (e.g., nitrogen atoms). For example, the sorbent can be about 0.001 wt % to about 90 wt % nitrogen, about 0.001 wt % to about 80 wt %, about 0.001 wt % to about 50 wt %, about 0.001 wt % to about 20 wt %, about 0.1 wt % to about 10 wt %, or about 0.001 wt % or less, or less than, equal to, or greater than about 0.01 wt %, 0.1, 1, 2, 3, 4, 5, 6, 7, 8, 9, 10, 12, 14, 16, 18, 20, 22, 24, 26, 28, 30, 32, 34, 36, 38, 40, 42, 44, 46, 48, or about 50 wt % or more.

The sorbent can include a graphene edge including an active site for mercury oxidation and a nitrogen layer structure including cationic nitrogen atoms, neutral nitrogen atoms, or a combination thereof, the nitrogen layer structure being proximate the active site. The graphene edge is part of the carbon in the sorbent. Some or all of the nitrogen in the sorbent or the surface layer thereof can be a part of the nitrogen layer structure. The basic nitrogen atoms in the nitrogen layer structure can react with acid gases (e.g., $SO_3$, $H_2SO_4$, and the like) in the mercury-containing gas, at least partially preventing them from reacting with the active site. The cationic nitrogen atoms in the nitrogen layer structure can polarize an electron field in the graphene edge thereby increasing oxidation potential (e.g., mercury oxidation potential) of the active site.

The nitrogen layer structure (e.g., nitrogen lattice) can be a structure comprising cationic nitrogen atoms and neutral nitrogen atoms, optionally including negatively charged atoms, and that is permeable to gaseous pollutants, such as mercury, and surrounds, covers, or is near to the active site (e.g., oxidation site) on the graphene edge structure. The nitrogen layer structure may be attached in some fashion (e.g., via bonds or electrostatic attraction) to the sorbent surface, but is not identical to the carbon surface structure. The nitrogen layer structure can be a structure where a portion of the total nitrogen includes nitrogen cations (nitrogen bearing a positive charge) owing to tetravalent valency, with nitrogen bonded to 4 other atoms as with an ammonium ion (typically formed from an amine or ammonia) or nitrogen bonded to 3 other atoms but possessing a double bond as an the imminium ion (typically formed from a heterocyclic). Both cationic nitrogen atoms, neutral nitrogen atoms, or a combination thereof in the nitrogen layer structure can contribute to enhanced activity for mercury capture by both capturing $SO_3$ and its products $H_2SO_4$ and $HSO_4$, which are detrimental to Hg capture, within the nitrogen layer structure, and increasing the electron accepting character (oxidation potential) of the proximate active oxidation site in the graphene layer of the sorbent.

The active site can include a promoted carbene edge carbon that has reacted with a promoter. The promoter can be any suitable promoter described herein, such as HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$, $FeI_x$ (x=1, 2, 3, or 4), $FeBr_y$ (y=1, 2, 3, or 4), $FeCl_z$ (z=1, 2, 3, or 4), $MnBr_2$, $MnCl_2$, $NiBr_2$, $NiCl_2$, $NiI_2$, $ZnBr_2$, $ZnCl_2$, $ZnI_2$, $NH_4Br$, $NH_4Cl$, $NH_4I$, $NH_4F$, $(NH_4)_2SO_4$, $H_2SO_4$, $NH_4SO_4H$, $(NH_4)_2S_2O_3$, $FeNH_4(SO_4)_2$, $Fe(NH_4)_2(SO_4)_2$, $FeNH_4Br_4$, $FeNH_4Cl_4$, $AlNH_4(SO_4)_2$, hydrates thereof, or a combination thereof. The promoter can be formed from a promoter precursor, such as any suitable precursor that can form a promoter described herein. The promoter precursor can be an elemental halogen, a Group V halide, a Group VI halide, a hydrohalide, an ammonium halide, a metal halide, a nonmetal halide, an alkali earth metal halide, an alkaline earth metal halide, or a combination thereof. The promoter precursor can be NaBr, NaCl, NaI, $Br^-$, $Cl^-$, $I^-$, KI, KCl, LiCl, LiBr, $CuCl_2$, $CuBr_2$, AgCl, AgBr, $CHI_3$, $CH_3Br$, AuBr, $FeI_x$ (x=1, 2, 3, or 4), $FeBr_y$ (y=1, 2, 3, or 4), $FeCl_z$ (z=1, 2, 3, or 4), $MgBr_2$, $MgCl_2$, $MnBr_2$, $MnCl_2$, $NiBr_2$, $NiCl_2$, $NiI_2$, $ZnBr_2$, $ZnCl_2$, $ZnI_2$, $CaI_2$, $CaBr_2$, $CaCl_2$, $FeNH_4(SO_4)_2$, $Fe(NH_4)_2(SO_4)_2$, $FeNH_4Br_4$, $FeNH_4Cl_4$, $AlNH_4(SO_4)_2$, hydrates thereof, or a combination thereof. The promoter, or the reaction product of the promoter with the sorbent, can be any suitable proportion of the promoted sorbent, such as about 0.001 wt % to about 50 wt %, or about 0.001 wt % to about 10 wt %, or about 0.001 wt % or less, or less than, equal to, or greater than about 0.01 wt %, 0.1, 1, 2, 3, 4, 5, 6, 7, 8, 9, 10, 12, 14, 16, 18, 20, 25, 30, 35, 40, 45, or about 50 wt % or more.

The active site (e.g., carbene edge carbon) can react with the promoter in a flue gas, such as the mercury containing gas. The promotion can occur at elevated temperature. In some embodiments, the promoter, the promoter precursor, or a combination thereof, is added to a fuel or to a furnace which forms the mercury-containing gas (e.g., flue gas), to the mercury-containing gas, or to a transport line that supplies the sorbent to the furnace or to the mercury-containing gas, or a combination thereof. The promoter, promoter precursor, or combination thereof, can be used in any suitable weight ratio with respect to the unpromoted sorbent, such as about 1000:1 or more, or less than, greater than, or equal to about 100:1, 50:1, 20:1, 10:1, 5:1, 4:1, 3:1, 2:1, 1:1, 1:2, 1:3, 1:4, 1:5, 1:10, 1:20, 1:50, 1:100, or about 1:1000 or less.

The nitrogen layer structure can be formed at any suitable time relative to the mercury sorbtion. The nitrogen layer structure can be formed in the mercury-containing gas (e.g., flue gas). The nitrogen layer structure can be formed on the carbon prior to injecting the sorbent into the mercury-containing gas, such as onsite (e.g., proximate to boiler or within the facility) or offsite (away from the boiler or at a different facility).

The nitrogen layer structure can include an organonitrogen lattice, an inorganic ammonium lattice, or a combination thereof. An organonitrogen lattice can be a structure including nitrogen atoms covalently bonded to carbon and hydrogen atoms. The organinitrogen lattice can be a structure including a grid or mesh of decomposed precursor materials (e.g., decomposed nitrogen-containing polymers) holes therein, as in a lattice of branches in a thatch. The organonitrogen lattice can be formed by thermal treatment of a precursor nitrogen compound. The organonitrogen lattice can be formed by polymerization of unsaturated nitrogen compounds or copolymerization of amines with carbohydrate materials under thermal treatment. An ammonium lattice can include a plurality of ammonium ions without organic groups bonding the ammonium ions to one another. An ammonium salt lattice can include a regular structure of the ammonium ions in the lattice.

The sorbent, carbon in the sorbent, or a combination thereof, can be in any suitable form. For example, the sorbent or carbon can be a monolithic structure, or can be granular, such as a particles or a powder. The sorbent or carbon can have any suitable shape, such as spherical or irregular. The sorbent or carbon can have an average diameter of about 0.1 nm or less, or less than, equal to, or greater than about 1 nm, 10 nm, 100 nm, 1 µm, 10 µm, 100 µm, 1 mm, 10 mm, or about 100 mm or more. In some examples, the sorbent or carbon has a diameter of about 0.01 µm or less, or less than, equal to, or greater than about 0.1 µm, 1 µm, 2 µm, 3 µm, 4 µm, 5 µm, 10 µm, 20 µm, 30 µm, 40 µm, 50 µm, 60 µm, 70 µm, 80 µm, 90 µm, 100 µm, 1000 µm or more. In some examples, the diameter of the sorbent or carbon is about 0.1 µm to about 1000 µm, about 1 µm to about 100 µm, about 1 µm to about 30 µm, about 1 mm to about 1000 mm, about 10 mm to about 100 mm, about 100 mm to about 500 mm, or about 1000 mm or more. If a carbon particle or sorbent particle is non-spherical, the diameter can be estimated as the longest dimension of the particle. The absorption capacity of the sorbent can be about 0.000,1 mg mercury per gram of sorbent or less, or less than, equal to, or greater than about 0.001 mg/g, 0.01, 0.1, 1, 2, 3, 4, 5, 10, 15, 20, 25, 30, 35, 40, 45, 50, 55, 60, 65, 70, 75, 80, 85, 90, 95, 100, 110, 120, 150, 200, 300, 400, 500, 750, or about 1 g mercury per gram of sorbent or more.

In some embodiments, at least some of the carbon in the sorbent is in the graphene form of carbon. The graphene form of carbon can, in some embodiments, include higher concentrations of locations suitable as active sites. In some examples, certain parts of graphene carbon can have the highest concentrations of locations suitable as active sites: in some examples at the edges, in some examples in non-edge locations. Such locations suitable as active sites may be activated via treatment with halide or halogen, as described herein. In various embodiments, the carbon in the sorbent can be less than, equal to, or greater than about 1 wt %, 2 wt %, 3 wt %, 4 wt %, 5 wt %, 10 wt %, 20 wt %, 30 wt %, 40 wt %, 50 wt %, 60 wt %, 70 wt %, 80 wt %, 90 wt %, 95 wt %, 96 wt %, 97 wt %, 98 wt %, 99 wt %, 99.9 wt %, 99.99 wt %, or more than about 99.999 wt % graphene form of carbon.

In some embodiments, the nitrogen is substantially homogenously distributed throughout the sorbent. In some embodiments, the nitrogen is substantially homogenously distributed in the core of the sorbent; in other embodiments, the nitrogen can have any suitable distribution in the core. In some embodiments, the nitrogen is substantially homogenously distributed in the surface layer of the sorbent. In some embodiments, the nitrogen in the surface layer is not homogeneously distributed; e.g., the nitrogen can have a gradient with the highest concentration at the outside of the surface layer and a lower concentration at an inside of the surface layer.

The nitrogen can be in any suitable form on and within the sorbent. In some examples, the nitrogen can be a nitrogen atom bound to one or more hydrogen atoms or one or more other atoms that are, for example, carbon-containing groups that are part of the carbon framework (e.g., an activated carbon backbone or appendages thereof), or to an organic group. In some examples, for example, the nitrogen can be neutral or can bear a positive charge (e.g., ammonium) or a negative charge. The nitrogen can have any suitable oxidation state, for example zero or one. The nitrogen can be bound to 4, 3, 2, 1, or zero hydrogen atoms. The nitrogen can be bound to one or more carbon frameworks at zero, 1, 2, 3, or 4 locations. In some embodiments, the nitrogen can include one or two double bonds or one triple bond to the carbon framework of the carbon or to other functional groups, such that the nitrogen is bound to 1, 2, or 3 carbon atoms.

The nitrogen in the sorbent can be derived from any nitrogen-containing compound, such as a nitrogen-containing organic or inorganic compound, such as by pyrolysis or carbonization. In some examples, the nitrogen is derived from or part of any nitrogen-containing heterocycle, or from any other nitrogen-containing compound. For example, the nitrogen can be derived from indole, quinoxaline, carbazole, isoquinoline, piperazine, quinolone, quinoxaline, diazabicyclooctane, polyacrylonitrile, polyvinylpyrrolidone, vinylpyrrolidone-vinyl acetate copolymer, vinylpyrrolidone-acrylic acid copolymer, vinylpyrrolidone-maleic acid copolymer, polyethylenimine, an amine, an amino acid (e.g., alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, or valine), analine, nitrobenzene, hydroxylamine, urea, hydrazine, sulfamic acid, nitriles, carbamates, isocyanates, urethanes, or a combination thereof. In some examples, the nitrogen in the sorbent can be derived from or part of a nitrogen-containing inorganic compound, such as ammonia, ammonium bromide, ammonium chloride, nitric acid, nitrous acid, nitrogen dioxide, compounds including $NO_3$, compounds including $NO_2$, and the like. The nitrogen-containing inorganic compound can be such as an ammonium halide, a methylammonium halide, an ammonium salt of an oxyacid of a Group VI element, an ammonium salt of an oxyacid of a Group V element, or a combination thereof. The nitrogen-containing inorganic compound can be ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, sodium nitrite, sodium nitrate, lithium nitrite, lithium nitrate, barium nitrite, barium nitrate, cerium nitrite, cerium nitrate, $FeNH_4(SO_4)_2$, $Fe(NH_4)_2(SO_4)_2$, $FeNH_4Br_4$, $FeNH_4Cl_4$, $AlNH_4(SO_4)_2$, hydrates thereof, or a combination thereof. The nitrogen-containing inorganic compound can be ammonium sulfate $((NH_4)_2SO_4)$, ammonium bromide ($NH_4Br$), ammonium iodide ($NH_4I$), ammonium chloride ($NH_4Cl$), ammonium fluoride ($NH_4F$), ammonium thiosulfate ($(NH_4)_2S_2O_3$), ammonium bisulfate ($NH_4SO_4H$), or a combination thereof.

In various embodiments, the sorbent can capture mercury at a higher rate in a given concentration of sulfur (VI) than other sorbents. In some examples, a first quantity of the sorbent forms a mercury-sorbent composition at a first mercury capture rate in a gas composition including mercury wherein the concentration of sulfur (VI) in the gas composition is about 1-2000 ppm by mole, where the first capture rate is higher than a mercury absorption rate of the first quantity of a corresponding sorbent including at least one of a) less (e.g., lower concentration) or substantially no nitrogen in a corresponding surface layer, b) less or substantially no halide- or halogen-promotion, c) less or substantially no inorganic matrix therein, and d) less or no nitrogen layer structure including cationic nitrogen atoms, neutral nitrogen atoms, or a combination thereof.

In some embodiments, addition of acid or acidic materials to the carbon improves the performance. In various embodiments, acid or acidic materials can be added prior to the use of the carbon by impregnating an acidic solution into the carbon, or can be added as a solution or gas to the sorbent bed during use. The modified carbon can be impregnated with an acidic material, such as about 1 wt % or less, or less than, equal to, or greater than about 2 wt %, 3, 4, 5, 6, 7, 8, 9, 10, 15, or about 20 wt % or more or acidic material, such as HBr, HCl, $H_2SO_4$, and the like, either introduced directly or formed from precursor materials.

Method of Reducing Mercury Content in a Mercury-Containing Gas.

In various embodiments, the present invention provides a method of reducing the mercury content in a mercury-containing gas. The method includes contacting a mercury-containing gas with any embodiment of the sorbent including carbon and nitrogen described herein to remove mercury from the mercury-containing gas.

The method of reducing mercury content in a mercury-containing gas can include contacting a mercury-containing gas with a sorbent including carbon and nitrogen, to form a mercury-sorbent composition. The method can include separating at least some of the mercury-sorbent composition from the mercury-containing gas, to give a separated gas.

The method of reducing mercury content in a mercury-containing gas can include promoting at least a portion of a sorbent including carbon and nitrogen by promoting (e.g., chemically reacting) the portion with a promoter to form a promoted sorbent including carbon and nitrogen. The method can include contacting a mercury-containing gas with the sorbent, to form a mercury-sorbent composition. The method can also include separating at least some of the mercury-sorbent composition from the mercury-containing gas, to give a separated gas. The mercury-containing gas can have a concentration of sulfur (VI) of about 1-2000 ppm by mole and a first quantity of the sorbent forms a mercury-sorbent composition at a first mercury capture rate. The first capture rate can be higher than a mercury absorption rate of the first quantity of a corresponding sorbent including at least one of a) less or substantially no nitrogen, b) less or substantially no halide- or halogen-promotion, c) less or no nitrogen layer structure including cationic and basic nitrogen atoms.

In various embodiments, the present invention provides a method of using the sorbent including carbon and nitrogen. The method can be any suitable method. For example, some embodiments provide a method of reducing the mercury content in a mercury-containing gas. In some examples, the mercury-containing gas can include at least some oxygen. The method can include obtaining or providing a sorbent including carbon and including nitrogen in a surface layer thereof. In some embodiments, the concentration of nitrogen in a surface layer of the sorbent can be higher than the concentration of nitrogen in a core of the sorbent. The sorbent can be any sorbent including carbon and nitrogen described herein. In some examples, the sorbent including carbon and nitrogen can be a promoted sorbent including carbon and nitrogen. In some examples, the sorbent including nitrogen can include an inorganic matrix or can be a composite (e.g., nanocomposite, such as a multiphase solid material in which one of the phases has at least one dimension of less than about 1000 nm or in which less than an about 1000 nm repeat distance separates the phases that make up the material) sorbent including carbon and nitrogen. In some examples, the sorbent including carbon and nitrogen can any suitable combination of two or more of promoted, including an inorganic matrix, and a composite (e.g., nanocomposite). In some embodiments, the sorbent can be promoted but include no inorganic matrix. In some embodiments, the sorbent can be neither promoted nor include an inorganic matrix. The sorbent can include active sites that can bind with at least one of the mercury in the mercury-containing gas and an oxidized species of the mercury, to form the mercury-sorbent composition. At least a portion of the active sites in the sorbent can react with at least one of the mercury and an oxidized species of the mercury, to form the mercury-sorbent composition.

The method of reducing the mercury content in a mercury-containing gas can include contacting a mercury-containing gas with the sorbent. The contacting forms a mercury-sorbent composition. The contacting can be any suitable contacting. In some embodiments, contacting the mercury-containing gas with the sorbent can include adding or injecting the sorbent into the mercury containing gas. For example, the contacting can occur in the gas. In another embodiment, the contacting can occur in an aqueous liquid. In another example, the contacting can occur in the gas, and subsequently contacting can also occur in an aqueous phase such as a scrubber.

In some embodiments, during the contacting of the mercury-containing gas with the sorbent, the sorbent can be in any suitable configuration such that it contacts the mercury-containing gas. The sorbent can be static (e.g., catalyst, honeycomb, porous block/substrate, and the like) or moving (e.g., bed of material, traveling filter with coated/embedded sorbent, and the like) with respect to the mercury containing gas. For example, during the contacting, the sorbent can be at least one of in a fixed structure such as a fixed bed, in a moving structure such as a moving bed, in a scrubber, in a filter (e.g., a fixed filter or a travelling/moving filter) or suspended in the mercury-containing gas.

The mercury-sorbent composition can be any suitable composition including the mercury in the form of elemental mercury or as an oxidized or otherwise chemically transformed form of the mercury and the sorbent. In some embodiments, mercury is captured in its elemental form by the sorbent; the mercury-sorbent composition can include the sorbent and the elemental form of mercury. In some embodiments, mercury is captured in its non-elemental form by the sorbent; the mercury-sorbent composition can include the sorbent and the non-elemental form of the mercury. In some embodiments, the mercury is converted to an oxidized mercury form, via gas-phase chemical reaction with a promoter or promoter precursor, and is captured by the sorbent; the mercury-sorbent composition can include the sorbent and the oxidized form of the mercury. In some embodiments, the mercury is converted by the sorbent via a chemical reaction, such as oxidation, to an oxidized mercury form, and is captured by the sorbent; the mercury-sorbent composition can include the sorbent and the oxidized form of mercury. In some embodiments, the mercury is converted by the sorbent via a chemical reaction, such as oxidation, such that the mercury from the gas is captured, such as transformed into an organomercury compound including the carbon framework (of the carbon in the sorbent) bound to mercury, which can be released as a mercury (II) compound upon reaction with a suitable acid to generate the salt thereof. In some embodiments, the mercury-sorbent composition can include at least one of (e.g., the captured mercury can be in any of the following forms) elemental mercury, oxidized mercury, organomercury compound, and Hg(II) compounds.

In some examples, elemental mercury, oxidized mercury, or transformed mercury can remain sorbed to the sorbent until the mercury-sorbent composition has been removed in a later separation step. For example, elemental mercury, oxidized mercury, or transformed mercury can be sorbed, or reacted and sorbed, into or onto the sorbent composition, such that after separating the mercury-sorbent composition from the mercury-containing gas, the separated gas has about 1% or less, or less than, equal to, or greater than about 3%, 5%, 10%, 20%, 30%, 40%, 50%, 60%, 70%, 80%, 90%, 95%, 96%, 97%, 98%, 99%, 99.9%, 99.99%, or about 99.999% or more of the mercury that was originally present in the mercury-containing gas. In some embodiments, elemental mercury, oxidized mercury, or transformed mercury can be released from the mercury-sorbent composition; for example, less than, equal to, or greater than about 1 wt %, 3 wt %, 5 wt %, 10 wt %, 20 wt %, 30 wt %, 40 wt %, 50 wt %, 60 wt %, 70 wt %, 80 wt %, 90 wt %, 95 wt %, or less than about 99 wt % of the mercury can be released from the mercury-sorbent composition prior to separation of the mercury-sorbent composition from the gas. In some examples, the majority of captured elemental, oxidized mercury, or transformed mercury can remain part of the mercury-sorbent composition until the mercury-sorbent composition is removed in a later separation step. In some examples, elemental mercury, oxidized mercury, transformed mercury that is released from the mercury-sorbent composition can be later removed from the gas via the separation step or another step. In some examples, elemental mercury, oxidized mercury, or transformed mercury that has been released from the mercury-sorbent composition can contact the sorbent to form a mercury-sorbent composition, to be removed later via the separation step.

The method of reducing the mercury content in a mercury-containing gas can include separating at least some of the mercury-sorbent composition from the mercury-containing gas, to give separated gas. In some embodiments, separating at least some of the mercury-sorbent composition from the mercury containing gas includes separating in a particulate separator. The particulate separator can be any suitable particulate separator, such as a sorbent separator (e.g., a particulate-sorbent separator), such as an electrostatic precipitator (ESP), a baghouse, a wet scrubber, a dry scrubber, a hybrid scrubber, a filter, cyclone, fabric separator, ceramic separator, or any combination thereof. In some embodiments, an electrostatic precipitator can be used, followed by a scrubber. In other embodiments, an electrostatic precipitator can be used without a scrubber, or another particulate separator can be used. Some devices that can function as particulate separators can also have other functions, for example a scrubber can also remove $SO_2$, $SO_3$, $CO_2$, or NO. In embodiments that include contacting of the mercury with a sorbent in an aqueous phase, e.g., in a scrubber, the removal of mercury from the gas that occurs within the aqueous phase by reaction or interaction of the mercury with the sorbent in the aqueous phase can be considered separation of the mercury-sorbent composition from the gas.

In some examples, by separating the particulates from the mercury-containing gas, less than, equal to, or greater than 20 wt %, 30 wt %, 40 wt %, 50 wt %, 60 wt %, 70 wt %, 80 wt %, 90 wt %, 95 wt %, 96 wt %, 97 wt %, 98 wt %, 99 wt %, 99.9 wt %, 99.99 wt %, or about 99.999 wt % or more mercury can be removed from the mercury-containing gas stream. As discussed herein, the captured mercury can be removed in the form of elemental mercury, oxidized mercury, or in the form of a transformed mercury, such as an organomercury compound including the mercury bound to the carbon framework of the carbon in the sorbent or as Hg(II) complexed with a suitable counterion.

In some embodiments, at least one of the contacting and the separating occurs in an aqueous scrubber. The aqueous scrubber can be any suitable aqueous scrubber. For example, the scrubber can include an aqueous slurry that includes the sorbent.

In some embodiments, the method removes about 1% or less, or less than, equal to, or greater than about 2%, 3, 4, 5, 10, 20, 30, 40, 50, 60, 70, 80, 85, 90, 91, 92, 93, 94, 95, 96, 97, 98, 99, 99.5, 99.9, 99.99, 99.999, or about 99.9999% or more of the mercury present in the mercury-containing gas (e.g., the final concentration of mercury divided by the initial concentration of mercury). In some embodiments, the sorbent combines with about 50-100 wt % of the mercury present in the mercury-containing gas, or about 60-90 wt %, 60-80 wt %, 70-80 wt %, 80-90 wt %, 90-100 wt %, or about 95-100 wt % or the mercury present in the mercury-containing gas, or less than, equal to, or greater than about 90 wt %, 91, 92, 93, 94, 95, 96, 97, 98, 99, 99.2, 99.4, 99.6, 99.8, 99.9, 99.99, or about 99.999 wt % or more.

In some embodiments, the concentration of sulfur (VI) in the mercury-containing gas (e.g., from $SO_3$, $H_2SO_4$, and the like) is greater than about 1 ppm (by mole) and a first quantity of the sorbent forms a mercury-sorbent composition at a first mercury capture rate, wherein the first capture rate is higher than a mercury absorption rate under substantially similar conditions of the first quantity of a corresponding sorbent including at least one of a) less or substantially no nitrogen in a corresponding surface layer, b) less or substantially no halide- or halogen-promotion, and c) less or substantially no inorganic matrix. In some embodiments, the concentration of $SO_3$ in the mercury-containing gas at or near the location wherein the mercury-containing gas contacts the sorbent is about 1 ppm to about 100,000 ppm, 2-10,000 ppm, 3 ppm-1000 ppm, 3-100 ppm, 3-50 ppm, 3-10 ppm, or about 3-6 ppm or more, or the concentration of sulfur (VI) in the mercury-containing gas (e.g., from $SO_3$, $H_2SO_4$, and the like) at or near the location wherein the mercury-containing gas contacts the sorbent is about 1 ppm to about 100,000 ppm, 2-10,000 ppm, 3 ppm-1000 ppm, 3-100 ppm, 3-50 ppm, 3-10 ppm, or about 3-6 ppm or more, wherein ppm designates parts per million by mole. The concentration can be an instantaneous concentration, or an average concentration over time. The nitrogen in the surface layer of the sorbent can decrease neutralization of carbocations (e.g., edge carbons) in the sorbent by at least one of $SO_3$ and $H_2SO_4$, as compared to a corresponding sorbent including less or substantially no nitrogen in a corresponding surface layer under substantially similar conditions. The nitrogen in the surface layer of the sorbent can at least partially block carbocations (e.g., edge carbons) in the sorbent from at least one of $SO_3$ and $H_2SO_4$, as compared to a corresponding sorbent including less or substantially no nitrogen in a corresponding surface layer under substantially similar conditions, or including less or substantially no nitrogen layer structure.

In some embodiments, the method of reducing the mercury content in a mercury-containing gas includes at least one of during and prior to the contacting adding or injecting an alkaline component into the mercury-containing gas. The alkaline component can be any suitable alkaline component, such as an oxide, hydroxide, carbonate, or phosphate of an alkali element, an alkali or alkaline-earth element, and a compound or material including the same. In various examples, the addition of an alkaline component separately or with the sorbent can result in improved mercury capture. Various factors can impact the effectiveness of the alkaline addition, such as, for example, flue gas pollutants, flue gas constituents (e.g., $SO_2$, $SO_3$, $NO_x$, Se, As, HCl, and the like), operating temperature, mercury form, and mercury concentration. In some examples, the alkaline-to-activated-carbon ratio can be adjusted to optimize for a given set of site conditions.

In some embodiments, the sorbent includes a stabilizing agent. In some examples, the stabilizing agent can include at least one of S, Se, $H_2S$, $SO_2$, $H_2Se$, $SeO_2$, $CS_2$, $P_2S_5$, or mixtures thereof. The stabilizing agent can be added before, during, or after promotion.

In various embodiments, the rate of mercury removal can decrease gradually with increasing temperature and with increased loading of mercury, at least partially due to the increase in the rate of a reverse reaction. In some examples, the highest rates can occur at about 100 to 150° C., 50-200° C., or about 50-250° C. In some examples, at 400° C., the reverse reaction can be highly favored thermodynamically. In some examples, the sorbent can be regenerated by washing with water to remove sulfuric acid thereon, such as described in U.S. Pat. No. 8,173,566.

In some embodiments, the method of reducing the mercury content in a mercury-containing gas can include regenerating the mercury-sorbent composition to give a regenerated sorbent. The regeneration can be any suitable regeneration that allows the regenerated sorbent to be reused for removing mercury from the mercury-containing gas. The method can include using the regenerated sorbent to remove the mercury from the mercury-containing gas.

Method of Making Sorbent Including Carbon and Nitrogen.

Various embodiments provide a method of making the sorbent including carbon and nitrogen. In some embodiments, the method of reducing the mercury content in a mercury-containing gas can include making a sorbent including carbon and nitrogen (e.g., including a nitrogen layer structure including cationic and basic nitrogen atoms).

The method of making the sorbent can include contacting a carbonaceous material and a nitrogenous material, to provide an unpromoted sorbent including carbon and nitrogen. The method can include promoting at least a portion of the unpromoted sorbent by contacting the portion of the unpromoted sorbent with a promoter to form a promoted sorbent including carbon and nitrogen, wherein the concentration of nitrogen in the sorbent is higher than the concentration of nitrogen in the carbonaceous material. The sorbent can include a graphene edge including an active site for mercury oxidation and a nitrogen layer structure including cationic and basic nitrogen atoms proximate to the active site.

The method can include obtaining or providing a carbon precursor including nitrogen (e.g., an activated carbon including nitrogen). The method can also include processing (e.g., heating) the carbon precursor, to provide the sorbent. The processing can include any suitable processing. In methods that include heating the carbon precursor, the method can include any other suitable optional step in addition to the heating, such as washing, chemical treatment, or vibration. In some embodiments, the carbon precursor includes a carbonaceous material including carbon and a nitrogenous material including nitrogen. The heating can include heating to about 100° C. to 15,000° C., 200° C. to 10,000° C., 300° C. to 9000° C., or about 400° C. to 8000° C.

The carbonaceous material can be any suitable carbonaceous material. For example, the carbonaceous material can be an organic compound. In some examples, the carbonaceous material includes at least one of brown sugar, barley sugar, caramel, cane sugar, corn syrup, starch, molasses, molasses raffinate (sugar waste product), glucans, galactans, xylans, and a sugar waste product. The carbonaceous material can include activated carbon or carbon that is not activated. In some examples, the carbonaceous material includes powdered activated carbon, granular activated carbon, carbon black, carbon fiber, carbon honeycomb or plate structure, aerogel carbon film, pyrolysis char, char, unburned carbon, or an activated carbon or regenerated activated carbon.

The nitrogen can be derived from or part of any suitable nitrogenous material. For example, the nitrogenous material can be a nitrogen-containing organic compound, such as a nitrogen-containing heterocycle. In some examples, the nitrogenous material includes indole, quinoxaline, carbazole, isoquinoline, piperazine, quinolone, quinoxaline, diazabicyclooctane, polyacrylonitrile, polyvinylpyrrolidone, vinylpyrrolidone-vinyl acetate copolymer, vinylpyrrolidone-acrylic acid copolymer, vinylpyrrolidone-maleic acid copolymer, polyethylenimine, an amine, an amino acid (e.g., alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, or valine), analine, nitrobenzene, hydroxylamine, urea, hydrazine, sulfamic acid, nitriles, carbamates, isocyanates, urethanes, or a combination thereof. The nitrogenous material can be any suitable ammonium salt, such as an ammonium salt derived from an aliphatic nitrogen-containing compound, an aromatic amine-containing compound, or a heterocyclic nitrogen-containing compound; in embodiments wherein the nitrogenous material is a halide salt, the sorbent including carbon and nitrogen can in some embodiments perform equivalently to an promoted material such that a promotion step can be skipped or reduced. In some examples, the nitrogenous material can be at least one of ammonia, ammonium bromide, ammonium chloride, nitric acid, nitrous acid, nitrogen dioxide, compounds including $NO_3$, compounds including $NO_2$, and the like. The nitrogenous material can be any suitable nitrogen-containing inorganic compound, such as an ammonium halide, a methylammonium halide, an ammonium salt of an oxyacid of a Group VI element, an ammonium salt of an oxyacid of a Group V element, or a combination thereof. The nitrogen-containing inorganic compound can be ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, sodium nitrite, sodium nitrate, lithium nitrite, lithium nitrate, barium nitrite, barium nitrate, cerium nitrite, cerium nitrate, $FeNH_4(SO_4)_2$, $Fe(NH_4)_2(SO_4)_2$, $FeNH_4Br_4$, $FeNH_4Cl_4$, $AlNH_4(SO_4)_2$, hydrates thereof, or a combination thereof. The nitrogen-containing inorganic compound can be ammonium sulfate (($NH_4)_2SO_4$), ammonium bromide ($NH_4Br$), ammonium iodide ($NH_4I$), ammonium chloride ($NH_4Cl$), ammonium fluoride ($NH_4F$), ammonium thiosulfate (($NH_4)_2S_2O_3$), ammonium bisulfate ($NH_4SO_4H$), or a combination thereof.

In some examples, a sorbent including carbon and nitrogen can be prepared by contacting an activated carbon with a nitrogen-containing material (e.g., an ammonium salt) and heating the combined materials. The activated carbon and the nitrogen-containing salt can be injected into a hot flue gas (with or without a promoter, promoter precursor, or combination thereof) such that they contact one another in the flue gas. The activated carbon and the nitrogen-containing salt can be used in any proportion to one another to form the sorbent comprising carbon and nitrogen, such as a weight ratio of activated carbon to nitrogen-containing salt of about 1000:1 or more, or less than, greater than, or equal to about 100:1, 50:1, 20:1, 10:1, 5:1, 4:1, 3:1, 2:1, 1:1, 1:2, 1:3, 1:4, 1:5, 1:10, 1:20, 1:50, 1:100, or about 1:1000 or less.

In one example, the sorbent including carbon and nitrogen can be prepared by steps including surface modification of any kind of carbon (e.g., activated carbon) or char by applying a nitrogen-containing polymer coating or impregnation to the existing carbon or lower temperature char and recarbonizing the impregnated carbon. The coating or impregnation can include a polymer or copolymer containing a nitrogen heterocycle such as a polymerized vinylpyrollidone. In one example of this type of carbon, poly(vinylpyrrolidone), poly(vinylpyrrolidone-co-maleic acid) or poly(vinylpyrrolidone-covinyl acetate) is used to coat the carbon surface. Upon heating or recarbonization, the impregnated mixture can form a nitrogen-containing surface layer of the sorbent. The nitrogen-concentration in the surface layer of the sorbent can be higher than the nitrogen concentration of the material prior to the surface modification or impregnation with nitrogen.

In one example, the sorbent including carbon and nitrogen can be prepared by steps including surface modification of an oxidized char by treatment of the char with a suitable nitrogenous compound, such as ammonia or urea, followed by activation of the nitrogen-impregnated material.

In one example, the sorbent including carbon nitrogen can be prepared by steps including impregnation of nitrogen-containing compounds into a char followed by carbonization and activation of the impregnated char by convention methods. One example carbon of this type is the combination of amines or amino acids with carbohydrates, which combination undergoes the Maillard condensation reaction on heating to form carbon surface containing nitrogen heterocyclics.

In one example, the sorbent including carbon and nitrogen can be prepared by impregnation of a nitrogen-containing compound into a coal, lignite, or leonardite, followed by carbonization and activation.

The nitrogen layer structure including cationic nitrogen atoms, neutral nitrogen atoms, or a combination thereof can be formed at any suitable time relative to the mercury capture. The nitrogen layer structure can be formed in the mercury-containing gas (e.g., flue gas). The nitrogen layer structure can be formed on the carbon prior to injecting the sorbent into the mercury-containing gas, such as onsite (e.g., proximate to the boiler or within the facility) or offsite (away from the boiler or at a different facility).

A nitrogen layer structure including cationic nitrogen atoms, neutral nitrogen atoms, or a combination thereof can be formed in any suitable way. The nitrogen layer structure can be formed by a method including coating a carbon (e.g., activated carbon) with a layer including an organic nitrogen-containing precursor to form the nitrogen layer structure. Forming the nitrogen layer structure can further include heating the layer to form the nitrogen layer structure, such as within a flue gas, or such as prior to injection of the sorbent into the flue gas. The layer including the one or more organic nitrogen-containing precursors can further include an acid, such as a gaseous, liquid, or solid Lewis or Bronsted acid. The layer including the one or more organic nitrogen-containing precursors can further include a suitable carbohydrate, such as any suitable carbohydrate described herein. In some embodiments, forming the nitrogen layer structure can include depositing a layer of preformed organonitrogen polymer on the carbon and heating the layer to form the nitrogen layer structure.

A nitrogen layer structure can be formed by a method including contacting a carbon with an ammonium salt, ammonium compound, or an ammonium precursor (e.g., a material that forms an ammonium salt or ammonium compound, the ammonium precursor optionally including or being free of an ammonium group) to form the nitrogen layer structure including nitrogen atoms in the form of ammonium groups. The ammonium salt can be an ammonium halide, a methylammonium halide, an ammonium salt of an oxyacid of a Group VI element, an ammonium salt of an oxyacid of a Group V element, or a combination thereof. The ammonium salt can be ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosphate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, sodium nitrite, sodium nitrate, lithium nitrite, lithium nitrate, barium nitrite, barium nitrate, cerium nitrite, cerium nitrate, $FeNH_4(SO_4)_2$, $Fe(NH_4)_2(SO_4)_2$, $FeNH_4Br_4$, $FeNH_4Cl_4$, $AlNH_4(SO_4)_2$, hydrates thereof, or a combination thereof. The ammonium salt can be ammonium sulfate $((NH_4)_2SO_4)$, ammonium bromide ($NH_4Br$), ammonium iodide ($NH_4I$), ammonium chloride ($NH_4Cl$), ammonium fluoride ($NH_4F$), ammonium thiosulfate $((NH_4)_2S_2O_3)$, ammonium bisulfate ($NH_4SO_4H$), or a combination thereof.

Forming the nitrogen layer structure can include heating the contacted carbon and ammonium salt, ammonium compound, or ammonium precursor. Forming the nitrogen layer structure can include mixing the ammonium salt, ammonium compound, or ammonium precursor, with the carbon to create the sorbent including carbon and nitrogen. Forming the nitrogen layer structure can include injecting the ammonium salt, ammonium compound, or ammonium precursor in a flue gas along with the carbon to form the sorbent including carbon and nitrogen within the flue gas. Forming the nitrogen layer structure can include injecting the ammonium salt, ammonium compound, or ammonium precursor and the carbon in a flue gas at different locations (e.g., wherein the ammonium salt, ammonium compound, or ammonium precursor) are injected at a different location than the carbon) to deposit the ammonium salt, ammonium compound, or ammonium precursor on the carbon to form the sorbent including carbon and nitrogen within the flue gas. Forming the nitrogen layer structure can include injecting the ammonium salt, ammonium compound, or ammonium precursor and the carbon in a flue gas at different locations such that the ammonium salt or compound decomposes or vaporizes and then deposits on the carbon to form the sorbent (e.g., as the gas cools). Forming the nitrogen layer structure can include injecting a vaporous ammonium salt, ammonium compound, or ammonium precursor and the carbon into a flue gas at the same or different location such that the ammonium salt, ammonium compound, or ammonium precursor deposits on the carbon to form the sorbent including carbon and nitrogen.

Promoted Activated Carbon Sorbent Including Nitrogen.

In some embodiments, the sorbent including carbon and nitrogen is a promoted sorbent including carbon and nitrogen. The sorbent including carbon and nitrogen used in the methods of reducing the mercury content in a mercury-containing gas can be a promoted sorbent. The method can include promoting an unpromoted sorbent, or the promoted sorbent can be promoted prior to onset of the method (e.g., commercially acquired).

In various embodiments, the present invention provides a promoted sorbent including carbon and nitrogen in a surface layer thereof. The promoted sorbent can include an graphene edge including an active site for mercury oxidation and a nitrogen layer structure including cationic nitrogen atoms, neutral nitrogen atoms, or a combination thereof proximate the active site.

In various embodiments, the present invention provides a sorbent including carbon and nitrogen for use in mercury removal from a mercury-containing gas. The sorbent can include a halogen- or halide-promoted carbon including nitrogen in a surface layer, wherein the sorbent includes a graphene edge including an active site for mercury oxidation and a nitrogen layer structure including cationic nitrogen atoms, neutral nitrogen atoms, or a combination thereof, the nitrogen layer structure being proximate the active site. The nitrogen layer structure can be sufficient to at least one of a) decrease neutralization by $H_2SO_4$ or $SO_3$ of carbocations in the sorbent (e.g., graphene edge carbons), as compared to a corresponding sorbent including less or substantially no nitrogen layer structure including cationic nitrogen atoms, neutral nitrogen atoms, or a combination thereof under substantially similar conditions, and b) at least partially block carbocations in the sorbent from forming bonds with $H_2SO_4$ or $SO_3$ (e.g., covalent bonds, or ionic bonds with $HSO_3^{1-}$ or $SO_3^{2-}$, or a combination thereof), as compared to a corresponding sorbent including less or substantially no nitrogen layer structure including cationic nitrogen atoms, neutral nitrogen atoms, or a combination thereof under substantially similar conditions.

For example, the method of reducing the mercury content in a mercury-containing gas can include obtaining or providing an unpromoted sorbent. The unpromoted sorbent can be any suitable unpromoted sorbent including nitrogen, and can be synthesized or commercially acquired. The method can include obtaining or providing a promoter. The method can include promoting at least a portion of the unpromoted sorbent by contacting (e.g., chemically reacting) the portion of the unpromoted sorbent with the promoter to form the sorbent.

The promoter can be any suitable promoter, such that a promoted sorbent is formed that is effective for the removal of mercury from a mercury-containing gas. For example, the promoter can include a halogen or halide promoter. The halogen or halide can be fluorine or fluoride, chlorine or chloride, bromine or bromide, or iodine or iodide. In some examples, the promotor can include at least one of a halogen, a Group V halide, a Group VI halide, a hydrogen halide, an ammonium halide, an alkali earth metal halide, and an alkaline earth metal halide. Thus, the sorbent in some embodiments can be at least one of halogen-promoted, Group V halide-promoted, Group VI halide-promoted, hydrogen halide-promoted, ammonium halide-promoted, alkali earth metal halide-promoted, and alkaline earth metal halide-promoted. The promoter can include at least one of HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$, $FeI_x$ (x=1, 2, 3, or 4), $FeBr_y$, (y=1, 2, 3, or 4), $FeCl_z$ (z=1, 2, 3, or 4), $MnBr_2$, $MnCl_2$, $NiBr_2$, $NiCl_2$, $NiI_2$, $ZnBr_2$, $ZnCl_2$, $ZnI_2$, $NH_4Br$, $NH_4Cl$, $NH_4I$, $NH_4F$, $(NH_4)_2SO_4$, $H_2SO_4$, $NH_4SO_4H$, $(NH_4)_2S_2O_3$, $FeNH_4(SO_4)_2$, $Fe(NH_4)_2(SO_4)_2$, $FeNH_4Br_4$, $FeNH_4Cl_4$, $AlNH_4(SO_4)_2$, hydrates thereof, or a combination thereof. The promoter can be formed from a promoter precursor, such as any suitable precursor that can form a promoter described herein. The promoter precursor can be an elemental halogen, a Group V halide, a Group VI halide, a hydrohalide, an ammonium halide, a metal halide, a nonmetal halide, an alkali earth metal halide, an alkaline earth metal halide, or a combination thereof. The promoter precursor can be NaBr, NaCl, NaI, $Br^-$, $Cl^-$, KI, KCl, LiCl, LiBr, $CuCl_2$, $CuBr_2$, AgCl, AgBr, $CHI_3$, $CH_3Br$, AuBr, $FeI_x$ (x=1, 2, 3, or 4), $FeBr_y$ (y=1, 2, 3, or 4), $FeCl_z$ (z=1, 2, 3, or 4), $MgBr_2$, $MgCl_2$, $MnBr_2$, $MnCl_2$, $NiBr_2$, $NiCl_2$, $NiI_2$, $ZnBr_2$, $ZnCl_2$, $ZnI_2$, $CaI_2$, $CaBr_2$, $CaCl_2$, $FeNH_4(SO_4)_2$, $Fe(NH_4)_2(SO_4)_2$, $FeNH_4Br_4$, $FeNH_4Cl_4$, $AlNH_4(SO_4)_2$, hydrates thereof, or a combination thereof. In some examples, the promoter is $NH_4Br$, and can be injected into a warm zone in a duct, for example separately or with the (unpromoted) sorbent. In some examples, any suitable halogen- or halide-containing material, such as NaCl, $CaCl_2$, NaBr, or $CaBr_2$ can be injected with the coal during the combustion process, which can activate the carbon. In various embodiments, the halogen- or halide-containing material can transform into an active promotor such as active bromide or chloride compounds like HCl, HBr, or any chloride- or bromide-containing promoter described herein. In some examples, the promoter is in a form including at least one of a vapor form, in a solvent, as a liquid, as a solid, and a combination thereof. In some embodiments, the promoting can occur in an aqueous scrubber, wherein the scrubber includes an aqueous slurry that includes the promotor.

The promoting of the sorbent material can occur before addition or injection into a gas stream, during addition or injection into a gas stream, after addition or injection into a gas stream, or a combination thereof, wherein the gas stream can be a mercury-containing gas stream, a transport stream, or a combination thereof. In some examples, the promoter can be added to the sorbent before the promoter and the sorbent react, such that the heat of the gas stream into which the promoter is added causes the promoting of the sorbent. For example, the promoter can be added as a gas, as a gas dissolved in a liquid, or as a solid such as a salt, or other substance (e.g., acid) dissolved in liquid (e.g., water), for example, hydrobromic acid, hydrochloric acid, hydroiodic acid. In examples wherein the promoter is added in a liquid such as water, the water can be allowed to dry, which can allow the promoter to adhere to, impregnate, or react with the sorbent, or a combination thereof. In some examples, a pre-added promoter can be an ammonium salt, such as an ammonium chloride, an ammonium bromide, or an ammonium iodide, including, for example, mono-, di-, tri-, or tetraalkyl ammonium halides, or $NH_4^+$ halide salts. In some examples, the promoter can be added to the sorbent near to or at the time of promoting; for example, the promoter can be added to a gas stream with the sorbent or such that it contacts the sorbent within a heated gas stream, such as a mercury-containing gas stream or a feed gas stream. In some examples, the promoter can be $NH_4Br$. The promoter can be any suitable promoter described herein.

In some embodiments, a promoter precursor transforms into the halogen or halide promoter that reacts with the sorbent to give the promoted sorbent. The promoter precursor can be any suitable precursor that can transform into the halogen or halide promoter. In some embodiments, the promoter precursor can be at least one of on the unpromoted sorbent and added or injected with the unpromoted sorbent. In some embodiments, the promoter can be HBr, and in some examples, the HBr can be provided via degradation or reaction of a promoter precursor such as ammonium bromide, sodium bromide, or calcium bromide. The promoter can be HCl, and in some examples, the HCl can be provided via degradation or reaction of a promoter precursor such as ammonium chloride, sodium chloride, or calcium chloride. The promoter can be HF, and in some examples, the HF can be provided via degradation or reaction of a promoter precursor such as ammonium fluoride, sodium fluoride, or calcium fluoride. In some examples, the promoter (e.g., HBr or HCl) or promoter precursor (e.g., $NH_4Br$, NaBr, $CaBr_2$, $NH_4Cl$, NaCl, $CaCl_2$) can be added or injected in the flue gas separately from the sorbent or with the sorbent (e.g., can be applied to the sorbent pre-injection, added or injected simultaneously at the same location, or added or injected simultaneously at different locations). In some examples, a promoter precursor such as NaCl, $CaCl_2$, NaBr, or $CaBr_2$ can be added with uncombusted material such as uncombusted coal.

Inorganic Matrix or Composites.

In some embodiments, the sorbent including carbon and nitrogen includes an inorganic matrix or is a composite (e.g., nanocomposite). The sorbent including carbon and nitrogen used in the methods of reducing the mercury content in a mercury-containing gas can include an inorganic matrix or can be a composite (e.g., nanocomposite). The method can include adding an inorganic matrix to the sorbent or making a composite, or the inorganic matrix-including or composite sorbent can be acquired prior to onset of the method (e.g., commercially acquired).

For example, the method of reducing the mercury content in a mercury-containing gas can include obtaining or providing a substrate material. The substrate material can be any suitable substrate. For example, the substrate can be at least one of diatomaceous earth, a clay, a zeolite, or a mineral. The method can include contacting the carbon precursor and the substrate material, to provide a sorbent starting material. The contacting can take place in any suitable fashion, such as in a gas stream (e.g., flue gas), prior to injection into the gas steam, or any combination thereof. The contacting mixes the carbon precursor and the substrate material, such that when the conglomeration is heated (or subjected to any other suitable source of energy), the carbon composite or sorbent including an inorganic matrix is formed. The contacting can be performed such that the carbon precursor is approximately evenly distributed on the substrate. In some examples, water or another solvent can be added to help distribute the carbon precursor on the substrate. In examples where water is included in the mixture of the carbon precursor and the substrate, the conglomeration can be dried prior to the heating. The drying can occur in any conventional manner (e.g., convective, conductive, microwave, and the like), including by heating near or above the boiling point of the solvent, in the case of water (e.g., 50° C.-120° C. or higher), at atmospheric pressure, under pressure, or under a vacuum.

The substrate can include any suitable material, such as a suitable porous material. For example, the substrate material can be an alkaline earth metal, an alkali (lime, limestone), diatomaceous earth, zeolites, a mineral, porous minerals (e.g., clays) including, for example, smectites (e.g., montmorillonite, bentonite, nontronite, saponite), kaolins, illites, chlorites, sepiolite, or attapulgites. In some examples, the substrate can include polymers, non-metals, metals, metalloids, ceramics or mixtures, and blends, as well as composites and alloys thereof. The materials can be synthetic or naturally occurring or naturally derived materials. Examples of synthetic polymers include any common thermoplastics and thermosetting materials. Examples of metals include aluminum, titanium, copper, steel, and stainless steel. Examples of ceramics include any form of alumina, zirconia, titania, and silica. Examples of naturally occurring or naturally derived materials include wood, wood composites, paper, cellulose acetate, and geologic formations such as granite or limestone. Examples of non-metals include various forms of carbon such as graphite or carbon. Examples of metalloids include silicon or germanium. The porous material can be a construction material such as concrete or asphalt. The inorganic matrix (material) can include at least one of a zeolite, a mineral, alkaline earth metal, or an alkali (e.g. lime, limestone). For example, the activated carbon sorbent can optionally include a portion of at least one of mica, talc, phyllosilicates, feldspars, bentonite, dolomite, kaolin, kaolinite, montmorillonite, smectite, illite, chlorite, limestone, lime, hydrated lime, slaked lime, sodium carbonate, sodium bicarbonate, trona, alkali metal bicarbonate, alkali metal bisulfite, alkali metal bisulfates, alkali metal sulfides, sodium compounds, calcium compounds, magnesium compounds, aluminum compounds, iron compounds, porous felsic materials, vesicular felsic materials, porous basaltic materials, vesicular basaltic materials, clay-based compounds, alkaline compounds, calcium hydroxide compounds, sodium acetate compounds, bicarbonate compounds, an alkali metal bisulfite, and combinations thereof.

In some examples, the substrate material can be present in from about 1 wt % to about 99 wt %, about 20 wt % to about 80 wt %, or about 40 wt % to about 60 wt % of the starting material for the sorbent including carbon and nitrogen. Wt % in this paragraph refers to the percentage by weight based on the total weight of the carbon precursor and the substrate material.

The method can include processing (e.g., heating, vibrating, sonicating, microwaving, or otherwise adding energy to) the sorbent starting material, to provide the sorbent including carbon and nitrogen. The contacted composition of the carbon precursor and the substrate can then be processed (e.g., heated, vibrated, sonicated, microwaved, or other suitable addition of energy) to form the carbon composite or sorbent including an inorganic matrix. The processing can take place at any suitable temperature, such that the sorbent is sufficiently formed, for example heating to less than, equal to, or greater than about 50° C., 100° C., 200° C., 300° C., 400° C., 500° C., 600° C., 700° C., 800° C., 900° C., 1000° C., 1100° C., or about 1200° C. or higher. The processing can take place for any suitable time, such that the carbon composite is sufficiently formed, for example, less than, equal to, or greater than about 1 s, 2 s, 5 s, 10 s, 30 s, 1 min, 2 min, 5 min, 10 min, 30 min, 1 h, 1.5 h, 2 h, 3 h, 4 h, 5 h, 10 h, or about 24 h or more. The heating can take place in any suitable apparatus, for example, a unit that substantially excludes oxygen, e.g., that allows heated inert gas air to flow around the mixture being heated. In one example, the heating occurs in a furnace having an inert gas environment therein. The processing can be accelerated, or lengthened, depending on the apparatus and the composite or inorganic matrix.

In some embodiments, heating the sorbent starting material can provide a second sorbent starting material. The method can further include reacting the second sorbent starting material with an acidic or basic material, to provide the sorbent including carbon and nitrogen. The acidic or basic material can be any suitable acidic or basic material, such as HBr, HCl, $H_2SO_4$, KOH, NaOH, and the like. In some embodiments, treatment with an acidic or basic material can prepare the sorbent for treatment with a promotor or can prepare the material such that sufficient reactivity or absorption with mercury is obtained.

Mechanism of Mercury Removal.

The mechanism of operation of the sorbent including carbon and nitrogen is not intended to be limited to any particular theory of operation as advanced herein. In some embodiments, the nitrogen in the surface layer at least partially decreases neutralization by $SO_3$ (or ions or other materials derived from $SO_3$ such as $H_2SO_4$ or $SO_3$) of carbocations (e.g., edge carbons) in the sorbent, as compared to a corresponding sorbent including less or substantially no nitrogen in a corresponding surface layer, or having less or substantially no nitrogen layer structure including cationic and basic nitrogen atoms, under substantially similar conditions. In some examples, the neutral (e.g., basic) nitrogen in the surface layer at least partially blocks carbocations in the carbon from forming bonds with $SO_3$, as compared to a corresponding sorbent including less or substantially no nitrogen in a corresponding surface layer, or having less or substantially no nitrogen layer structure, under substantially similar conditions. The basic sites in the nitrogen layer structure react can with $SO_3$ and $H2SO_4$ to bind the sulfur VI as sulfonate and sulfate, respectively.

In various active carbon sorbents, three issues can occur during mercury capture: 1) getting high oxidation reactivity at a carbon edge site (kinetic effect), 2) preventing loss of actives sites by reaction of carbocations (e.g., carbene edge carbons) with $SO_3$ or $H_2SO_4$, and 3) preventing/avoiding the loss of oxidized mercury from the carbon-bound states as a result of displacement by sulfate (equilibrium effect). Elemental mercury in the gas phase can be oxidized at the carbon edge surface (cationic zigzag sites) and can be bound covalently as an organomercury halide. The cationic sites can be formed by addition of acids or halogens ($X_2$) to the carbon edge structure, which can result in a carbenium-halide ion pair. The oxidation can be assisted by the negative halide ion stabilizing the developing positive charge on the mercury atom as it adds to the carbenium atom. The oxidation can occur more readily if the oxidation potential (charge) of the carbenium ion or stability thereof is higher, which can be influenced or determined by the adjacent charges present in the carbon framework structure and nearby surroundings. Additional cationic functionality in the structure can raise the oxidation potential (increases positive charge) at the reactive site, or can increase the stability of a positive charge at the reactive site. Negatively charged groups can stabilize and lower the overall charge and available carbenium ions and thereby reduce the reactivity for oxidation of the mercury and availability for capture of mercury.

The longer-term equilibrium effect can be less important for capture over a short contact time, such as inflight capture by electrostatic precipitators (ESPs). However, in some situations the equilibrium displacement problem can be more important, e.g., baghouse collection or $SO_3$ injection or formation in a selective catalytic reduction (SCR) unit. Since sulfate concentrations can increase with time of exposure on the carbon surface, their effect in displacing mercury halides into the gas phase (desorption and breakthrough) can be important in long exposure times. When $SO_3$ related compounds and ions such as sulfuric acid, sulfate, or related ions, are initially present or form quickly on a wet surface, e.g., with $SO_3$ injection, the equilibrium displacement effect can also become important in systems with a short contact time.

In various embodiments, the nitrogen cations in the surface layer can increase the polarization of electrons on the proximate edge via a spatial electrostatic field by drawing electrons towards the carbon closest to the cation and away from the adjacent carbons. The carbon closest to the halide ion will be the most positively charged, raising its potential for oxidation.

In some embodiments, the nitrogen in the surface layer of the sorbent increases the cationic charge in the sorbent because the nitrogen protects the cation centers from $SO_3$ and ions or compounds derived from $SO_3$. The nitrogen atoms can form or be part of a charged cage or other protective blocking structure around a carbon edge structure to prevent access by $SO_3$ and ions or compounds derived from $SO_3$ such as anionic sulfate groups but allow diffusion of mercury atoms into the nanostructure to reach active centers for oxidation or sorbtion.

In some embodiments, an inorganic matrix such as clay can help to block active cationic centers from access by $SO_3$ and ions or compounds derived from $SO_3$ or can help to stabilize or increase the cationic charge in the active carbon sorbent. The clay can increase the polarization of electrons as an underlayment for the composite. Also, because $SO_3$ is a strong acid it may not react with clays that are also acidic.

FIG. 1 illustrates a resonance structure diagram of a promoted active site located on a portion of the graphene edge of the sorbent. The active site includes an ion pair including a cationic site (e.g., carbenium ion) on the carbon edge and a negative charged halide ion (e.g., bromide). In an example where HBr or $NH_4Br$ is used for promotion (other examples can include HCL or $NH_4Cl$, or HI or $NH_4I$), the site can be formed by addition of the hydrogen (proton) of the HBr to the carbene edge carbon. In other examples (not shown in FIG. 1), such as where $Br_2$ is used promotion, the hydrogen is replaced by a bromine substituent. The charge distribution in the edge structure is illustrated in the edge atomic charge chart below the diagram. The positive charge is spread to alternating carbons (e.g., delocalized) on the edge and interior.

Figure 2:
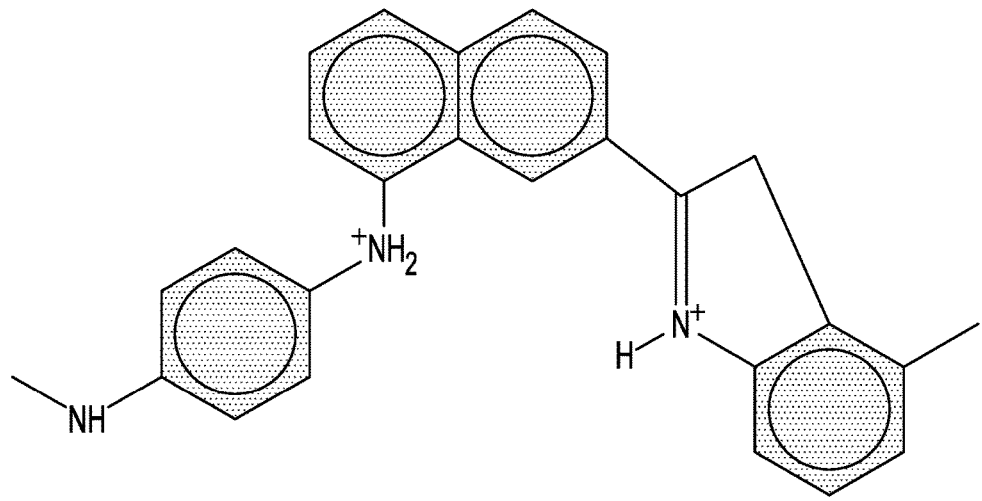
FIG. 2 illustrates a nitrogen layer structure including protonated (cationic) nitrogens and unprotonated basic nitrogen, in accordance with various embodiments.

FIG. 2 illustrates a representative portion of a nitrogen layer structure formed by conversion of several polymeric amine groups to ammonium cations by protonation of the nitrogen atoms by acidic components (e.g., of the flue gas).

Figure 3:
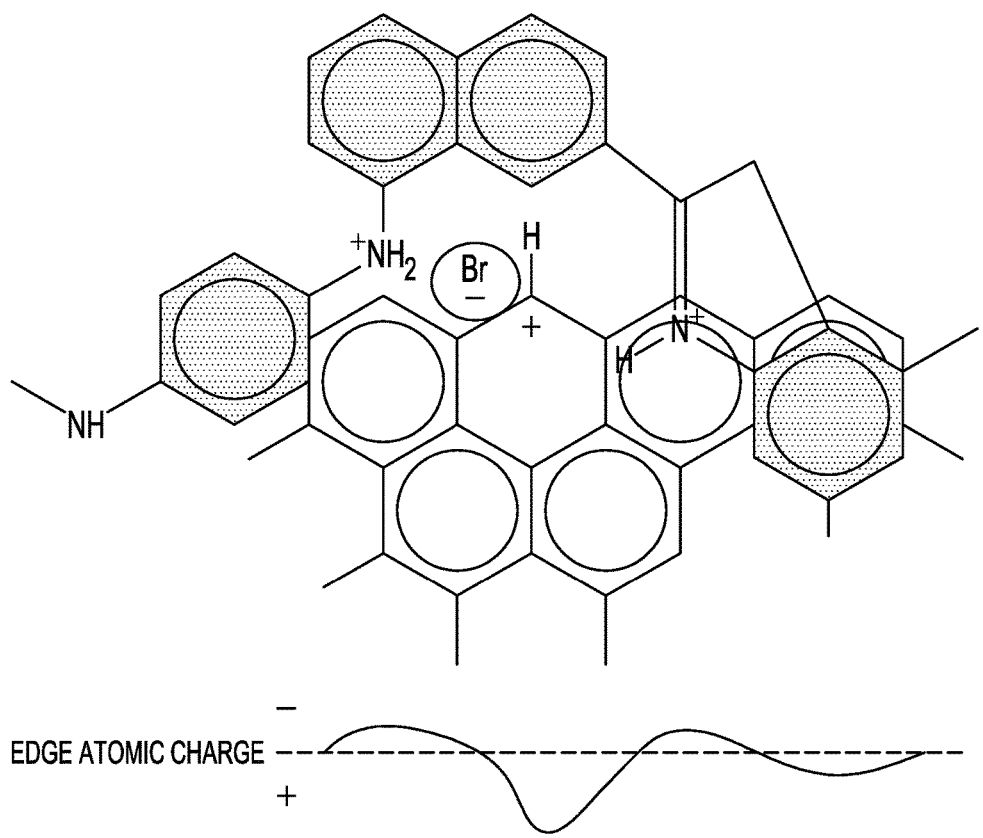
FIG. 3 illustrates a promoted active site on a carbon sorbent with a nitrogen lattice overlay, in accordance with various embodiments.

FIG. 3 illustrates a superpositioning of a nitrogen layer structure on a promoted graphene edge, forming a protective cage around the active site on the graphene edge. The protonated nitrogens of the layer structure combine with $SO_3$ and $H_2SO_4$ present in the flue gas (e.g., $RNH_2 + SO_3 \rightarrow RNH_2^{+1}-SO_3^{-1}$ (sulfamate), $RNH_2+H_2SO_4 \rightarrow RNH_3^{+1}+HSO_4^{-1}$), and prevent their access to the active site, whereas neutral mercury atoms diffuse through the nitrogen layer structure and react at the active site. Furthermore, the cationic nitrogens of the cage lattice have a polarizing effect on the electrons in $\pi$ orbitals in the edge structure and alter the charge distribution in the edge structure. This alteration results from the positive nitrogen atoms attracting electrons in the edge structure resulting in a more positive charge at the active site, increasing the oxidation potential of the active site, and facilitating the reaction with mercury. This alteration of the charge distribution of the edge carbons is illustrated in the edge atomic charge curve shown below the structure.

Figure 4:
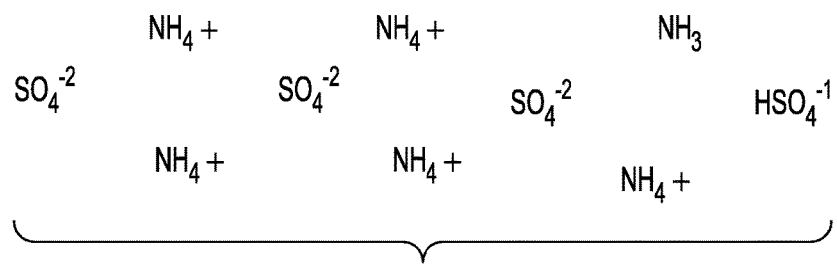
FIG. 4 illustrates an ammonium sulfate lattice, in accordance with various embodiments.

FIG. 4 illustrates a representative portion of a nitrogen layer structure. As a result of the thermal conditions of the deposition, a portion of the ammonium ions have converted to ammonia molecules and bisulfate ions (e.g., on right side of FIG. 4).

Figure 5:
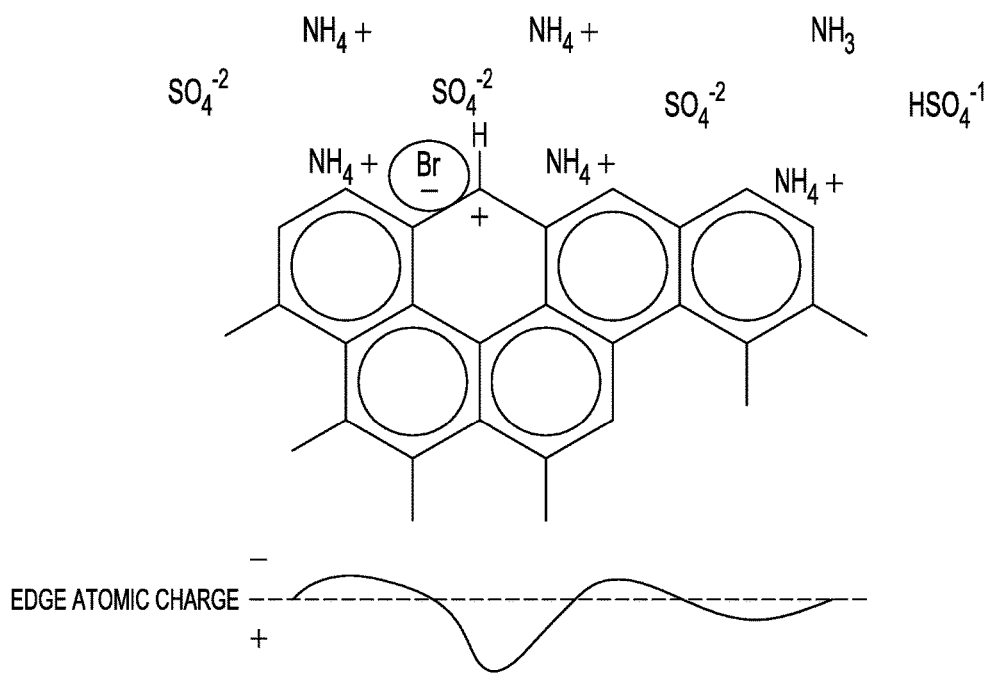
FIG. 5 illustrates a promoted active site on a sorbent with a thermally deposited ammonium sulfate lattice containing some complexed ammonia and bisulfate, in accordance with various embodiments.

FIG. 5 illustrates a superpositioning of a nitrogen layer structure on a promoted graphene edge, forming the protective cage around the active site on the graphene edge. The cage includes the ammonium and sulfate lattice as well as associated ammonia which are reactive to the $SO_3$ and $H_2SO_4$ present in the flue gas (e.g., $NH_3+SO_3 \rightarrow NH_3^{+1}-SO_3^{-1}$ (sulfamate), $NH_3+H_2SO_4 \rightarrow NH4^{+1}+HSO_4^{-1}$, $SO_4^{-2}+H_2SO_4 \rightarrow 2HSO_4^{-1}$, with potential further transformation occurring, for example, via $SO_4^{-2}+SO_3 \rightarrow SO_7^{-2}$, or $HSO_4^{-1}+SO_3 \rightarrow HS_2O_7^{-1}$). The nitrogen layer structure can alter the charge distribution in the graphene edge by the same mechanism as described herein for the organonitrogen matrix, as illustrated in the edge atomic charge curve shown below the structure.

Process Flow Example

Figure 6A:
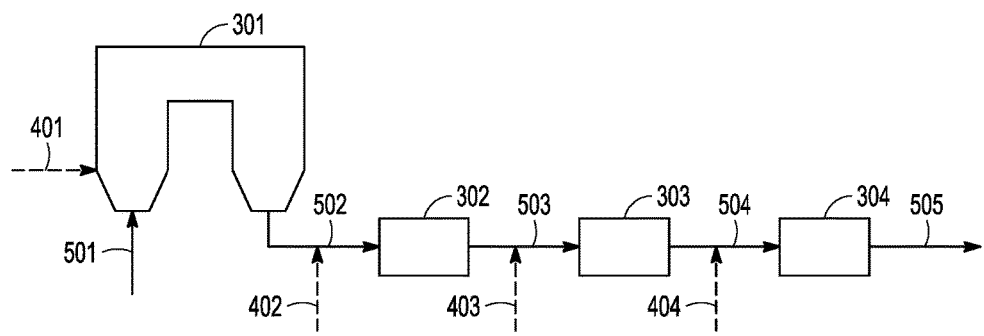
FIG. 6A schematically illustrates an exemplary process flow diagram for in-flight preparation of a promoted carbon and/or non-carbon sorbent.
Figure 6B:
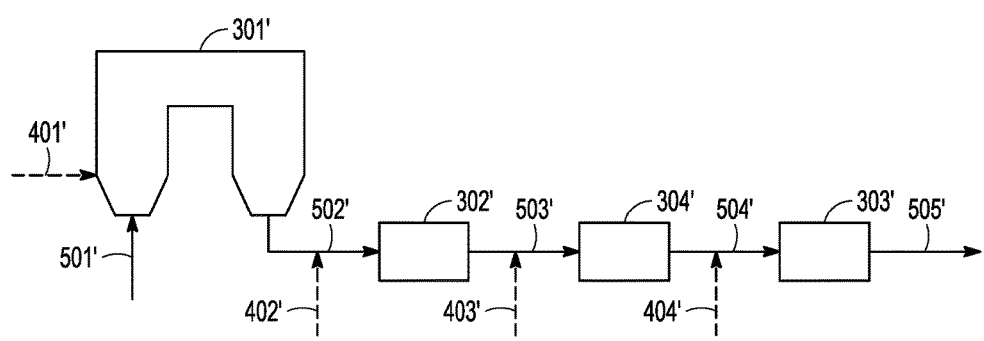
FIG. 6B schematically illustrates an exemplary process flow diagram for in-flight preparation of a promoted carbon and/or non-carbon sorbent.

Referring to FIGS. 6A and 6B, process flow diagrams are shown as examples of a method for mercury removal from a mercury containing gas, such as a flue gas. In an embodiment shown at FIG. 6A, gas inlet stream 501 passes through chamber 301 and enters air heater 302 as stream 502; then it exits air heater 302 as stream 503 and passes through particulate control device 303 and enters scrubber 304 as stream 504; finally it exits scrubber 304 as stream 505. As shown, chamber 301 is a boiler; however, one skilled in the art will appreciate that chamber 301 can also be the combustion chamber of a coal fired boiler, a stand-alone combustion chamber or any other chamber in which mercury containing gas is either generated or passed through. Injection streams 401, 402, 403 and 404, in addition to stream 501, are multiple locations wherein a promoter, promoter precursor, sorbent, nitrogen-containing materials (e.g., ammonium salts), or a combination thereof, may be introduced. The sorbent injected into the system can be promoted prior to injection, or can be promoted within the system. The sorbent injected into the system can include a nitrogen layer structure, or the nitrogen layer structure and be formed within the system. The nitrogen-containing compound can be coated onto or otherwise contacted with the sorbent prior to injection, or the coating or contacting can occur within the system, with subsequent heating to form the nitrogen layer structure.

FIG. 6B shows an embodiment similar to that of FIG. 6A, but with the position of the scrubber and particulate control device switched. Specifically, gas inlet stream 501' passes through chamber 301' and enters air heater 302' as stream 502'; then it exits air heater 302' as stream 503' and passes through scrubber 304' and enters particulate control device 303' as stream 504'; finally it exits particulate control device 303' as stream 505'. As shown, chamber 301 is a boiler, however, one skilled in the art will appreciate that chamber 301 can also be the combustion chamber of a coal fired boiler, a stand-alone combustion chamber or any other chamber in which mercury containing gas is either generated or passed through. Injection stream locations 401', 402', 403' and 404', in addition to stream 501', represent multiple locations wherein a promoter, promoter precursor, sorbent, nitrogen-containing materials (e.g., ammonium salts), or a combination thereof.

At each of the aforementioned injection stream locations 401, 401', 402, 402', 403, 403', 404 and 404', 501, 501' multiple injection points are contemplated so that a promoter, promoter precursor, sorbent, nitrogen-containing materials (e.g., ammonium salts), or a combination thereof may be injected as a single injection stream or as separate injection streams, as further illustrated in the following exemplary embodiments. In an embodiment, a promoter, promoter precursor, nitrogen-containing material, or a combination thereof is introduced to chamber 301 at location 401. A sorbent is introduced at location 402 upstream of air heater 302. In a further embodiment, a promoter, promoter precursor, nitrogen-containing material, or a combination thereof is introduced to at location 402 upstream of air heater 302, while an unpromoted sorbent is also introduced at location 402 either as a separate stream or as a mixed single stream with the promoter, promoter precursor, nitrogen-containing material, or a combination thereof. In another embodiment, a promoter, promoter precursor, nitrogen-containing material, or a combination thereof is introduced at locations 401 and 402, while an unpromoted sorbent is introduced at location 402 either as a separate stream or as a mixed single stream with the promoter, promoter precursor, nitrogen-containing material, or combination thereof.

EXAMPLES

Various embodiments of the present invention can be better understood by reference to the following Examples which are offered by way of illustration. The present invention is not limited to the Examples given herein.

Part I. Preparation of Composite Sorbent Comprising Activated Carbon Core and Nitrogen Layer Structure.

Example I-1. Impregnation of Nitrogen Precursors into a Char Surface Followed by Carbonization and Activation of the Impregnated Char Example 1a. Carbon Precursor A carbon (20×60 mesh) prepared by steam activation of a lignite char was stirred with an aqueous solution of dextrose and ethanolamine in ratio of 1 part of carbon to 0.016 parts of ethanolamine and 0.034 parts of dextrose. The water solvent was removed by rotovaporation and the impregnated carbon was air-dried. The dried material was reactivated at 750° C. for 2 hours under nitrogen stream.

Example I-1b. Char Precursor

A char (20×60 mesh) prepared by heating a lignite at 400° C. was stirred with an aqueous solution of dextrose and ethanolamine in ratio of 1 part of carbon to 0.016 parts of ethanolamine and 0.034 parts of dextrose. The water solvent was removed by rotovaporation and the impregnated carbon was air-dried. The dried material was activated at 750° C. for 2 under nitrogen stream.

Example I-1c. Wood Charcoal Precursor

A carbon (20×60 mesh) prepared by steam activation of a wood char was stirred with an aqueous solution of dextrose and ethanolamine in ratio of 1 part of carbon to 0.016 parts of ethanolamine and 0.034 parts of dextrose. The water solvent was removed by rotovaporation and the impregnated carbon was air-dried. The dried material was reactivated at 750° C. for 2 hours under nitrogen stream.

Example I-1d. Wood Charcoal—Alanine

A carbon (2.0×60 mesh) prepared by steam activation of a wood char was stirred with an aqueous solution of dextrose and alanine in ratio of 1 part of carbon to 0.016 parts of ethanolamine and 0.034 parts of alanine. The water solvent was removed by rotovaporation and the impregnated carbon was air-dried. The dried material was reactivated at 750° C. for 2 hours under nitrogen stream.

Example I-2. Tube Reactor Testing

The molecular sieve carbons obtained as described in Examples I-1a to I-1d were impregnated with 5 wt % of sulfuric acid. The impregnated carbon was then dried in an oven at 110° C. The carbon (0.100 g) was packed into a 3 mm diameter pyrex tube and held in place by glass wool plugs at both ends. A constriction in the pyrex tube at exit end prevented the plug from blowing out. The reactor tube was heated in a GC oven at 150° C.±0.50 as a constant temperature device. The mercury vapor was contained in an air flow of 100 $cm^3$/min through the reactor tube at a concentration of 429-447 micrograms/$m^3$, determined with a continuous mercury vapor monitor.

The mercury source was a temperature-calibrated permeation tube. The permeation tube was heated in a double-jacketed glass condenser with a circulating hot silicone oil system. The concentration in the effluent air stream from the reactor tube was monitored with a continuous cold-vapor UV mercury vapor monitor (EPM). Blank runs were conducted before each carbon test to determine the mercury concentration. The instrument was zeroed with an air stream passed through a large iodized carbon filter. This apparatus thus gave the percent of mercury not removed by the carbon bed (the concentration of mercury in the outlet divided by the concentration of mercury in the inlet, times 100). For the nitrogenous molecular sieve carbons (Examples I-1a to I-1d) only 1% of the mercury vapor was not removed by the carbon bed over a period of several hours.

Example I-3. Filter Bed Testing

The sorbent carbon pretreated as in Example I-1e was ground to about 200 mesh and introduced into a tube where it could be drawn by reduced pressure onto a teflon or quartz filter held in a stainless steel holder. The carbon-impregnated filter and holder were then placed in the oven under air flow and tested as described in Example I-2.

Example I-4. Impregnation of Nitrogen-Containing Polymers into an Activated Carbon or Char Surface Followed by Carbonization and Activation of the Impregnated Material Example I-4a. Vinylpyrrolidone-Acrylic Acid Copolymer A carbon prepared by steam activation of a lignite was stirred with an aqueous solution of poly(vinylpyrrolidone-co-acrylic acid) for 30 min. The amount of the polymer was selected to provide loadings of 1% to 30% by weight. The solvent was evaporated by rotovaping at 50° C. and further dried in an oven at 110° C. The impregnated carbon was reactivated by heating at 750° C. for 2 hours in a stream of nitrogen. Approximately 40% of the polymer weight was converted to surface coating and 60% was volatilized.

Example I-4b. Vinylpyrrolidone-Vinyl Acetate Copolymer

An activated carbon was impregnated with poly(vinylpyrrolidone-co-vinyl acetate) dissolved in dichloromethane. The solvent was evaporated and the impregnated carbon died in an oven at 110° C. The impregnated carbon was then activated by heating at 750° C. for 2 hours in a nitrogen stream.

Example I-4c. Poly(Vinylpyrrolidone)

An activated carbon was impregnated with one of poly (vinylpyrrolidone) and the copolymers described in Examples I-4a to I-4b and activated as described in Example I-4a.

Example I-4d. Poly(Vinylpyrrolidone)

A KOH-activated lignite was impregnated with one of polyvinylpyrrolidone and and the copolymers described in Examples I-4a to I-4b and activated as described in Example I-4a.

Example I-4e. Wood-Derived Charcoal

Wood-derived charcoal was impregnated with one of poly(vinylpyrrolidone) and the copolymers described in Examples I-4a to I-4b and activated as described in Example I-4a.

Example I-4f. Carbonization of a Lignite. (Hypothetical Example)

Chars are produced by carbonization of a lignite, impregnated by one of poly(vinylpyrrolidone) and the copolymers described in Examples I-4a to I-4b, and activated as described in Example I-4a. As an alternative, steam activation can be used.

Example I-4g. Steam Activation

Examples I-4a to I-4b were carried out using steam activation of the carbon material impregnated with nitrogen-containing polymers to generate effective sorbents.

Example I-5. Impregnation of Nitrogen Precursors into a Coal, Lignite, or Leonardite Surface, Followed by Carbonization and Activation of the Impregnated Material Example I-5a. 1,4-Diazabicyclo[2.2.2]Octane (DABCO)

Lignite (as received) was stirred with an aqueous solution of DABCO in a ratio of 1 part of coal to 0.02 parts of DABCO. The water solvent was removed by filtration, and the impregnated coal was air-dried. The dried material was carbonized at 400° C. and activated at 750° C. for 2 hours under a nitrogen stream.

Example I-5b. Sulfamic Acid

Lignite (as received) was stirred with an aqueous solution of sulfamic acid in a ratio of 1 part of coal to 0.02 parts of sulfamic acid. The water solvent was removed by filtration, and the impregnated coal was air-dried. The dried material was carbonized and activated at 750° C. for 2 hours under a nitrogen stream.

Example I-5c. Carbonized Lignite

Lignite was carbonized at 400° C. for 30 minutes, and the resulting char was treated by stirring with sulfamic acid solution as described in Example I-5b. The treated char was then activated as described in Example I-5b.

Example I-5d. Steam Activation

Steam activation of the DABCO or sulfamic acid-impregnated chars was also effective in producing mercury sorbent carbons.

Example I-6. Preparation of Nitrogen-Containing Pitches

Nitrogen-containing pitches were prepared using a procedure reported by Mochida et al. (Mochida, I.; An, K. H.; Korai, Y. *Carbon* 1995, 33, 1069). Preparations are summarized in Table 1. A mixture of isoquinoline (26 g, 0.2 mole), anhydrous aluminum(III) chloride (13.3 g, 0.25 mole), and nitrobenzene (7.68 g, 0.06 mole) was placed in a two-necked flask equipped with a reflux condenser and a nitrogen inlet tube. The mixture was refluxed at 280° C. for 4 hours. The residue was extracted with 0.1 N hydrochloric acid and filtered. The residue was washed with 0.1 N hydrochloric acid. The residue was further extracted with methanol to remove any monomer. The methanol-insoluble pitch was dried in vacuo. The yield of the pitch was 49%. A portion of the nitrogen-containing pitches were carbonized using Procedure A or B in a nitrogen stream, as described in Example I-7.

TABLE 1

Preparation of nitrogen-containing pitches.

| Substrate (g, mole) | Catalyst (g, mole) | Cocatalyst (g, mole) | Temperature (° C.) | Time (hr) | Yield (g, %) | Soluble (%) |
|---|---|---|---|---|---|---|
| Indole (10, 0.77) | None | None | 253* | 4 | 9.6 (96%) | Methanol (100) |
| Quinoxaline (26, 0.2) | AlCl$_3$ (13.3, 0.1) | Nitrobenzene (7.68, 0.06) | 225* | 4 | 13.5 (52%) | EDA** |
| Carbazole (16.7, 0.1) | AlCl$_3$ (27.7, 0.2) | Nitrobenzene (3.6, 0.03) | 25 | 12 | 59.1 (92%) | EDA** |
| Isoquinoline (26, 0.2) | AlCl$_3$ (13.3, 0.1) | Nitrobenzene (7.68, 0.06) | 280 | 4 | 6.5 (25%) | EDA** |

*indicates reactions carried out in 300-mL Parr reactor.
**indicates ethylenediamine.

Several modifications of the method were utilized for the quinoline polymerization. In addition to the flask method, a Parr reactor was used for the reaction, and temperatures and reaction times were varied. The yields are reported in Table 2. In this procedure, 64.5 g of quinoline and 33.25 g of aluminum(III) chloride were placed in a 300-mL Parr autoclave. The reactor was sealed under nitrogen and heated at 280° C. for 4 hours. The hard black mass was extracted with 0.1 N hydrochloric acid followed by extraction with methanol and drying in vacuo. In order to determine the solubility of the polymer, a 10-g portion of this black mass was extracted with 100 mL of ethanol. Extraction data showed that 2.7 wt % of the product dissolved in ethanol.

TABLE 2

Preparation of nitrogen-containing pitches.

| Quinoline (g) | AlCl$_3$ (g) | Temp. (° C.) | Time (hr) | Yield (g, %) | Ethanol-S (g) | Ethanol-I (g) |
|---|---|---|---|---|---|---|
| 64.5 | 33.25 | 280 | 12 | 57.7 (89%) | — | — |
| 64.5* | 33.25 | 175 | 12 | 0 (0%) | — | — |
| 64.5* | 33.25 | 280 | 12 | 59.1 (92%) | — | — |
| 64.5* | 33.25 | 280 | 4 | 56.8 (88%) | 7.3** (73%) | 2.7 (27%) |

*indicates reactions carried out in 300-mL Parr reactor.
**indicates 10 g of pitch was extracted with ethanol.

Example I-7. Preparation of Polymer and Pitch Surface Impregnated Carbon

Impregnations and recarbonizations were performed to investigate the effects of precursor concentration, activation procedure, and sorbent particle size on mercury sorption. The precursor base carbon, granular activated carbon (Calgon F400 or Gascoyne AC, 20×60) was impregnated with various nitrogen-containing polymers and pitches using an incipient wetness method, described below. For the fine-particle sorbent tests in flue gas compositions, the Calgon carbon was ground to about a 400 mesh size prior to impregnation. The nitrogen polymers such as vinylpyrrolidone polymers and copolymers are commercially available. The urea, alanine-dextrose, piperazine-dextrose, and polyethylenimine-dextrose compositions were prepared similarly.

In a typical procedure for the incipient wetness method, the desired amount of polymer or pitch dissolved in an appropriate solvent was added to the carbon slowly with thorough mixing. The paste was dried to remove solvent. The dried product was packed in a stainless steel tube and activated in a gentle flow of nitrogen using procedure A or procedure B.

Procedure A included: Heated from 25° C. to 400° C. at 10° C./min; held at 400° C. for 30 min; heated from 400° to 750° C. at 20° C./min; and held at 750° C. for 4 hr.

Procedure B included: Heat from 25° C. to 225° C. at 15° C./min; heated from 225° C. 270° C. at 1° C./min; held at 270° C. for 1 hr; cooled to room temperature; heated up to 750° C. at 15° C./min; and held at 750° C. for 4 hr.

Example I-8. Preparation of Nitrogen-Containing Surface Impregnated Carbons from Insoluble Pitch Fractions Insoluble fractions of pitches described in Table 1 were converted into nitrogen-containing carbons by heating in a gentle flow of nitrogen using Procedure B as described above. The resulting carbons were porous glassy materials, similar to cokes.

Example I-9. Preliminary Screening of Sorbents Made Using the Nitrogen-Containing Materials of Examples I-6 and I-7 for Mercury Capture Example I-9a. Simulation of the Sulfuric Acid Accumulation Capture of $SO_3$ and subsequent sulfuric acid formation on the surface of the nitrogen-containing carbons in the hot flue gas stream was simulated by adding 5 wt % sulfuric acid by the incipient wetness method. The acid-impregnated carbons were dried at 110° C.

Example I-9b. Packed-Bed Tests

Packed-bed tests in airflow were conducted on the granular carbon products to evaluate the effects of surface modification. The mercury sorption was tested in a flow-through tubular reactor system equipped with continuous in-line mercury analysis of the effluent from the bed to determine mercury removal rates as a function of time. Integration of breakthrough volumes allows determination of mercury sorption per unit mass carbon (mg/g). Air with an elemental mercury concentration of 56 or 81 µg/m$^3$ was passed through the heated (150° C.) reactor. To obtain this concentration, the mercury source was placed in a double-jacketed glass condenser and heated to the desired temperature by pumping hot oil through the condenser.

A glass tube with constriction and glass wool plug was used as the reactor for the mercury sorption tests. A gas chromatography (GC) oven was used as a constant temperature (150° C.) chamber for the reactor. Before the actual test, a blank test was run. The glass tube was attached to the source and the mercury analyzer by Teflon tubes. Mercury vapors diluted with air (2000-4000 cm$^3$/min or 4-8 scfh measured at the detector end) were passed through the tube. The mercury analyzer (Environmental and Process Monitoring [EPM] continuous vapor monitor) was interfaced to a Hydra and personal computer (PC) to record the data. For the packed-bed tests, impregnated activated carbons (20×60 mesh size) were used. In an actual test, about 0.2-0.6 g of sorbent was packed in the glass tube and held by glass wool plugs on both ends. The tests were conducted with a source temperature of 150° C., an oven temperature of 150° C., and an airflow=4 or 8 scfh (4000 cm$^3$/min). Numerous tests were performed at 4000 cm$^3$/min (8 scfh) with carbons prepared by impregnation of various nitrogen compounds, polymers, and pitches into a base Calgon carbon (Tables 3 and 4). These conditions gave partial breakthroughs for the sorbents and allowed comparisons of their kinetic activities.

TABLE 3

Sorbent testing of surface-treated carbons for mercury removal at 8 scfh.
Airflow = 4000 cm$^3$/min (8 scfh), over temperature = 150° C., mercury concentration = 81 µg/m$^3$.

| Carbon source | Recarbonization method | H$_2$SO$_4$ Impregnation | % Hg removed (time, min) Initial | 50% | End of test |
|---|---|---|---|---|---|
| Blank | — | — | 0 (0) | <1 | — |
| Calgon | | 5% | 87 (0) | 50 (171) | 38 (304) |
| Calgon ®** | A | 5% | 95 (0) | 50 (305) | 49 (306) |
| EERC*/urea | A | 5% | 100 (0) | 50 (575) | 38 (1221) |
| Calgon/2% sulfamic acid | A | 5% | 92 (0) | 50 (226) | 39 (1303) |
| Calgon/5% PVP | A | 5% | 94 (0) | 50 (2217) | 42 (2574) |
| Calgon/10% PVP | A | 5% | 88 (0) | 50 (150) | 55 (253) |
| Calgon/10% PVP | A | 5% | 90 (0) | 50 (300) | 65 (1098) |
| Calgon/5% PVP | A | 5% | 98 (0) | 50 (3315) | 43 (4010) |
| Calgon/2% PVP | A | 5% | 79 (0) | 50 (312) | 49 (320) |
| Calgon/10% PVP | A | 5% | 85 (0) | 50 (424) | 30 (1114) |
| Calgon/5% vinylpyrrolidone-vinyl acetate copolymer | A | 5% | 90 (0) | 50 (84) | 39 (180) |
| Calgon/5% vinylpyrrolidone-acrylic acid copolymer | A | 5% | 90 (0) | 50 (76) | 29 (362) |
| Calgon/5% vinylpyrrolidone-acrylic acid copolymer | A | 5% | 98 (0) | 50 (223) | 50 (223) |
| Calgon/polyethylenimine | A | 5% | 88 (0) | 50 (373) | 22 (1147) |

TABLE 3-continued

Sorbent testing of surface-treated carbons for mercury removal at 8 scfh.
Airflow = 4000 cm³/min (8 scfh), over temperature = 150° C., mercury concentration = 81 μg/m³.

| Carbon source | Recarbonization method | $H_2SO_4$ Impregnation | % Hg removed (time, min) | | |
|---|---|---|---|---|---|
| | | | Initial | 50% | End of test |
| Calgon/dextrose + polyethylenimine | A | 5% | 88 (0) | 50 (51) | 35 (350) |
| Calgon/dextrose + alanine | A | 5% | 88 (0) | 50 (76) | 53 (216) |
| Calgon/dextrose + piperazine | A | 5% | 65 (0) | 50 (35) | 25 (942) |

*indicates that the activated carbon was prepared in Example I-4a.
**Centaur ® commercial carbon manufactured by Calgon.

TABLE 4

Sorbent testing of nitrogenous pitch-impregnated carbons for mercury capture. Recarbonization procedure B was used for all samples. Sorbent = 0.20 g, particle size = 20 × 50 mesh, airflow = 8 scfh (4000 mL/min), source temperature = 150° C., oven temperature = 150° C.

| File name | Sorbent (g) | $H_2SO_4$ (wt %) | Mercury Concentration (μg/m³) | % Hg removed (time, min) | | |
|---|---|---|---|---|---|---|
| | | | | Initial | 50% | Final |
| RKS32 | None | — | 81 | — | 50 <1 | — |
| RKS35 | Calgon/5 wt % quinolone* | 5% | — | 89 (0) | 50 (306) | 49 (308) |
| RKS23 | Calgon/5 wt % quinolone* | 5% | — | 91 (0) | 50 (204) | 46 (292) |
| RKS37 | Calgon/5 wt % quinoxaline | 5% | — | 90 (0) | 50 (632) | 25 (1300) |
| RKS31 | Calgon/5 wt % isoquinoline | 5% | — | 90 (0) | 54 (584) | 34 (1214) |
| RKS75 | Calgon/5 wt % indole | 5% | — | 98 (0) | 50 (1403) | 49 (1473) |

*indicates pitch obtained from heating quinolone and aluminum (III) chloride in Parr reactor was dissolved in ethanol and impregnated on Calgon carbon.
** indicates pitch obtained from refluxing of quinolone with aluminum (III) chloride was dissolved in EDA and impregnated on Calgon carbon.

Example I-9c. Test Results

A comparison of the base or core Calgon sorbent with the sorbents prepared by impregnation and carbonization of nitrogenous polymer precursors showed that most of the resulting sorbents with the nitrogen containing layer gave better initial capture rates as well longer 50% breakthrough times as an indication of better capacity. Carbons prepared by impregnation of urea into an EERC carbon or sulfamic acid into the Calgon base carbon and recarbonization gave initial capture rates of 100% or 92%, respectively. These results are significantly better than those observed with the unmodified Calgon carbon. The sorbent prepared by impregnation of 5 wt % PVP and activated using Procedure A (fast heating rate) demonstrated superior activity. The initial removal was 94%, and the decrease to 50% removal required 2217 min. Thus, this sorbent retains its high activity far longer than the Centaur carbon. The sorbent prepared using 10% PVP (also Procedure A) was less active (initially 88% removal, decreasing to 50% at 150 min.

Comparing the difference in preparation and resulting structure of these two sorbents can provide insight into their respective activities for mercury capture. The Centaur carbon is a non-impregnated catalytic carbon and is a nitrogenous carbon where the nitrogen is highly dispersed in the carbon matrix. The Centaur carbon is prepared by combining urea with a low temperature bituminous char which results in reaction with the carbon structure and incorporation into the edge structures of the carbon, wherein a base char of lower stability that is susceptible to nitrogen incorporation into aromatic rings is used to prepare these catalytic carbons. This is in contrast to sorbents prepared via deposition of nitrogenous polymers in a layer over a base stable activated carbon, where they are subsequently pyrolysed and converted to an irregular lattice structure covering the base carbon with little covalent bonding and incorporation into the activated carbon edge structures. The chemical nature of the irregular lattice structure can be similar to that observed during pyrolysis and carbonization of PVP and copolymers thereof on other substrates. Molecular sieve membranes (CSM) can be made by heating PVP and copolymers thereof. Molecular rearrangements occur during heating that result in formation of a barrier structure with nanopores that allow passage of small gas molecules. The nitrogen-containing lattice structures formed from PVP include nitrogen present in several forms, such as 5 and 6-membered rings with carbon. Comparison of the yield of the 5% PVP sorbent in these Examples showed a weight gain corresponding to 60% conversion of the PVP to a layer structure, which is consistent with conversions obtained for preparation of molecular sieve membranes from PVP. Nitrogen analysis results for the 5% PVP sorbent were also consistent with the nitrogen content of CMS structures.

Using procedure B (slower heating rate) gave more active sorbent at the 10% PVP concentration level. Another set of carbons was prepared with different concentrations using Procedure B. Again, the impregnation with 5% concentration of PVP resulted in high activity (initially 98% removal, decreasing to 50% at 3315 mm). The 10% PVP was again less active, and the 2% PVP concentration was the least active.

The carbons prepared from the copolymers of PVP were also prepared and evaluated. The copolymer with vinyl acetate (PVPcoVA) impregnated at 5% concentration (Procedure A) gave a sorbent with relatively low activity. The poly(vinylpyrrolidone-co-acrylic acid) (PVPcoAA) at 5% also gave a low activity sorbent. Using Procedure B for activation improved the activity slightly.

Another type of N-polymer-impregnated carbon was prepared using polyethylenimine. This polymer precursor contains nitrogen in the polymer backbone, in constrast to the PVP where the nitrogen is attached to the carbon chain backbone. The activity was similar to that of the 10% PVP polymers.

Several carbons were prepared by impregnating mixtures of dextrose and amines. None of these exhibited high activities in these tests. Previous tests showed that the dextrose+alanine-impregnated carbon (Procedure B) was fairly active. Since Procedure A was used in the present study, decreases in activity might be related to the fast heating rate used. It may be quite beneficial to perform the reaction slowly in preparing sorbents from these precursors.

The sorbents prepared by impregnation of the nitrogenous pitches prepared by polymerization of various heterocyclics were all fairly active (Table 4), but significant differences in activity were observed. The N-carbon prepared from impregnation of quinoxaline pitch was 2-3 times more active than the quinoline-derived N-carbon. The activity of the isoquinoline-derived carbon was also very high. The high activity of the indole-derived carbon was also of great interest. It is an important lead since indoles are more readily available than the quinoxaline precursors.

Testing was also conducted on the carbonized pitches prepared from the insoluble fractions of the nitrogenous pitches. The activities of the carbonized pitches were very poor. Initial breakthrough was substantial, with percent removals of 21% to 54%, possibly related to the glassy nature of the carbonized pitches. Although the surface areas were not determined, they may be very low, since the materials did not resemble activated carbons but, rather, cokes.

Analysis of the composite sorbent prepared by impregnation of activated carbon with 5% polyvinylpyrroldone gave the composition C 87.6%, N 0.35%, H 0.10%, ash 12.4%. The nitrogen in the starting activated carbon was 0.11%. Thus the nitrogen added in the nitrogen layer structure is 0.24% of the composite weight. Since the nitrogen layer structure represents 3% of the weight of the composite, approximately 8% of the weight of the nitrogen layer structure is nitrogen Part II.

Example II-1. Sorbent Enhancement Additive—Ammonium Bromide

Ongoing efforts to optimize sorbent reactivity led to investigations of fundamental interactions and comparisons of sorbent enhancement additive (SEA) alternatives. The use of SEAs is effective for in-flight mercury capture with low-reactivity coals that contain a high fraction of elemental mercury, or coals that produce flue gas with high concentrations of $SO_x$, ($SO_2$, $SO_3$, and the like) in the flue gas. Without these additives, mercury capture would occur too slowly and/or require too much sorbent to make in-flight capture feasible for plants that burn these coals.

Testing was performed on the EERC particulate test combustor (PTC) under two different sets of conditions. Interaction testing was performed while natural gas was fired with elemental mercury spiked into the combustor from a mercury vapor generation source. SEA reactivity testing was performed during combustion of a coal. Mercury monitoring was primarily with continuous mercury monitors (CMMs), which were augmented with periodic U.S. Environmental Protection Agency (EPA) Method 29 (M29) and sorbent trap (ST) measurements of flue gas mercury. Online mercury monitoring was conducted at the electrostatic precipitator (ESP) outlet, where two analyzers were stationed; one was dedicated to monitoring the total side of the conversion system while the other was dedicated to elemental data. A third analyzer was stationed at the wet flue gas desulfurization (FGD) outlet, and under these testing conditions, it effectively served as a backup of the elemental reading at the ESP outlet.

For these tests, sodium bromide (NaBr) and ammonium bromide ($NH_4Br$) were used as the SEAs. The sodium bromide was added to the coal and the ammonium bromide was added just upstream of the carbon sorbent. The sodium bromide and ammonium bromide decompose on heating (by the flue gas) to form sodium and gaseous HBr, and ammonia and gaseous HBr, respectively, the active SEAs. The HBr combines with carbon (and interacts with mercury) and the ammonia is incorporated in the carbon pores/surface and intercepts the $SO_2$ or $SO_3$ in the flue gas before it can interfere with mercury adsorption. Tests were done at equivalent amounts of bromine from the addition of the sodium bromide and ammonium bromide to determine and demonstrate the added benefit of the ammonia on the surface layer of the carbon.

Example II-1a. Pilot Scale Testing with Natural Gas Spiked with Mercury

For the interaction testing, the PTC was fired with natural gas and elemental mercury was spiked into the primary air feed entering the combustor. Ammonium bromide was injected at two different temperature locations. A summary of the natural gas test data is presented in Table 5.

TABLE 5

Summary of natural gas test results.

| Condition | Sorbent Injection Rate, lb/Macf at 300° F. | Br-Equivalent Injection Rate, lb/Macf at 300° F. | ESP Out $Hg_{(T)}$, µg/dNm³ at 3% $O_2$ | ESP Out $Hg^0$, µg/dNm³ at 3% $O_2$ | $Hg_{(T)}$ Reduction at ESP Out, % | $Hg^0$ Reduction at ESP Out, % |
|---|---|---|---|---|---|---|
| Hg Spike Baseline | N/A | N/A | 12.7 | 12.2 | N/A | N/A |
| Standard AC into ESP | 2.0 | 0 | 3.0 | 2.8 | 76 | 77 |
| NaBr Salt Added to Coal into Combustor | 2.9 | 0.32 | 1.1 | 0.5 | 92 | 96 |
| Ammonium Bromide Added to 725° F. Duct, Standard AC into ESP | 2.9 | 0.30 | 0.5 | 0.1 | 96 | 99 |
| Ammonium Bromide Added to 361° F. Duct, Standard AC into ESP | 2.9 | 0.30 | 0.6 | 0.2 | 96 | 98 |

As Table 5 shows, injection of sodium bromide and ammonium bromide resulted in a significant reduction of mercury exiting the ESP. Both the sodium bromide and ammonium bromide demonstrated that almost all of the spiked elemental mercury was oxidized and over 90% of the spiked mercury was captured in the ESP as compared to only 76% with the standard AC alone.

Example II-1b. Pilot Scale Testing with Coal

Testing with sodium bromide ammonium bromide was also performed while firing a coal. A summary of this test data is provided in Table 6.

TABLE 6

Summary of SEA reactivity test results.

| Condition | Sorbent Injection Rate, lb/Macf at 300° F. | Br Equivalent Injection Rate, lb/Macf at 300° F. | ESP Out $Hg_{(T)}$, µg/dNm³ at 3% $O_2$ | ESP Out $Hg^0$, µg/dNm³ at 3% $O_2$ | $Hg_{(T)}$ Reduction at ESP Out, % | $Hg^0$ Reduction at ESP Out, % |
|---|---|---|---|---|---|---|
| Baseline | N/A | N/A | 6.9-7.6 | 4.9-5.9 | N/A | N/A |
| Standard AC into ESP | 1.9 | N/A | 3.6 | 2.6 | 47 | 46 |
| NaBr Salt Added to Coal into Combustor | 1.9 | 0.28 | 1.7 | 0.8 | 77 | 87 |
| Ammonium bromide into 665° F. Duct | N/A | 0.30 | 4.8 | 2.6 | 37 | 56 |
| Ammonium bromide into 355° F. Duct, Standard AC into ESP | 1.9 | 0.30 | 1.9 | 1.4 | 73 | 71 |
| Ammonium bromide into 502° F. Duct, Standard AC into ESP | 1.9 | 0.30 | 0.9 | 0.5 | 86 | 89 |
| Ammonium bromide into 668° F. Duct, Standard AC into ESP | 2.0 | 0.30 | 0.6 | 0.2 | 91 | 95 |

TABLE 6-continued

Summary of SEA reactivity test results.

| Condition | Sorbent Injection Rate, lb/Macf at 300° F. | Br Equivalent Injection Rate, lb/Macf at 300° F. | ESP Out $Hg_{(T)}$, μg/dNm³ at 3% $O_2$ | ESP Out $Hg^0$, μg/dNm³ at 3% $O_2$ | $Hg_{(T)}$ Reduction at ESP Out, % | $Hg^0$ Reduction at ESP Out, % |
|---|---|---|---|---|---|---|
| Ammonium bromide into 951° F. Duct, Standard AC into ESP | 2.0 | 0.31 | 0.6 | 0.1 | 92 | 97 |

Figure 7:
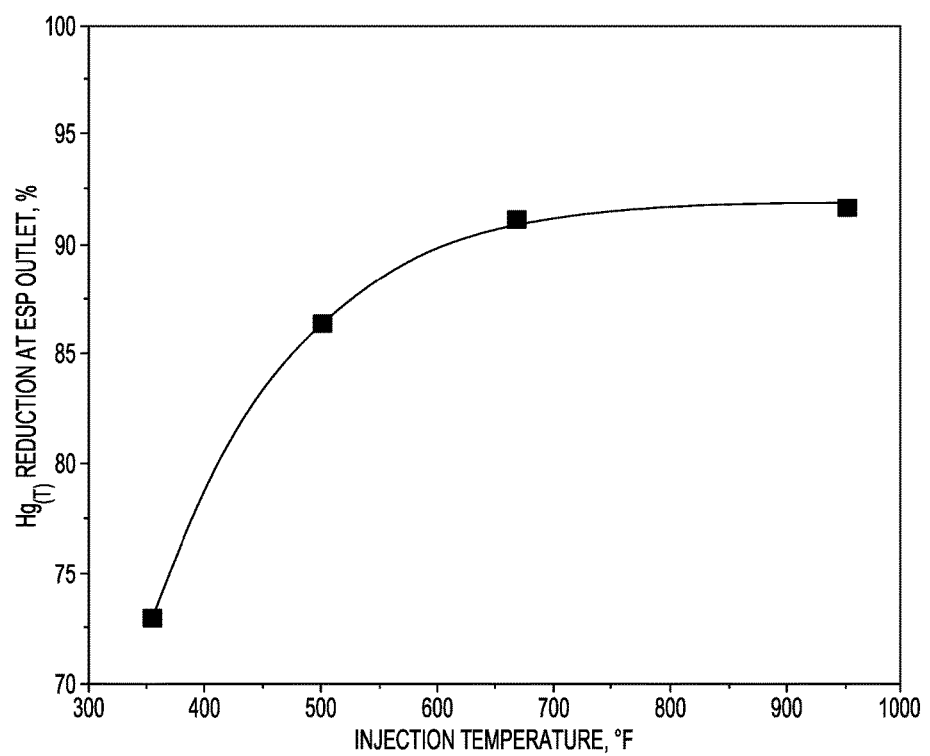
FIG. 7 illustrates mercury reduction versus injection temperature for a sorbent with an inorganic matrix with ammonium bromide for promotion and protonation, in accordance with various embodiments.

As shown in Table 6, the addition of sodium bromide and ammonium bromide resulted in significant oxidation and reduction of mercury exiting the ESP as compared to baseline. With the injection of standard activated carbon (AC) alone, the mercury removal across the ESP was approximately 47%. With the addition of ammonium bromide alone, the mercury removal across the ESP was approximately 37%. With the addition of sodium bromide and standard AC the mercury removal across the ESP was approximately 77%, significantly better than with the standard AC alone. With the addition of ammonium bromide and standard AC the mercury removal across the ESP approached 92%, significantly better than with the standard AC alone, and better than the results with sodium bromide and AC. Since all tests were done at equivalent amounts of bromide addition, the results show the added benefit of the ammonia and its ability to interact with $SO_3$ on the carbon surface, further protecting the active sites for more effective capture of mercury. As Table 6 shows, the addition of ammonium bromide was investigated as a function of injection temperature, and these results are graphically summarized in FIG. 7. As indicated in FIG. 7, the addition of ammonium bromide appeared to be more effective as the temperature increased from approximately 350° F. to 668° F., with little to no difference observed at the higher temperatures. By the 668° F. injection temperature, the maximum effect of the ammonium bromide additive was observed, and no further benefit was observed when injected at even higher duct temperatures. However, even at lower temperatures of approximately 350° F., the addition of ammonium bromide showed significant improvement over AC injection alone. Thus, it is likely that the decomposition of ammonium bromide to bromine (or HBr) and ammonia may not fully occur at lower temperature, whereas at higher temperature a higher proportion (if not all) of the ammonium bromide decomposes to form the active SEAs that promote and protect the active sites.

Example II-2. Mesoporous Activated Carbon Nanocomposites from Commercial Cane Molasses Example II-2a. NanoG-CM High-surface-area montmorillonite (clay) obtained from Aldrich (200 g) was added rapidly to Brer Rabbit molasses (nonsulfurated) diluted with a smaller amount of water (200 g/140 mL) and stirred to make a thick paste.

As soon as all the clay was wetted with the molasses, the paste was dried overnight at 110° C. to remove excess water. Alternatively, a smaller portion of the paste was heated for 1 min in a microwave. A smaller batch was dried more quickly (1 hour) in the oven at 110° C.

The dried solid was loaded in two batches in a cylindrical steel tube and heated to 700° C. in a tube furnace with a flow of nitrogen through the bed. The effluent gas was bubbled through a water trap. Heating was continued for 1 hour. The tube was cooled slowly to ambient under nitrogen and emptied. The resulting black chunks of composite carbon were weighed and ground in a mortar and pestle. The product nanocomposite was separated into two sieve sizes, +325 and −325 mesh. The −325 material was used for the Hg capture tests.

Yield of nanocomposite was 217 g.

Example II-2b. NanoG-CB

Preparation was similar to NanoG-CM, except high-sodium bentonite was substituted for the montmorillonite. Yield was 10.1 g from 10.0 grams of bentonite.

Example II-2c. Impregnation of Promotion Agent

Ammonium bromide: An aqueous solution of ammonium bromide (7.3 g/35 mL) was added to 54 g of −325 mesh nanocomposite and stirred to form a paste. The paste was dried at 110° C. and reground.

Hydrogen bromide: Aqueous HBr (0.1 N) was added to NanoG-CM (10 g) and the mixture stirred for 1 hr. The slurry was filtered and dried at 110° C.

Bromine: Bromine vapor (0.5 g) was transferred to a vial containing the powdered composite (10 g), where it was adsorbed.

Sulfur: Elemental sulfur (1 g) was dissolved in carbon disulfide (20 mL), and 10 g of nanoG-CM was added. After stirring overnight the carbon disulfide was removed.

Example II-3. Mesoporous Activated Carbon Nanocomposites

The previous versions of the nanoG EERC clay-carbon composites were prepared using cane sugar molasses. Using local molasses would provide a more convenient source. What is normally available in large amounts is a low-value raffinate remaining from sugar and betaine extraction. The amount of dissolved inorganic salts is much higher (>10%) than commercial cane molasses and the sugar content is lower.

Nanocomposites were prepared using raffinate and two types of clay, a highly swelling, high-sodium bentonite and a low-swelling montmorillonite from Aldrich. Both were ground very finely.

Example II-3a. NanoG-ACSB

The bentonite was swelled by adding 10 g of dry bentonite to 80 g of water and grinding with a mortar and pestle. Raffinate (10 g) was added to the gelled mixture and mixed by grinding. After standing overnight to further disperse the sugar in the raffinate into the clay, the mixture was heated in a microwave at full power for 1 minute to develop macroporosity in the gel. The gel was dried overnight in a drying oven at 110° C.

The dried solid was loaded in two batches in a cylindrical steel tube and heated to 700° C. in a tube furnace with a flow of nitrogen through the bed. The effluent gas was bubbled through a water trap. Heating was continued for 1 hr. The tube was cooled slowly to ambient under nitrogen and emptied. The resulting black chunks of composite carbon were weighed and ground in a mortar and pestle.

Yield of nanocomposite was 10.2 g.

Example II-3b. NanoG-2ACSB

Preparation was similar to NanoG-ACSB except the weight of raffinate added was doubled. Yield was 10.5 g.

Example II-3c. NanoG-2ACSM

Preparation was similar to NanoG-CM except ACS raffinate was used and the amount doubled. Yield was 10.5 g.

Example II-3d. Impregnation of Promotion Agent

Ammonium bromide: An aqueous solution of ammonium bromide (1.1 g/5 mL) was added to 10 g of nanocomposite and stirred to form a paste. The paste was dried at 110° C. and reground.

Bromine: Bromine vapor (0.5 g) was transferred to a vial containing the powdered composite, where it was partially adsorbed (chemisorbed).

Example II-3e. NanoG-2ACSB-Washed

A sample of NanoG-2ACSB was stirred with water overnight, filtered, and then stirred with 0.1 N HBr for 2 hr. The slurry was filtered, and the composite was dried at 110° C. The sample was contacted with bromine vapor as above.

Example II-4. Bench-Scale Hg Sorption Tests of NanoG Sorbents of Examples II-2 and II-3

Bench-scale Hg sorption tests were conducted to evaluate the performance of the sorbents in a bed configuration for sorption of elemental Hg vapor in flue gas. These results are summarized in Table 7. While not as accurate at evaluating performance in an injection mode with very short contact time, the initial reactivity (as % Hg capture) and the initial slope give a preliminary determination of reactivity in a short time scale. When the initial slope is flat, there are many active sites and a high reactivity is found. A steep initial slope relates to instant breakthrough.

The NanoG composite sorbents prepared from the cane molasses (NanoG-CM) gave excellent reactivities (98%-99% capture) at the start of the experiment and continued with high capture efficiency for 15 minutes (flat slope). On the other hand, the ACS raffinate gave lower reactivities and lower capacities (shorter 50% breakthrough times) compared with the composites prepared from cane sugar molasses. The amounts of carbon contained in the ACS composites were considerably less, owing to the lower sugar content, higher salt content and, perhaps, different burn-off rate. The composites prepared with double the amount of molasses were less reactive than the lower dosage. These results could be explained by salt blockage in the pores of the composites from the raffinate. The evolution of large amounts of $H_2S$ when water was added to the sorbents is consistent with the formation of $K_2S$ in the pores resulting from reduction of sulfate as well as the high potassium concentration. When the raffinate sorbent was washed to dissolve out the salts, the reactivity and capacity improved considerably.

TABLE 7

Summary results for fixed-bed screening of NanoG sorbents.

| Sorbent | Promotion Reagent | Initial Reactivity, % Hg Capture | Initial slope | 50% Breakthrough, Time, hr |
|---|---|---|---|---|
| NanoG-CM | $Br_2$ | 98 | Flat | 0.45 |
| NanoG-CM | Am. bromide | 99 | Flat | 0.38 |
| NanoG-CM | HBr | 97 | Moderate | 0.29 |
| NanoG-CM | S | 92 | Steep | 0.06 |
| NanoG-2ACSM | $Br_2$ | 67 | Steep | 0.02 |
| NanoG-2ACSB | $Br_2$ | 95 | Steep | 0.16 |
| NanoG-2ACSB | Am. bromide | 90 | Steep | 0.29 |
| NanoG-ACSB | Am. bromide | 97 | Moderate | 0.32 |
| NanoG-2ACSB-washed | $Br_2$ | 97 | Moderate | 0.53 |

Although sulfurization of ACs produces carbons with good reactivities for Hg, the addition of sulfur to the NanoG sorbent did not result in a good capacity. It is likely that the sulfur blocked the pores in the limited amount of porosity available in these sorbents. It is likely that the $K_2S$ present in unwashed composites may have a beneficial effect on Hg capture if it can be removed from the carbon pores and localized on the clay matrix.

A comparison of HBr with $Br_2$ showed that $Br_2$ gave higher reactivity and capacity. A reason for this is that carbenium-bromide ion pairs in these composite sorbents are less hydrated and more reactive in the sorbents produced by vapor deposition.

The ammonium bromide-promoted sorbents gave very good reactivities and capacities, consistent with teaching that the decomposition of the ammonium bromide in the pores on heating forms ammonia (a nitrogen source) and gaseous HBr. The HBr combines with carbon deposited on the proximate nanocarbon surfaces decorating the clay layers (sheets). Also, the ammonia is trapped inside the acidic clay layers of the composite where it is available for interacting/intercepting the $SO_3/SO_2$ in the flue gas before it can oxidize on the carbon surface.

Example II-5. Pilot-Scale Evaluation

The optimal sorbent, NanoG-CM of Example II-2a, was evaluated at the pilot scale using the EERC PTC. The coal for that evaluation was a subbituminous coal, and comparisons were made to a commercially available untreated carbon.

Figure 8:
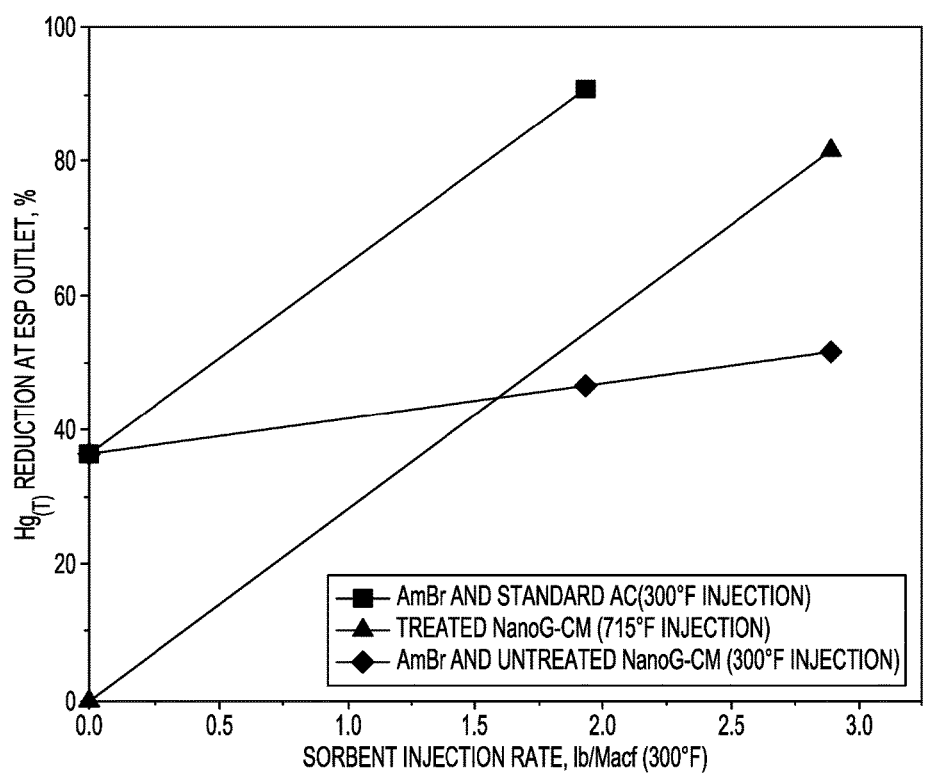
FIG. 8 illustrates mercury reduction versus sorbent injection rate for various sorbents, in accordance with various embodiments.

Results from the PTC tests are summarized in FIG. 8 for the commercially available standard activated carbon (AC) and two options with NanoG-CM. The standard AC and the untreated NanoG-CM were tested with the addition of ammonium bromide. As indicated in FIG. 8, the results were better with the ammonium bromide and standard AC; however, the NanoG-CM did show potential for in-flight capture. The addition of ammonium bromide improved mercury capture in all cases and was much better than standard AC alone. Encouraging results were obtained with a treated sample of NanoG-CM. It was determined through a set of tests performed for SEA development that the pretreatment used with NanoG-CM was most effective at pre-air heater temperatures. Therefore, during evaluation of the treated NanoG-CM, it was injected into the ductwork at a point where the flue gas temperature was approximately 715° F.

FIG. 8 suggests that the NanoG-CM material shows potential as an in-flight mercury sorbent, but the total injected sorbent rates are higher than those with the standard AC. However, an alternate comparison is to evaluate the test results on a carbon component (%) basis, since the underlying economic assumption for composite sorbents is that the AC component is perhaps an order of magnitude more expensive than the inorganic substrate. The results from FIG. 8 have been rescaled in FIG. 9 to depict the equivalent carbon-only injection rate for the three options. The standard AC results remain unchanged because they were considered 100% AC. Mineral components of the carbon were not deducted, but the NanoG-CM data reflect much lower carbon-only injection rates since the average carbon content for NanoG-CM was only 8%.

Figure 9:
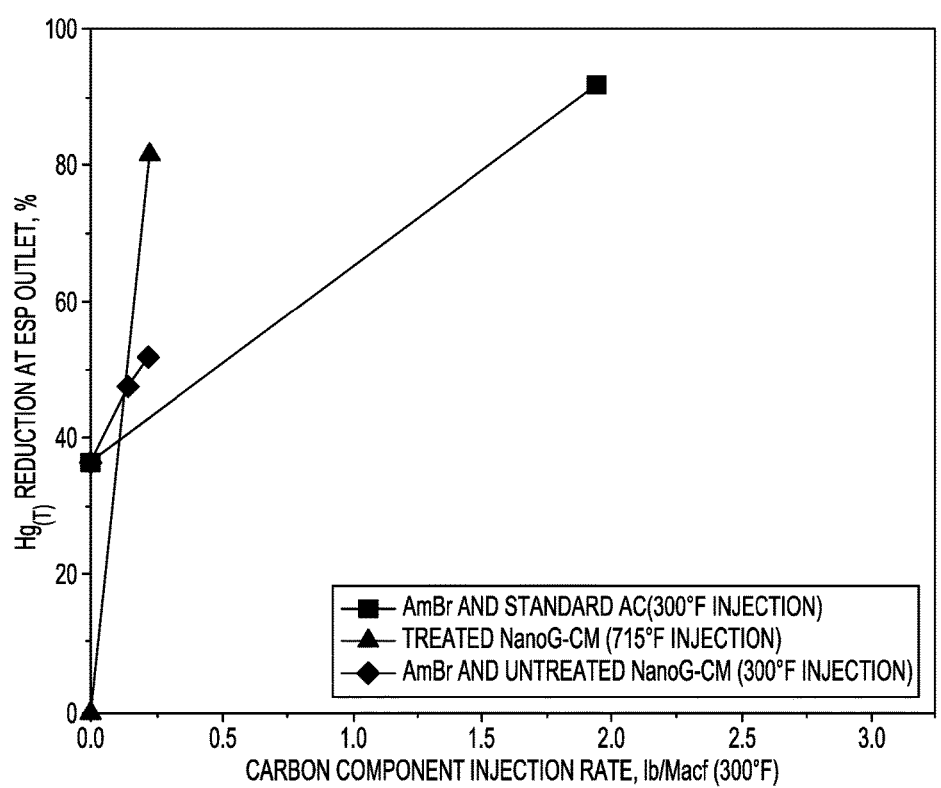
FIG. 9 illustrates mercury reduction versus carbon component injection rate for various sorbents, in accordance with various embodiments.

The carbon-only results of FIG. 9 demonstrate at least one of the beneficial aspects of the proposed composite sorbents: increased carbon utilization. Comparison of the standard AC and the NanoG-CM results in FIG. 9 suggests that the bulk of the standard AC's carbon content, e.g., the interior portion, goes unused and is not a significant factor in overall mercury capture. This provides evidence that only the envelope surface area and near-surface sites are important for in-flight capture of mercury. Improved carbon utilization may have a beneficial effect on consumable sorbent cost as long as the base material cost advantage is not outweighed by added or more complicated production steps. Furthermore, improved carbon utilization will make it easier for utilities to meet carbon content restrictions in fly ash destined for use in concrete.

Part III. Promoted Ammonium Salt-Protected Sorbent.

Example III-1. Full-Scale Plant with Low-Sulfur Coal and SO$_3$ Injection for Ash Conditioning Tests were conducted on a full-scale 550 Mw plant equipped with an ESP for particulate control and that burns a low-sulfur coal for SO$_2$ compliance. SO$_3$ ash conditioning was used to assist the ESP in controlling opacity and particulate matter (PM) stack emissions. During the test, SO$_3$ was injected upstream of the ESP in the range of 0-20 ppmv. The addition of SO$_3$ to the flue gas has been previously shown to significantly negatively impact mercury capture efficiency. All tests were conducted at full load.

During the test, a halogen promoter (NaBr, to form HBr) was injected into the furnace along with three different sorbents included activated carbon and additional components to protect mercury active sites (e.g., binding sites). These sorbents were injected upstream of the air heaters. Sorbent 1 was approximately 75% activated carbon and 25% clay material (bentonite, as described in U.S. Pat. No. 8,652,235 B2). Sorbent 2 was approximately 75% activated carbon and 25% hydrated lime (per U.S. Pat. No. 7,435,286 B). Sorbent 3 included approximately 75% activated carbon and 25% ammonium sulfate. The activated carbon component had a mean size of approximately 14-18 microns. Each of the other three components (clay, alkali, and ammonium salt) had a mean size of approximately 4-9 microns. The halogen promoter was injected with rates in the range of 0.0-0.7 lb/Macf (million actual cubic feet) and the sorbents were injected in the range of 0-7 lb/Macf. Each sorbent was tested separately along with the halogen promoter.

Figure 10:
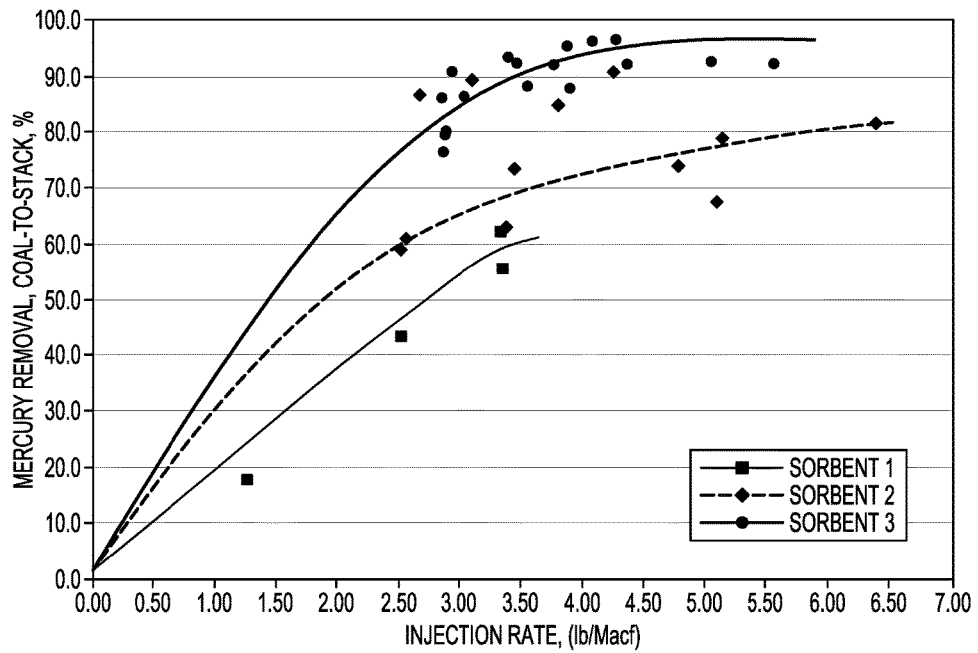
FIG. 10 illustrates mercury removal versus sorbent injection rate, according to various embodiments.

Typical results are illustrated in FIG. 10 while 5-6 ppmv of SO$_3$ was injected. As shown in FIG. 10, the addition of the alkaline component (lime) or the ammonium salt with the activated carbon vastly improved mercury removal. Sorbent 3 and 2 performed better than Sorbent 1, which based on past data generally performs similar to slightly better than standard activated carbon alone. The results show that adding ammonium salts resulted in consistent mercury removals of greater than 90% and addition of alkali components showed greater than 80% with some results up to 90%. FIG. 10 clearly shows the impact of SO$_3$ on the active sites of activated carbon when no alkaline or ammonium salt component was added (e.g., for Sorbent 1). While the addition of optional components such as alkali and ammonium convincingly assist in protecting active sites, they cannot totally eliminate the impact of contaminant flue gas components, such as SO$_3$.

Figure 11:
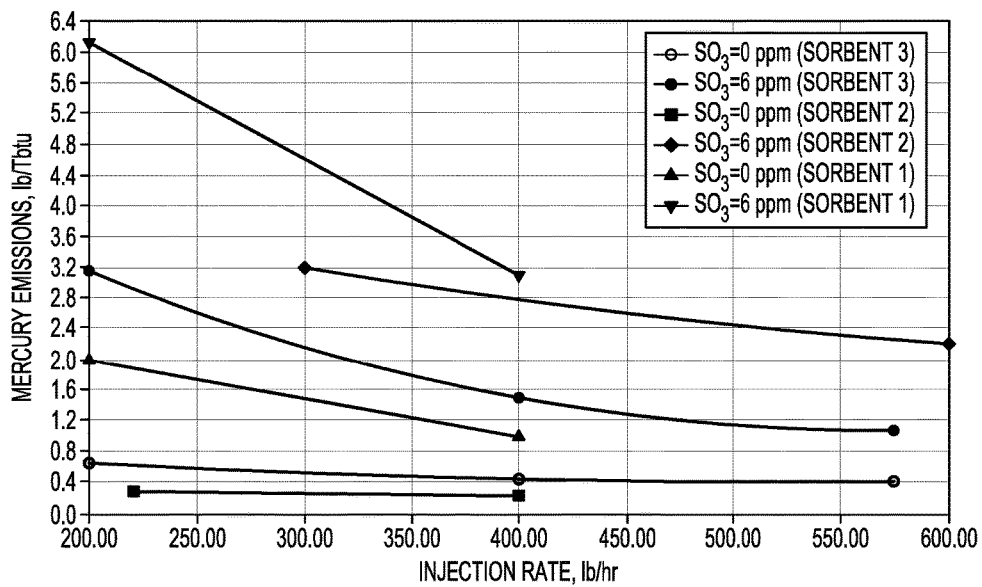
FIG. 11 illustrates mercury emissions versus sorbent injection rate at various $SO_3$ injection rates for various sorbents, in accordance with various embodiments.

Data from similar tests show that injecting similar quantities of other alkali and ammonium along with activated carbon show improved mercury capture. This indicates that synergy occurs that improves performance when adding (or co-injecting) two materials together. FIG. 11 illustrates mercury emissions versus injection rate at various SO$_3$ injection rates (0 or 6 ppmv) for Sorbent 2 or 3. The results indicate that active sites on activated carbon can be consumed by sulfur species and other contaminants. The ammonium and/or alkali material (together or separately) interact and react with these species thus minimizing their consumption of activated carbon mercury active sites (e.g., binding sites). Further, the addition of these components may also further promote the activated carbon such that it is more reactive toward mercury capture. Thus, combining additional components with treated and/or non-treated activated carbon synergistically takes advantage of these mechanisms, resulting in improved mercury capture at reduced costs. Further, depending on the operating conditions and the presence of different flue gas constituents/contaminants (NO$_x$, SO$_2$, SO$_3$, selenium oxides, etc.), to optimize overall capture of mercury at each plant (and thereby reduce costs), different components, different combinations of components, or different ratios of components may be needed.

Example III-2. Full-Scale Plant with High Sulfur Coal

Tests were conducted on a full-scale 150 Mw plant equipped with an ESP for particulate control. During the test, the plant burned a blended coal with a sulfur content of approximately 2%. High sulfur coals produce flue gas contaminants (sulfur species, SO$_2$, SO$_3$, etc.) that significantly impact mercury capture efficiency. SO$_2$ emissions of 1200-1600 ppm were measured at the stack and SO$_3$ concentrations of 15-25 ppm were measured in the flue gas at the point of sorbent injection. All tests were conducted at full load.

During the test, a halide promoter (NaBr, to form HBr) was injected into the furnace along with three different sorbents including activated carbon and additional components to protect mercury binding sites (e.g., active sites for mercury oxidation). These sorbents were injected upstream of the air heaters, with limited distance and residence time between the air heaters and ESP inlet. Sorbent 1 was approximately 75% activated carbon and 25% clay material (bentonite, as described in U.S. Pat. No. 8,652,235 B2). Sorbent 2 was approximately 75% activated carbon and 25% hydrated lime (per U.S. Pat. No. 7,435,286 B2. Sorbent 3 was approximately 75% activated carbon and 25% ammonium salts (ammonium sulfate specifically). The activated carbon and added components had a mean size of approximately 6-9 microns. Larger sized sorbents (having a particle size of about 10 to about 40 microns) were tested, but were shown to be not as effective. The halogen promoter was injected at rates in the range of 0.0-4.0 lb/Macf (million actual cubic feet) and the sorbents were injected in the range of 0-20 lb/Macf. Each sorbent was tested separately along with the halogen promoter with results discussed below.

Figure 12:
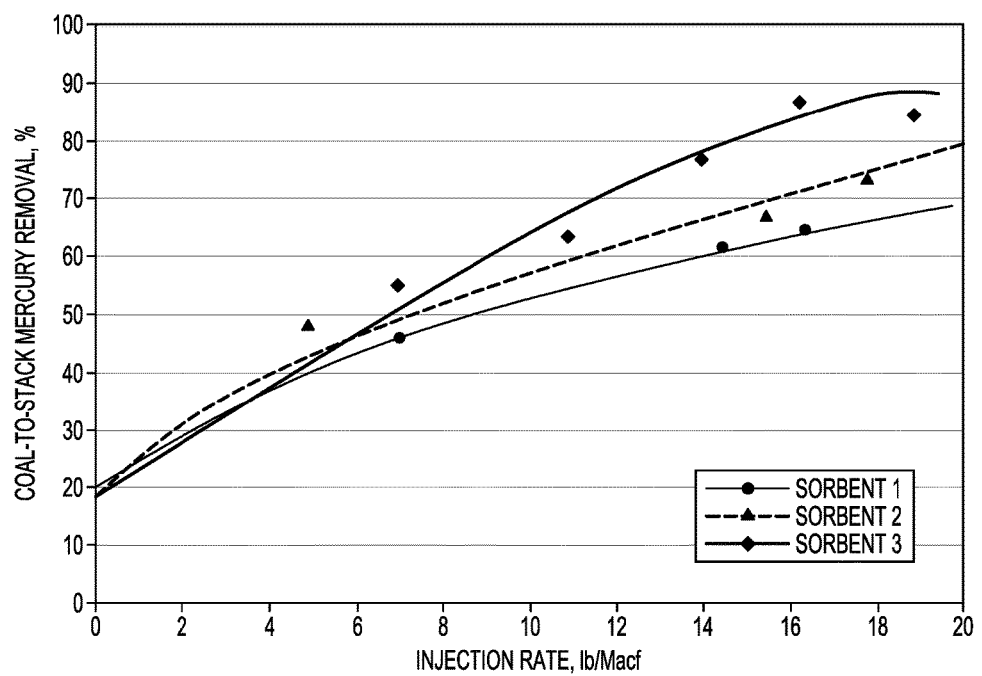
FIG. 12 illustrates mercury removal versus injection rate of sorbent for various sorbents, in accordance with various embodiments.
Figure 13:
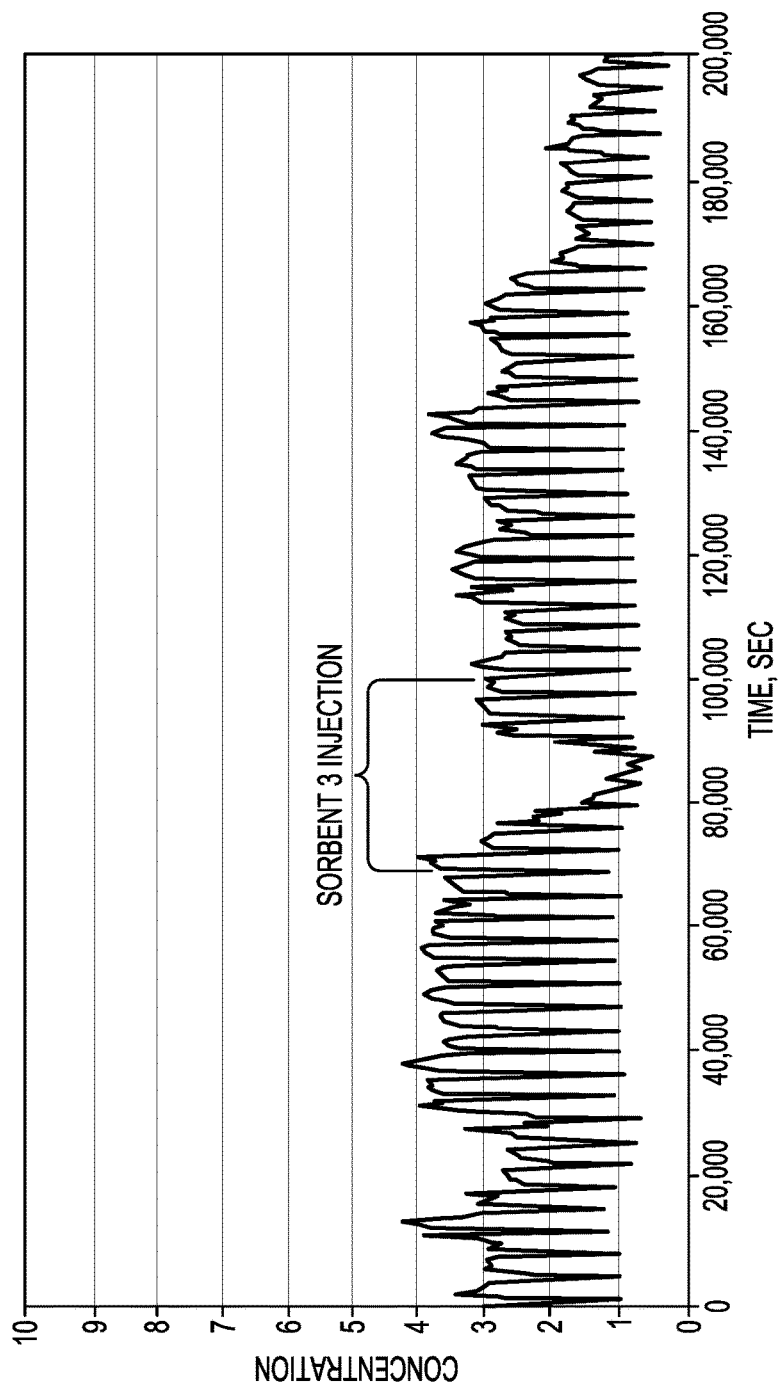
FIG. 13 shows mercury concentration versus time while a sorbent including an ammonium salt was injected with a promoter, in accordance with various embodiments.
Figure 14:
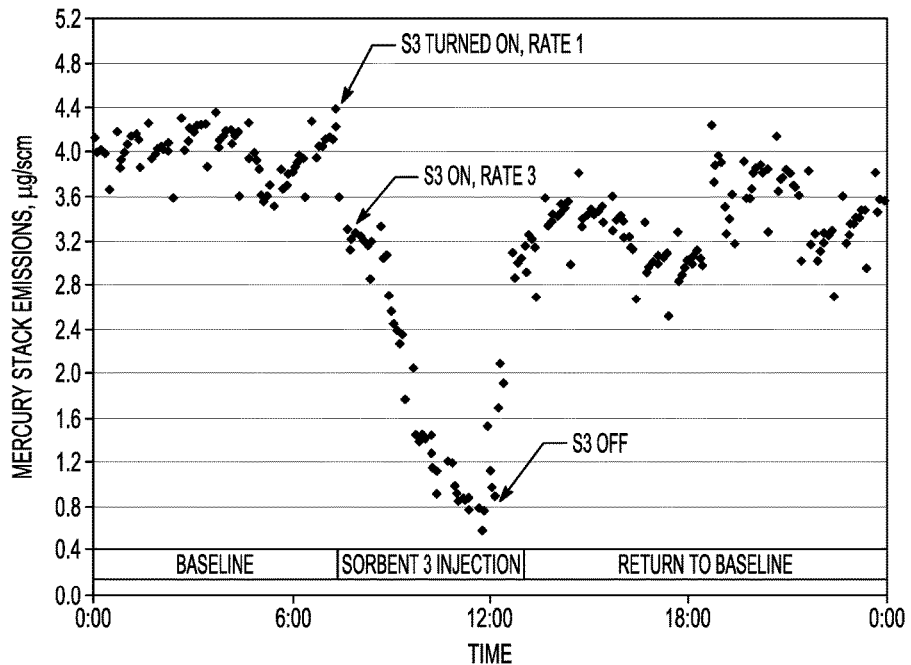
FIGS. 14-15 illustrate mercury emissions versus time with and without injection of a sorbent including an ammonium salt at various rates, in accordance with various embodiments.
Figure 15:
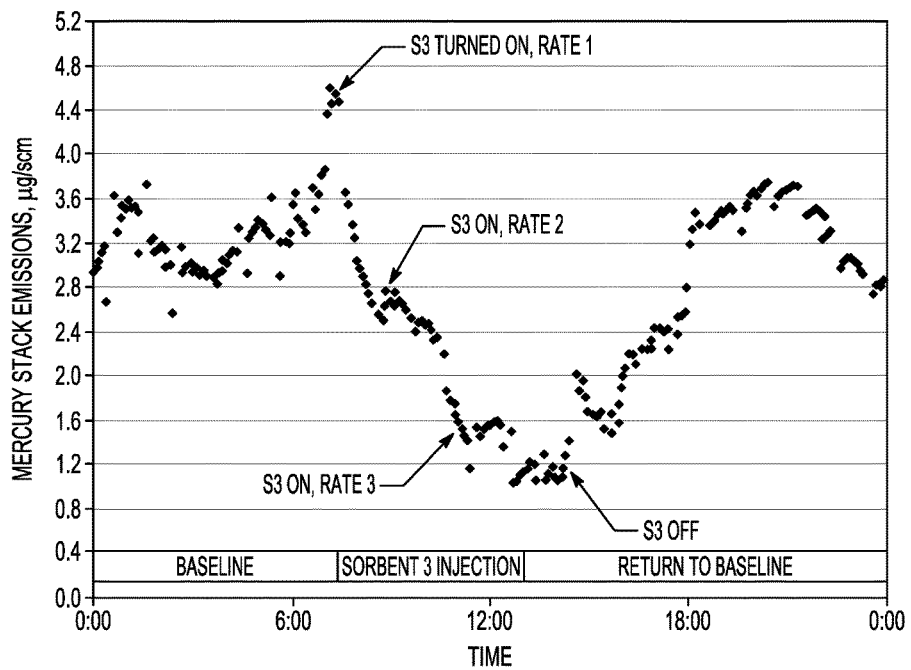

Typical results are illustrated in FIG. 12. As shown in FIG. 12, the addition of a second component with activated carbon vastly improved mercury removal. Sorbent 3 and 2 performed better than sorbent 1, which based on past data generally performs similar to slightly better than standard activated carbon alone. The data shows that adding ammonium salts resulted in mercury removals approaching 90% and addition of alkali components showed greater than 70%. FIG. 13 shows the raw continuous monitor mercury data as Sorbent 3 was injected along with the halide promoter. FIG. 14 (day 1) and FIG. 15 (day 2) show the rather rapid decline in mercury emissions as Sorbent 3 injection is turned on and as injection rates are increased. The slight difference observed in mercury capture between the two days is that on day 2 the $SO_2$ concentration at the stack was 200-300 ppm higher than day 1.

While the addition of optional components such as alkali and ammonium convincingly assist in protecting active sites, they cannot totally eliminate the impact of contaminant flue gas components (e.g., sulfur species such as $SO_2$ and $SO_3$) that are generated when combusting a high sulfur coal. Data from similar tests show that injecting similar quantities of other alkali and ammonium along with activated carbon show improved mercury capture. This indicates that synergy occurs that improves performance when adding (or co-injecting) two materials together. FIG. 11 illustrates that active sites on activated carbon can be consumed by sulfur species and other contaminants. The ammonium and/or alkali material (together or separately) interact and react with these species thus minimizing their consumption of activated carbon mercury binding sites (e.g., active sites for mercury oxidation). Further, the addition of these components may also further promote the activated carbon such that it is more reactive toward mercury capture. Thus, combining additional components with treated and/or non-treated activated carbon synergistically takes advantage of these mechanisms, resulting in improved mercury capture at reduced costs. Further, depending on the operating conditions and the presence of different flue gas constituents/contaminants ($NO_x$, $SO_2$, $SO_3$, selenates, etc.), it is necessary to use different components (or combination thereof) and/or different ratios to optimize overall capture of mercury at each plant; thereby reducing costs.

Part IV. Direct Injection of Ammonia.

Example IV-1. Incorporation of Nitrogen into Carbon Sorbent Surface Layer Via. Direct Injection of Ammonia Tests were conducted on a full-scale 700 Mw plant equipped with an ESP for particulate control and wet scrubber for $SO_2$ compliance. $SO_3$ ash conditioning is used as necessary to assist the ESP in controlling opacity and particulate matter (PM) stack emissions. During the test, $SO_3$ was injected upstream of the ESP in the range of 0-20 ppmv. The addition of $SO_3$ to the flue gas has been previously shown to significantly impact mercury capture efficiency. All tests were conducted at full load, with a coal burn rate of approximately 500-550 tons per hour (tph).

During the test, a halogen promoter (bromine based) was injected into the furnace along with a carbon-based sorbent and with direct injection of ammonia. The ammonia was used to enhance the surface layer of the carbon-based sorbent with nitrogen (e.g., forming a nitrogen layer structure, or a nitrogen lattice) to protect the mercury binding sites from $SO_3$, either injected, or naturally produced from the combustion of coal. The coal burned had a sulfur content of approximately 1%, which generated a flue gas with approximately 1000 ppm of $SO_2$, and 10-15 ppm of $SO_3$. Ammonia gas was injected directly into the flue at approximately 11-44 lb/hr, equivalent in the flue gas of approximately 2-8 ppm. Different sorbents comprised of activated carbon were injected upstream and downstream of the air heaters, with ammonia injection upstream of the sorbent injection location. The halogen promoter was injected in the range of 0.0-0.7 lb/Macf (million actual cubic feet) and the sorbents were injected in the range of 0-8 lb/Macf. Each sorbent was tested separately along with the halogen promoter with results discussed below for one sorbent, which was representative of the other sorbents tested.

Figure 16:
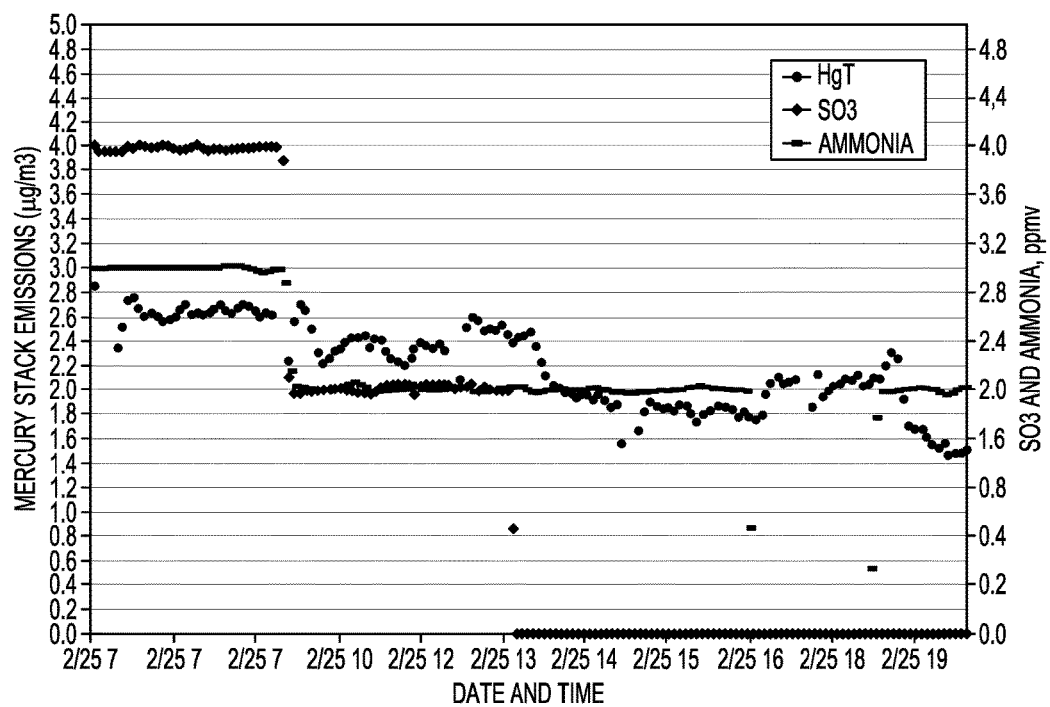
FIG. 16 illustrates illustrate mercury emissions and $SO_3$ or ammonia injection rate versus time, in accordance with various embodiments.

Typical results are illustrated in FIG. 16 while 2-4 ppmv of $SO_3$ was injected, with ammonia injected from 0-3 ppm. As shown in FIG. 16, the impact of $SO_3$ significantly impacted mercury removal by the sorbents. The elimination of only 2 ppm of $SO_3$ and injection of 2 ppm of ammonia improved mercury capture by over 30%, as shown in FIG. 16. Additionally, turning off the ammonia injection showed an increase in mercury emissions by the carbon-based sorbent of approximately 20%. The data shows that without the enhanced effect of incorporating nitrogen (ammonia) on the surface layer of the carbon, the carbon-based sorbent was much less effective (~20%) in capturing mercury in the $SO_3$ flue gas.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Embodiments.

The following exemplary embodiments are provided, the numbering of which is not to be construed as designating levels of importance:

Embodiment 1 provides a method of reducing the mercury content in a mercury-containing gas, the method comprising:

contacting a mercury-containing gas with a sorbent comprising carbon and nitrogen, to form a mercury-sorbent composition; and separating at least some of the mercury-sorbent composition from the mercury-containing gas, to give a separated gas.

Embodiment 2 provides the method of Embodiment 1, wherein the carbon is activated carbon.

Embodiment 3 provides the method of any one of Embodiments 1-2, wherein the sorbent is activated carbon sorbent particles comprising nitrogen in a surface layer thereof.

Embodiment 4 provides the method of any one of Embodiments 1-3, wherein the sorbent, the carbon in the sorbent, or a combination thereof, is a powder, particles, a monolithic structure, or a combination thereof.

Embodiment 5 provides the method of any one of Embodiments 1-4, wherein during the contacting the sorbent is static within the mercury-containing gas.

Embodiment 6 provides the method of any one of Embodiments 1-5, wherein during the contacting the sorbent is moving within the mercury-containing gas.

Embodiment 7 provides the method of any one of Embodiments 1-6, wherein the sorbent comprises nitrogen in a surface layer thereof.

Embodiment 8 provides the method of any one of Embodiments 1-7, wherein the sorbent comprises a graphene edge comprising an active site for mercury oxidation and a nitrogen layer structure comprising cationic nitrogen atoms, neutral nitrogen atoms, or a combination thereof, the nitrogen layer structure being proximate the active site.

Embodiment 9 provides the method of Embodiment 8, wherein the nitrogen layer structure reacts with acid gases in the mercury-containing gas at least partially preventing them from reacting with the active site.

Embodiment 10 provides the method of any one of Embodiments 8-9, wherein the nitrogen layer structure polarizes an electron field in the graphene edge thereby increasing oxidation potential of the active site Embodiment 11 provides the method of any one of Embodiments 1-10, wherein the active site comprises a promoted carbene edge carbon that has reacted with a promoter.

Embodiment 12 provides the method of any one of Embodiments 1-11, wherein the promoter comprises HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$, $FeI_x$ (x=1, 2, 3, or 4), $FeBr_y$ (y=1, 2, 3, or 4), $FeCl_z$ (z=1, 2, 3, or 4), $MnBr_2$, $MnCl_2$, $NiBr_2$, $NiCl_2$, $NiI_2$, $ZnBr_2$, $ZnCl_2$, $ZnI_2$, $NH_4Br$, $NH_4Cl$, $NH_4I$, $NH_4F$, $(NH_4)_2SO_4$, $H_2SO_4$, $NH_4SO_4H$, $(NH_4)_2S_2O_3$, $FeNH_4(SO_4)_2$, $Fe(NH_4)_2(SO_4)_2$, $FeNH_4Br_4$, $FeNH_4Cl_4$, $AlNH_4(SO_4)_2$, hydrates thereof, or a combination thereof.

Embodiment 13 provides the method of any one of Embodiments 11-12, wherein the carbene edge carbon reacts with the promoter in a flue gas.

Embodiment 14 provides the method of any one of Embodiments 11-13, wherein the promoter or a promoter precursor that forms the promoter is added to a fuel or to a furnace which forms the mercury-containing gas, to the mercury-containing gas, or to a transport line that supplies the sorbent to the furnace or to the mercury-containing gas, or a combination thereof.

Embodiment 15 provides the method of any one of Embodiments 8-14, wherein the nitrogen layer structure is formed in the mercury-containing gas.

Embodiment 16 provides the method of any one of Embodiments 8-15, wherein the nitrogen layer structure is formed in a flue gas.

Embodiment 17 provides the method of any one of Embodiments 8-16, wherein the nitrogen layer structure is formed on the sorbent prior to injecting the sorbent into the mercury-containing gas.

Embodiment 18 provides the method of any one of Embodiments 8-17, wherein the nitrogen layer structure is formed on the sorbent after injecting the sorbent into a flue gas.

Embodiment 19 provides the method of any one of Embodiments 8-18, wherein the nitrogen layer structure comprises an organonitrogen lattice, an inorganic ammonium lattice, or a combination thereof.

Embodiment 20 provides the method of 19, wherein the organonitrogen lattice is formed by a method comprising:
coating the carbon with a layer comprising an organic nitrogen-containing precursor to form the organonitrogen lattice.

Embodiment 21 provides the method of Embodiment 20, wherein forming the nitrogen layer structure further comprises heating the layer to form the nitrogen layer structure.

Embodiment 22 provides the method of Embodiment 21, wherein the heating is performed within a flue gas.

Embodiment 23 provides the method of any one of Embodiments 20-21, wherein the layer comprising the one or more organic nitrogen-containing precursors further comprises an acid.

Embodiment 24 provides the method of Embodiment 23, wherein the acid comprises a gaseous, liquid, or solid Lewis or Bronsted acid.

Embodiment 25 provides the method of any one of Embodiments 20-24, wherein the layer comprising the one or more organic nitrogen-containing precursors further comprises a carbohydrate.

Embodiment 26 provides the method of any one of Embodiments 17-25, wherein forming the nitrogen layer structure comprises depositing a layer of preformed organonitrogen polymer on the carbon and heating the layer to form the nitrogen layer structure.

Embodiment 27 provides the method of any one of Embodiments 17-26, wherein the nitrogen layer structure is formed by a method comprising:
contacting the carbon with an ammonium salt, ammonium precursor, or ammonium compound to form the nitrogen layer structure.

Embodiment 28 provides the method of Embodiment 27, wherein the ammonium salt is an ammonium halide, a methylammonium halide, an ammonium salt of an oxyacid of a Group VI element, an ammonium salt of an oxyacid of a Group V element, or a combination thereof.

Embodiment 29 provides the method of any one of Embodiments 27-28, wherein the ammonium salt is ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, sodium nitrite, sodium nitrate, lithium nitrite, lithium nitrate, barium nitrite, barium nitrate, cerium nitrite, cerium nitrate, $FeNH_4(SO_4)_2$, $Fe(NH_4)_2(SO_4)_2$, $FeNH_4Br_4$, $FeNH_4Cl_4$, $AlNH_4(SO_4)_2$, hydrates thereof, or a combination thereof.

Embodiment 30 provides the method of any one of Embodiments 27-29, wherein the ammonium salt is ammonium sulfate (($NH_4$)$_2SO_4$), ammonium bromide ($NH_4Br$), ammonium iodide ($NH_4I$), ammonium chloride ($NH_4Cl$), ammonium fluoride ($NH_4F$), ammonium thiosulfate (($NH_4$)$_2S_2O_3$), ammonium bisulfate ($NH_4SO_4H$), or a combination thereof.

Embodiment 31 provides the method of any one of Embodiments 27-30, further comprising heating the contacted carbon and ammonium salt or ammonium compound.

Embodiment 32 provides the method of any one of Embodiments 27-31, wherein forming the nitrogen layer structure comprises mixing the ammonium salt or ammonium compound with the carbon to create the sorbent including carbon and nitrogen.

Embodiment 33 provides the method of any one of Embodiments 27-32, wherein forming the nitrogen layer structure comprises injecting the ammonium salt or ammonium compound in a flue gas along with the carbon to form the sorbent within the flue gas.

Embodiment 34 provides the method of any one of Embodiments 27-33, wherein forming the nitrogen layer structure comprises injecting the ammonium salt or ammonium compound and the carbon in a flue gas at different locations to deposit the ammonium salt or ammonium compound on the carbon to form the sorbent within the flue gas.

Embodiment 35 provides the method of any one of Embodiments 27-34, wherein forming the nitrogen layer structure comprises injecting the ammonium salt or ammonium compound and the carbon in a flue gas at different locations such that the ammonium salt or compound decomposes or vaporizes and then deposits on the carbon to form the sorbent.

Embodiment 36 provides the method of any one of Embodiments 27-35, wherein forming the nitrogen layer structure comprises injecting a vaporous ammonium salt or ammonium compound and the carbon into a flue gas at the same or different location such that the ammonium salt or ammonium compound deposits on the carbon to form the sorbent.

Embodiment 37 provides the method of any one of Embodiments 7-36, wherein the concentration of nitrogen in the surface layer is higher than the concentration of nitrogen in a core of the sorbent.

Embodiment 38 provides the method of any one of Embodiments 1-37, wherein the sorbent combines with at least about 70 wt % of the mercury present in the mercury-containing gas.

Embodiment 39 provides the method of any one of Embodiments 1-38, wherein the mercury-containing gas further comprises a concentration of sulfur (VI) and the concentration of sulfur (VI) in the mercury-containing gas is greater than about 3 ppm by mole and the sorbent forms a mercury-sorbent composition at a higher absorption rate relative to a corresponding sorbent comprising at least one of a) less or substantially no nitrogen, b) less or substantially no halide- or halogen-promotion, wherein the sorbent is halide- or halogen-promoted, and c) less or substantially no inorganic matrix therein.

Embodiment 40 provides the method of any one of Embodiments 1-39, wherein the mercury-containing gas further comprises a concentration of sulfur (VI) and the concentration of sulfur (VI) in the mercury-containing gas is about 3 ppm-2000 ppm.

Embodiment 41 provides the method of any one of Embodiments 7-40, wherein the nitrogen is substantially homogenously distributed in the core of the sorbent.

Embodiment 42 provides the method of any one of Embodiments 1-41, wherein the nitrogen in the surface layer decreases neutralization of carbocations in the carbon by at least one of $SO_3$ and $H_2SO_4$, as compared to a corresponding sorbent comprising less or substantially no nitrogen.

Embodiment 43 provides the method of any one of Embodiments 1-42, wherein the nitrogen in the surface layer at least partially blocks carbocations in the carbon from at least one of $SO_3$ and $H_2SO_4$, as compared to a corresponding sorbent comprising less or substantially no nitrogen.

Embodiment 44 provides the method of any one of Embodiments 1-43, further comprising:
promoting at least a portion of an unpromoted sorbent by contacting the portion of the unpromoted sorbent with a promoter to form the sorbent.

Embodiment 45 provides the method of Embodiment 44, wherein the promoter is in a form comprising at least one of a vapor form, in a solvent, as a liquid, as a solid, and a combination thereof.

Embodiment 46 provides the method of any one of Embodiments 44-45, wherein the promoting occurs in an aqueous scrubber, wherein the scrubber comprises an aqueous slurry that comprises the promotor.

Embodiment 47 provides the method of any one of Embodiments 1-46, wherein contacting the mercury-containing gas with the sorbent comprises adding the sorbent into the mercury-containing gas.

Embodiment 48 provides the method of any one of Embodiments 1-47, wherein the sorbent is at least one of in a fixed bed, in a moving bed, in a scrubber, in a filter, or suspended in the mercury-containing gas.

Embodiment 49 provides the method of any one of Embodiments 7-48, wherein the core of the sorbent comprises about 0 wt % to less than or equal to about 99 wt % nitrogen.

Embodiment 50 provides the method of any one of Embodiments 7-49, wherein the core of the sorbent comprise about 1 wt % to about 6 wt % nitrogen.

Embodiment 51 provides the method of any one of Embodiments 7-50, wherein the surface layer of the sorbent comprises about 0.001 wt % to about 99 wt % nitrogen.

Embodiment 52 provides the method of any one of Embodiments 7-51, wherein the surface layer of the sorbent comprises about 5 wt % to about 80 wt % nitrogen.

Embodiment 53 provides the method of any one of Embodiments 7-52, wherein the surface layer of the sorbent comprises a layer at the surface of the sorbent having a thickness of about 0.001% to about 49% of the largest dimension of the sorbent.

Embodiment 54 provides the method of any one of Embodiments 7-53, wherein the surface layer of the sorbent comprises a layer at the surface of the sorbent having a thickness of about 0.001% to about 25% the largest dimension of the sorbent.

Embodiment 55 provides the method of any one of Embodiments 1-54, wherein the sorbent has a largest dimension of about 0.1 μm to about 1000 μm.

Embodiment 56 provides the method of any one of Embodiments 7-55, wherein the surface layer is a continuous surface layer.

Embodiment 57 provides the method of any one of Embodiments 1-56, wherein the sorbent is formed using a method comprising:

processing a carbon precursor comprising nitrogen with at least one of heating, microwaving, and irradiating, to provide the sorbent.

Embodiment 58 provides the method of Embodiment 57, wherein the carbon precursor comprises a carbonaceous material comprising carbon and a nitrogenous material comprising nitrogen.

Embodiment 59 provides the method of Embodiment 58, wherein the carbonaceous material comprises at least one of brown sugar, barley sugar, caramel, cane sugar, corn syrup, starch, molasses, a glucan, a galactan, a xylan, and a sugar waste product.

Embodiment 60 provides the method of any one of Embodiments 58-59, wherein the nitrogenous material comprises a nitrogen-containing organic or inorganic compound.

Embodiment 61 provides the method of any one of Embodiments 58-60, wherein the nitrogenous material comprises a nitrogen heterocycle, a nitrogen-containing polymer or copolymer, a nitrile, a carbamate, an amino acid, nitrobenzene, hydroxylamine, urea, hydrazine, sulfamic acid, or a combination thereof.

Embodiment 62 provides the method of any one of Embodiments 57-61, further comprising:
  contacting the carbon precursor and a substrate material, to provide a sorbent starting material; and
  processing the sorbent starting material with at least one of heating, microwaving, and irradiating, to provide the sorbent.

Embodiment 63 provides the method of Embodiment 62, wherein heating the sorbent starting material provides a second sorbent starting material, further comprising reacting the second sorbent starting material with an acidic or basic material, to provide the sorbent.

Embodiment 64 provides the method of any one of Embodiments 62-63, wherein the substrate comprises at least one of diatomaceous earth, a clay, a zeolite, or a mineral.

Embodiment 65 provides the method of any one of Embodiments 62-64, wherein heating the sorbent starting material comprises heating to about 100° C. to about 1200° C.

Embodiment 66 provides the method of any one of Embodiments 62-65, wherein the sorbent comprises a carbon-nitrogen composite sorbent.

Embodiment 67 provides the method of any one of Embodiments 1-66, wherein the sorbent comprises one or more active sites.

Embodiment 68 provides the method of Embodiment 67, wherein at least a portion of the active sites in the sorbent react with at least one of the mercury and the oxidized species of the mercury, to form the mercury-sorbent composition.

Embodiment 69 provides the method of any one of Embodiments 1-68, wherein the separating at least some of the mercury-sorbent composition from the mercury containing gas comprises separating in a particulate separator.

Embodiment 70 provides the method of Embodiment 69, wherein the particulate separator comprises an electrostatic precipitator (ESP), a baghouse, a wet scrubber, a dry scrubber, a hybrid scrubber, a filter, cyclone, fabric separator, ceramic separator, or any combination thereof.

Embodiment 71 provides the method of any one of Embodiments 44-70, wherein a promoter precursor transforms into the halogen or halide promoter which then reacts with the unpromoted sorbent to give the promoted sorbent.

Embodiment 72 provides the method of Embodiment 71, wherein the promoter precursor is at least one of on the unpromoted sorbent and added with the unpromoted sorbent.

Embodiment 73 provides the method of any one of Embodiments 1-72, further comprising at least one of during and prior to the contacting adding an alkaline component into the mercury-containing gas.

Embodiment 74 provides the method of Embodiment 73, wherein the alkaline component comprises at least one of an oxide, hydroxide, carbonate, or phosphate of an alkali element, an alkali or alkaline-earth element, and a compound or material including the same.

Embodiment 75 provides the method of any one of Embodiments 1-74, wherein the sorbent comprises a stabilizing agent comprising at least one of S, Se, or mixtures thereof.

Embodiment 76 provides the method of any one of Embodiments 1-75, wherein the sorbent comprises a stabilizing agent comprising at least one of $H_2S$, $SO_2$, $H_2Se$, $SeO_2$, $CS_2$, $P_2S_5$, or mixtures thereof.

Embodiment 77 provides the method of any one of Embodiments 1-76, further comprising regenerating the mercury-sorbent composition to give a regenerated sorbent.

Embodiment 78 provides the method of any one of Embodiments 1-77, wherein the sorbent is a regenerated sorbent.

Embodiment 79 provides the method of any one of Embodiments 1-78, wherein at least one of the contacting and the separating occurs in an aqueous scrubber.

Embodiment 80 provides the method of Embodiment 79, wherein the scrubber comprises an aqueous slurry that comprises the sorbent.

Embodiment 81 provides a method for reducing the mercury content of a mercury-containing gas, the method comprising:
  promoting at least a portion of an unpromoted sorbent comprising activated carbon and nitrogen with a promoter to form a promoted sorbent comprising activated carbon and nitrogen;
  contacting a mercury-containing gas with the promoted sorbent, to form a mercury-sorbent composition; and
  separating at least some of the mercury-sorbent composition from the mercury-containing gas, to give a separated gas;
  wherein the mercury-containing gas has a concentration of sulfur (VI) of about 1-2000 ppm by mole and a first quantity of the promoted sorbent forms a mercury-sorbent composition at a first mercury capture rate that is higher than a mercury absorption rate of the first quantity of a corresponding sorbent comprising at least one of a) less or substantially no nitrogen, b) less or substantially no halide- or halogen-promotion, and c) less or substantially no nitrogen layer structure including cationic nitrogen atoms, neutral nitrogen atoms, or a combination thereof.

Embodiment 82 provides a method of making a sorbent, comprising:
  promoting at least a portion of an unpromoted sorbent comprising carbon and nitrogen comprising contacting the portion with a promoter to form an promoted sorbent comprising carbon and nitrogen, wherein the sorbent comprises a graphene edge comprising an active site for mercury oxidation and a nitrogen layer structure comprising cationic nitrogen atoms, neutral nitrogen atoms, or a combination thereof proximate the active site, wherein the concentration of nitrogen in a surface layer of the sorbent is higher than the concentration of nitrogen in a core of the sorbent.

Embodiment 83 provides the method of Embodiment 82, further comprising:
contacting a carbon precursor comprising nitrogen and a substrate material, to provide a sorbent starting material; and
processing the sorbent starting material, to provide the unpromoted sorbent comprising carbon and nitrogen.

Embodiment 84 provides the method of Embodiment 83, wherein the carbon precursor is provided using a method comprising:
contacting and heating a carbonaceous material and a nitrogenous material comprising nitrogen, to provide the carbon precursor comprising nitrogen.

Embodiment 85 provides a sorbent made by the method of any one of Embodiments 82-84.

Embodiment 86 provides a method of making a sorbent, comprising:
contacting a carbonaceous material and a nitrogenous material, to provide an unpromoted sorbent comprising nitrogen;
promoting at least a portion of the unpromoted sorbent by contacting the portion of the unpromoted sorbent with a promoter to form a sorbent comprising carbon and nitrogen, wherein the concentration of nitrogen in the sorbent is higher than the concentration of nitrogen in the carbonaceous material, wherein the sorbent comprises s graphene edge comprising an active site for mercury oxidation and a nitrogen layer structure comprising cationic nitrogen atoms, neutral nitrogen atoms, or a combination thereof proximate the active site.

Embodiment 87 provides a sorbent, comprising:
a promoted carbon comprising nitrogen in a surface layer thereof and comprising a graphene edge comprising an active site for mercury oxidation and a nitrogen layer structure comprising cationic nitrogen atoms, neutral nitrogen atoms, or a combination thereof proximate the active site.

Embodiment 88 provides the sorbent of Embodiment 87, wherein the concentration of nitrogen in the surface layer is higher than the concentration of nitrogen in a core of the sorbent.

Embodiment 89 provides the sorbent of any one of Embodiments 87-88, wherein the sorbent has an average largest dimension of about 0.1 µm to about 1000 µm.

Embodiment 90 provides the sorbent of any one of Embodiments 87-89, wherein the carbon is at least one of halogen-promoted, Group V halide-promoted, Group VI halide-promoted, hydrogen halide-promoted, ammonium halide-promoted, alkali earth metal halide-promoted, and alkaline earth metal halide-promoted.

Embodiment 91 provides the sorbent of any one of Embodiments 87-90, wherein the sorbent comprises an inorganic matrix.

Embodiment 92 provides the sorbent of any one of Embodiments 87-91, wherein the nitrogen is substantially homogenously distributed in the core of the sorbent.

Embodiment 93 provides the sorbent of any one of Embodiments 87-92, wherein the nitrogen in the surface layer of the sorbent at least partially decreases neutralization by $H_2SO_4$ or $SO_3$ of carbocations in the sorbent, as compared to a corresponding sorbent comprising less or substantially no nitrogen in a corresponding surface layer under substantially similar conditions.

Embodiment 94 provides the sorbent of any one of Embodiments 87-93, wherein the nitrogen in the surface layer at least partially blocks carbocations in the carbon from forming bonds with $H_2SO_4$ or $SO_3$, as compared to a corresponding sorbent comprising less or substantially no nitrogen in a corresponding surface layer under substantially similar conditions.

Embodiment 95 provides the sorbent of any one of Embodiments 87-94, wherein a first quantity of the sorbent forms a mercury-sorbent composition at a first mercury capture rate in a gas composition comprising mercury wherein the concentration of sulfur (VI) in the gas composition is about 1-2000 ppm by mole, and wherein the first capture rate is higher than a mercury absorption rate of the first quantity of a corresponding sorbent comprising at least one of a) less or substantially no nitrogen in a corresponding surface layer, b) less or substantially no halide- or halogen-promotion, and c) less or substantially no inorganic matrix therein.

Embodiment 96 provides the sorbent of any one of Embodiments 87-95, wherein the nitrogen is derived from a nitrogen-containing organic or inorganic compound.

Embodiment 97 provides the sorbent of any one of Embodiments 87-96, wherein the nitrogen is derived from indole, quinoxaline, carbazole, isoquinoline, nitrobenzene, urea, sulfamic acid, polyvinylpyrrolidone, vinylpyrrolidone-vinyl acetate copolymer, vinylpyrrolidone-acrylic acid copolymer, vinylpyrrolidone-maleic acid copolymer, polyethylenimine, alanine, piperazine, quinolone, quinoxaline, diazabicyclooctane, an amino acid, an ammonium salt, or a combination thereof.

Embodiment 98 provides a sorbent for use in mercury removal from a mercury-containing gas, the sorbent comprising:
a halogen- or halide-promoted activated carbon comprising nitrogen in a surface layer, wherein the activated carbon sorbent comprises an activated carbon graphene edge comprising an active site for mercury oxidation and a nitrogen layer structure comprising cationic nitrogen atoms, neutral nitrogen atoms, or a combination thereof proximate the active site, the nitrogen layer structure sufficient to at least one of
a) decrease neutralization by $H_2SO_4$ or $SO_3$ of carbocations in the activated carbon sorbent, as compared to a corresponding activated carbon sorbent comprising less or substantially no nitrogen layer structure comprising cationic nitrogen atoms, neutral nitrogen atoms, or a combination thereof under substantially similar conditions, and
b) at least partially block carbocations in the activated carbon from forming bonds with $H_2SO_4$ or $SO_3$, as compared to a corresponding activated carbon sorbent comprising less or substantially no nitrogen layer structure comprising cationic nitrogen atoms, neutral nitrogen atoms, or a combination thereof under substantially similar conditions.

Embodiment 99 provides a sorbent including an unpromoted carbon sorbent comprising a surface nitrogen layer comprising cationic nitrogen atoms, neutral nitrogen atoms, or a combination thereof proximate to an active site near the surface.

Embodiment 100 provides the apparatus, method, or sorbent of any one or any combination of Embodiments 1-99 optionally configured such that all elements or options recited are available to use or select from.

What is claimed is:
1. A method of reducing the mercury content in a mercury-containing gas, the method comprising:

contacting a mercury-containing gas with a sorbent comprising a carbon layer structure, the carbon layer structure comprising nitrogen and about 50 wt % to about 99 wt % carbon, the carbon layer structure at least partially covered by a nitrogen layer structure, to form a mercury-sorbent composite composition, wherein the nitrogen layer structure is porous to mercury of the mercury-containing gas and reactive to acid gases of the mercury-containing gas; and separating at least some of the mercury-sorbent composition from the mercury-containing gas, to give a separated gas, wherein the concentration of nitrogen in the nitrogen layer structure is higher than the concentration of nitrogen in carbon layer structure of the sorbent.

2. The method of claim 1, wherein the carbon is activated carbon.

3. The method of claim 1, wherein the nitrogen layer structure of the sorbent comprises a layer at the surface of the sorbent having a thickness of about 0.001% to about 49% of the largest dimension of the sorbent.

4. The method of claim 1, wherein the nitrogen layer structure comprises cationic nitrogen atoms, neutral nitrogen atoms, or a combination thereof.

5. The method of claim 1, wherein the sorbent comprises a graphene edge on the carbon layer structure comprising an active site for mercury oxidation, the active site proximate the nitrogen layer structure.

6. The method of claim 1, wherein an active site of the sorbent comprises a promoted carbon that has reacted with a promoter, wherein the promoter is added as a solid, liquid, or gas to the mercury containing gas, to the fuel or combustion zone that provides the mercury the containing gas, or a combination thereof.

7. The method of claim 6, wherein the promoter comprises HCl, HBr, HI, $Br_2$, $Cl_2$, $I_2$, BrCl, IBr, ICl, ClF, $PBr_3$, $PCl_5$, $SCl_2$, $CuCl_2$, $CuBr_2$, $Al_2Br_6$, $FeI_x$, $FeBr_y$, $FeCl_z$, $MnBr_2$, $MnCl_2$, $NiBr_2$, $NiCl_2$, $NiI_2$, $ZnBr_2$, $ZnCl_2$, $ZnI_2$, $NH_4Br$, $NH_4Cl$, $NH_4I$, $NH_4F$, $(NH_4)_2SO_4$, $H_2SO_4$, $NH_4SO_4H$, $(NH_4)_2S_2O_3$, $FeNH_4(SO_4)_2$, $Fe(NH_4)_2(SO_4)_2$, $FeNH_4Br_4$, $FeNH_4Cl_4$, $AlNH_4(SO_4)_2$, $F_2$, $F^-$, $Br^-$, $I^-$, $NH_4Br$, NaBr, $CaBr_2$, NaCl, $CaCl_2$, $NH_4Cl$, $NH_4I$, NaI, $CaI_2$, KI, KCl, HI, $NH_4F$, NaF, $CaF_2$, HF, LiBr, AgCl, AgBr, $CHI_3$, $CH_3Br$, AuBr, $MgBr_2$, $MgCl_2$, hydrates thereof, or combinations thereof wherein x, y, and z are independently 1, 2, 3, or 4.

8. The method of claim 4, wherein the nitrogen layer structure is formed in the mercury-containing gas.

9. The method of claim 4, wherein the nitrogen layer structure is formed on the sorbent prior to injecting the sorbent into the mercury-containing gas.

10. The method of claim 4, wherein forming the nitrogen layer structure comprises depositing a layer of preformed organonitrogen polymer on the carbon and heating the layer to form the nitrogen layer structure.

11. The method of claim 4, wherein the nitrogen layer structure is formed by a method comprising:
contacting the carbon with an ammonium salt, ammonium precursor, or ammonium compound to form the nitrogen layer structure.

12. The method of claim 11, wherein the ammonium salt, ammonium precursor, or ammonium compound is an ammonium halide, a methylammonium halide, an ammonium salt of an oxyacid of a Group VI element, an ammonium salt of an oxyacid of a Group V element, or a combination thereof.

13. The method of claim 11, wherein the ammonium salt, ammonium precursor, or ammonium compound is ammonium bromide, ammonium iodide, ammonium chloride, an organic halide with a formula of $CH_3NH_3X$ (wherein X is Cl, Br or I), ammonium sulfate, ammonium hydrogen sulfate, ammonium sulfite, ammonium hydrogen sulfite, ammonium persulfate, ammonium pyrosulfate, ammonium thiosulphate, ammonium dithionite, ammonium aluminium sulfate, ammonium iron sulfate, ammonium sulfamate, ammonium phosphate, diammonium phosphate, ammonium hydrogen phosphate, ammonium dihydrogen phosphate, ammonium thiophosate, ammonium nitrate, ammonium nitrite, ammonium carbonate, ammonium thiocyanate, ammonium sulfide, ammonium hydrogen sulfide, ammonium acetate, ammonium carbamate, ammonium carbonate, ammonium chlorate, ammonium chromate, ammonium fluoride, ammonium formate, ammonium hydroxide, ammonium perchlorate, sodium nitrite, sodium nitrate, lithium nitrite, lithium nitrate, barium nitrite, barium nitrate, cerium nitrite, cerium nitrate, $FeNH_4(SO_4)_2$, $Fe(NH_4)_2(SO_4)_2$, $FeNH_4Br_4$, $FeNH_4Cl_4$, $AlNH_4(SO_4)_2$, hydrates thereof, or a combination thereof.

14. The method of claim 11, wherein forming the nitrogen layer structure comprises injecting the ammonium salt, ammonium precursor, or ammonium compound and the carbon in a flue gas in the same location or at different locations wherein:
the ammonium salt, ammonium precursor, or ammonium compound is contacted with the carbon to form the sorbent within the flue gas,
the ammonium salt, ammonium precursor, or ammonium compound decomposes or vaporizes and then contacts the carbon to form the sorbent,
the ammonium salt, ammonium precursor, or ammonium compound contacts the carbon to form the sorbent, or
a combination thereof.

15. The method of claim 1, wherein the nitrogen in the surface layer 1) decreases neutralization of carbocations in the carbon by at least one of $SO_3$ and $H_2SO_4$, as compared to a corresponding sorbent comprising less or substantially no nitrogen, 2) at least partially blocks carbocations in the carbon from at least one of $SO_3$ and $H_2SO_4$, as compared to a corresponding sorbent comprising less or substantially no nitrogen, or 3) a combination thereof.

16. The method of claim 1, further comprising:
promoting at least a portion of an unpromoted sorbent by contacting the portion of the unpromoted sorbent with a promoter to form the sorbent.

17. The method of claim 1, wherein the separating at least some of the mercury-sorbent composition from the mercury containing gas comprises separating in a particulate separator.

18. A method of making a sorbent, comprising:
promoting at least a portion of an unpromoted sorbent comprising carbon and nitrogen comprising contacting the portion with a promoter to form a promoted sorbent comprising a carbon layer structure, the carbon layer structure comprising about 50 wt % to about 99 wt % carbon, and the carbon layer structure is covered by a nitrogen layer structure, wherein the sorbent comprises a graphene edge on the carbon comprising an active site for mercury oxidation and a nitrogen layer structure comprising cationic nitrogen atoms, neutral nitrogen atoms, or a combination thereof proximate the active site, wherein the concentration of nitrogen in a surface layer of the sorbent is higher than the concentration of nitrogen in a core of the sorbent comprising nitrogen and the nitrogen layer structure is porous to mercury of the mercury-containing gas and reactive to acid gases of the mercury-containing gas.

19. A sorbent, comprising:
a promoted carbon layer structure comprising about 50 wt % to about 99 wt % carbon, further comprising nitrogen in a nitrogen layer structure coated thereon and comprising a graphene edge on the carbon comprising an active site for mercury oxidation and the nitrogen layer structure comprising cationic nitrogen atoms, neutral nitrogen atoms, or a combination thereof proximate the active site, wherein the nitrogen layer structure is porous to mercury, and a concentration of the nitrogen in the nitrogen layer is greater than a concentration of nitrogen in the promoted carbon layer structure comprising nitrogen.

* * * * *

UNITED STATES PATENT AND TRADEMARK OFFICE
CERTIFICATE OF CORRECTION

PATENT NO. : 10,130,930 B2
APPLICATION NO. : 15/449112
DATED : November 20, 2018
INVENTOR(S) : Olson et al.

It is certified that error appears in the above-identified patent and that said Letters Patent is hereby corrected as shown below:

On the Title Page

In Column 2, item (56) under "Other Publications", Line 3, delete "CO 2" and insert --$CO_2$-- therefor In the Drawings On sheet 12 of 12, Fig. 16, delete "HgT" and insert --$Hg_{(T)}$-- therefor On sheet 12 of 12, Fig. 16, delete "SO3" and insert --$SO_3$-- therefor On sheet 12 of 12, Fig. 16, delete "(μg/m3)" and insert --(μg/m$^3$)-- therefor On sheet 12 of 12, Fig. 16, delete "SO3" and insert --$SO_3$-- therefor In the Specification In Column 1, Line 30, delete "stream" and insert --streams-- therefor In Column 10, Line 26, delete "sorbtion." and insert --sorption.-- therefor In Column 10, Line 37, delete "organinitrogen" and insert --organonitrogen-- therefor In Column 19, Lines 17-18, delete "vinylpyrollidone." and insert --vinylpyrrolidone.-- therefor In Column 20, Line 56, delete "precursor)" and insert --precursor-- therefor In Column 22, Line 16, after "Cl⁻,", insert --I⁻,--

In Column 25, Line 29, delete "H2SO₄" and insert --$H_2SO_4$-- therefor

Signed and Sealed this
Second Day of June, 2020

Andrei Iancu
*Director of the United States Patent and Trademark Office*

CERTIFICATE OF CORRECTION (continued)
U.S. Pat. No. 10,130,930 B2

In Column 25, Line 29, delete "VI" and insert --(VI)-- therefor

In Column 26, Line 22, delete "sorbtion." and insert --sorption.-- therefor

In Column 27, Line 12, delete "$NH_3+H_2SO_4 \rightarrow NH_4^{+1}+HSO_4^{-1}$," and insert --$NH_3+H_2SO_4 \rightarrow NH_4^{+1}+HSO_4^{-1}$,-- therefor In Column 27, Line 14, delete "$SO_4^{-2}+SO_3 \rightarrow SO_7^{-2}$," and insert --$SO_4^{-2}+SO_3 \rightarrow S_2O_7^{-2}$,-- therefor In Column 28, Line 35, delete "1a." and insert --I-1a.-- therefor In Column 28, Line 66, delete "(2.0×60" and insert --(20×60-- therefor In Column 31, Line 58, delete "2.7" and insert --27-- therefor In Column 37, Line 67, after "nitrogen", insert --.--

In Column 38, Line 14, delete "$SO_x$," and insert --$SO_x$-- therefor

In Column 39, Table 5, Line 3, delete "Br-" and insert --$Br^-$-- therefor

In Column 49, Line 34, after "site", insert --.--

In the Claims

In Column 57, Line 40, in Claim 7, after "$F^-$,", insert --$Cl^-$,--